US010339525B2

(12) United States Patent
Bogaard

(10) Patent No.: US 10,339,525 B2
(45) Date of Patent: Jul. 2, 2019

(54) CONFIRMING LOCAL MARKETPLACE TRANSACTION CONSUMMATION FOR ONLINE PAYMENT CONSUMMATION

(71) Applicant: BOOM! PAYMENTS, INC., Pasadena, CA (US)

(72) Inventor: Erik T. Bogaard, Pasadena, CA (US)

(73) Assignee: BOOM! PAYMENTS, INC., Pasadena, CA (US)

( * ) Notice: Subject to any disclaimer, the term of this patent is extended or adjusted under 35 U.S.C. 154(b) by 345 days.

(21) Appl. No.: 15/195,768

(22) Filed: Jun. 28, 2016

(65) Prior Publication Data

US 2017/0116603 A1 Apr. 27, 2017

Related U.S. Application Data

(63) Continuation-in-part of application No. 14/965,332, filed on Dec. 10, 2015, now Pat. No. 10,176,479, (Continued)

(51) Int. Cl.
*G06Q 20/40* (2012.01)
*G06Q 20/38* (2012.01)
(Continued)

(52) U.S. Cl.
CPC ......... *G06Q 20/3829* (2013.01); *G06Q 20/02* (2013.01); *G06Q 20/085* (2013.01); (Continued)

(58) Field of Classification Search
None
See application file for complete search history.

(56) References Cited

U.S. PATENT DOCUMENTS 4,949,256 A 8/1990 Humble
5,590,038 A 12/1996 Pitroda
(Continued)

FOREIGN PATENT DOCUMENTS

EP 2189932 A1 5/2010
JP 9-305832 11/1997
(Continued)

OTHER PUBLICATIONS

Atkins, W., "Special Supplement: Banking Evolution—Hot or Not in 2015?—EMV Technology Is Just the Beginning for Smart Card-based Payments as the Science Fiction of Today Could Become Reality by 2015," The Banker,Sep. 2007.*

(Continued)

*Primary Examiner* — Nicholas D Rosen
(74) *Attorney, Agent, or Firm* — Patent Law Works LLP

(57) ABSTRACT

Exemplary embodiment of the present invention would provide systems, including Internet-based systems, and computer-implemented methods, for providing online Buyers and Sellers who physically transact an exchange of an item at a local meeting place, indicia of confirmation of the exchange on which to base a background online payment. In particular, exemplary embodiments of the present invention would provide a way for Buyers and/or Sellers to input an identifier for online authentication to confirm that a physical exchange of an item sold had been transacted and that would accordingly provide an online system with a basis to charge the relevant Buyer's account for a sale amount and pay the Seller for the item sold. In one exemplary embodiment of the present invention, an NFC-payment-enabled gateway device would be provided that would integrate with a merchant's NFC-enabled POS device to facilitate the merchant's NFC-enabled POS devices to accept mobile payment from devices that are not themselves NFC-enabled.

3 Claims, 17 Drawing Sheets

Related U.S. Application Data which is a continuation of application No. 13/800,774, filed on Mar. 13, 2013, now Pat. No. 9,235,857, which is a continuation of application No. 13/586,560, filed on Aug. 15, 2012, now Pat. No. 8,429,084, which is a continuation of application No. 13/302,684, filed on Nov. 22, 2011, now Pat. No. 8,271,394.

(60) Provisional application No. 61/552,328, filed on Oct. 27, 2011, provisional application No. 62/203,029, filed on Aug. 10, 2015.

(51) Int. Cl.
| | |
|---|---|
| *G06Q 20/32* | (2012.01) |
| *G06Q 20/02* | (2012.01) |
| *G06Q 30/06* | (2012.01) |
| *G06Q 20/20* | (2012.01) |
| *G06Q 20/10* | (2012.01) |
| *G06Q 20/08* | (2012.01) |
| *G06Q 20/12* | (2012.01) |

(52) U.S. Cl.
CPC ....... *G06Q 20/0855* (2013.01); *G06Q 20/102* (2013.01); *G06Q 20/12* (2013.01); *G06Q 20/202* (2013.01); *G06Q 20/3227* (2013.01); *G06Q 20/3278* (2013.01); *G06Q 20/382* (2013.01); *G06Q 20/3821* (2013.01); *G06Q 20/40* (2013.01); *G06Q 20/401* (2013.01); *G06Q 20/405* (2013.01); *G06Q 20/4014* (2013.01); *G06Q 20/40145* (2013.01); *G06Q 30/06* (2013.01); *G06Q 30/0609* (2013.01); *G06Q 30/0613* (2013.01); *G06Q 2220/00* (2013.01)

(56) References Cited

U.S. PATENT DOCUMENTS

| | | | |
|---|---|---|---|
| 5,757,917 A | 5/1998 | Rose et al. | |
| 5,822,735 A | 10/1998 | De Lapa et al. | |
| 5,884,271 A | 3/1999 | Pitroda | |
| 5,892,900 A | 4/1999 | Ginter et al. | |
| 5,903,830 A | 5/1999 | Joao et al. | |
| 5,917,913 A | 6/1999 | Wang | |
| 6,015,344 A | 1/2000 | Kelly et al. | |
| 6,016,476 A | 1/2000 | Maes et al. | |
| 6,587,835 B1 | 7/2003 | Treyz et al. | |
| 6,609,113 B1 | 8/2003 | O'Leary et al. | |
| 7,096,003 B2 | 8/2006 | Joao et al. | |
| 7,346,577 B1 | 3/2008 | Williams et al. | |
| 7,376,583 B1 | 5/2008 | Rolf | |
| 7,398,253 B1 | 7/2008 | Pinnell | |
| 7,451,114 B1 | 11/2008 | Matsuda et al. | |
| 7,512,567 B2 | 3/2009 | Bemmel et al. | |
| 7,581,257 B1 | 8/2009 | O'Hara | |
| 7,627,526 B2 | 12/2009 | Williams et al. | |
| 7,873,540 B2 | 1/2011 | Arumugam | |
| 7,921,038 B2 | 4/2011 | Matsuda et al. | |
| 8,135,647 B2 | 3/2012 | Hammad et al. | |
| 8,150,772 B2* | 4/2012 | Mardikar | G06Q 20/1085 705/64 |
| 8,200,260 B2 | 6/2012 | Rouse et al. | |
| 8,271,394 B1* | 9/2012 | Bogaard | G06Q 20/12 705/64 |
| 8,321,342 B2 | 11/2012 | Marshall | |
| 8,392,274 B2 | 3/2013 | Hirson | |
| 8,417,633 B1 | 4/2013 | Chmara et al. | |
| 8,429,084 B1* | 4/2013 | Bogaard | G06Q 20/12 705/64 |
| 8,412,626 B2 | 7/2013 | Hirson et al. | |
| 8,645,271 B2 | 2/2014 | Remy | |
| 8,756,161 B2 | 6/2014 | Hasson et al. | |
| 8,831,981 B2* | 9/2014 | Cheng | H04W 4/21 705/21 |
| 9,235,857 B2* | 1/2016 | Bogaard | G06Q 20/12 |
| 9,727,866 B2* | 8/2017 | Kenderov | G06Q 20/4014 |
| 10,176,479 B2* | 1/2019 | Bogaard | G06Q 20/12 |
| 2001/0042014 A1 | 11/2001 | Lowry et al. | |
| 2001/0051894 A1 | 12/2001 | Delapa | |
| 2002/0004746 A1 | 1/2002 | Ferber et al. | |
| 2002/0059100 A1 | 5/2002 | Shore | |
| 2002/0128903 A1 | 9/2002 | Kernahan | |
| 2003/0061168 A1 | 3/2003 | Routhenstein | |
| 2003/0149662 A1 | 8/2003 | Shore | |
| 2003/0163373 A1 | 8/2003 | Cornateanu | |
| 2003/0212759 A1 | 11/2003 | Wu | |
| 2003/0233334 A1 | 12/2003 | Smith | |
| 2004/0030659 A1 | 2/2004 | Gueh | |
| 2004/0054632 A1 | 3/2004 | Remy | |
| 2005/0001711 A1 | 1/2005 | Doughty et al. | |
| 2007/0233839 A1 | 10/2007 | Gaos | |
| 2007/0299742 A1 | 12/2007 | Williams et al. | |
| 2008/0046366 A1 | 2/2008 | Bemmel et al. | |
| 2008/0052182 A1 | 2/2008 | Marshall | |
| 2008/0140447 A1 | 6/2008 | Pourfallah et al. | |
| 2008/0208762 A1* | 8/2008 | Arthur | G06Q 20/027 705/79 |
| 2008/0319869 A1 | 12/2008 | Carlson et al. | |
| 2009/0037304 A1 | 2/2009 | Matsuda et al. | |
| 2009/0125429 A1 | 5/2009 | Takayama | |
| 2009/0171830 A1 | 7/2009 | Blythe | |
| 2009/0177581 A1 | 7/2009 | Garcia et al. | |
| 2009/0240626 A1 | 9/2009 | Hasson et al. | |
| 2009/0287565 A1 | 11/2009 | Bishop et al. | |
| 2009/0307139 A1* | 12/2009 | Mardikar | G06Q 20/1085 705/67 |
| 2010/0030688 A1 | 2/2010 | Patterson | |
| 2011/0039585 A1* | 2/2011 | Rouse | G06O 20/102 455/466 |
| 2011/0276511 A1* | 11/2011 | Rosenberg | G06Q 20/20 705/345 |
| 2012/0078749 A1 | 3/2012 | Scipioni | |
| 2012/0226530 A1 | 9/2012 | Gebb et al. | |
| 2012/0226545 A1 | 9/2012 | Gebb et al. | |
| 2012/0271725 A1* | 10/2012 | Cheng | H04W 4/21 705/21 |
| 2013/0159026 A1* | 6/2013 | Rogel | G06Q 10/02 705/5 |
| 2015/0106216 A1* | 4/2015 | Kenderov | G06Q 20/4014 705/21 |
| 2015/0127549 A1* | 5/2015 | Khan | G06Q 20/20 705/71 |
| 2016/0098721 A1* | 4/2016 | Bogaard | G06Q 20/12 705/44 |

FOREIGN PATENT DOCUMENTS

| | | | |
|---|---|---|---|
| JP | 09305832 A | * | 11/1997 |
| JP | 3051748 B2 | | 9/1998 |
| JP | 11-232348 | | 8/1999 |
| KR | 2002-0002938 A | | 1/2002 |
| KR | 2002-0014973 A | | 2/2002 |
| KR | 20020051665 A | | 6/2002 |
| KR | 20020051665 A | * | 6/2002 |
| WO | 9613814 A1 | | 5/1996 |
| WO | 9625828 A1 | | 8/1996 |
| WO | 9745814 A1 | | 12/1997 |
| WO | 9900773 A1 | | 1/1999 |
| WO | 9908238 A1 | | 2/1999 |
| WO | 9909502 A1 | | 2/1999 |
| WO | 9931630 A1 | | 6/1999 |
| WO | 0075843 A1 | | 12/2000 |
| WO | 2011018755 A2 | | 2/2011 |

OTHER PUBLICATIONS

Johnson, A., "First in Could Be First Out in Mobile Money," American Banker, 176.97, Jun. 23, 2011.*

(56) References Cited

OTHER PUBLICATIONS

Supplementary Search Report and Written Opinion, European Patent Office, dated May 15, 2015 for European Patent Application No. 12843166.5, 8 pages. (Year: 2015).*

"Amazon Services," www.amazonservices.com/content/sell-on-amazon.html?Id=AZFSSOA; printed on Nov. 17, 2011, 1 page.

"Amazonpayments," https://payments.amazon.com/sdui/sdui/business/overview; printed on Nov. 17, 2011, 1 page.

Anon., "Coca-Cola Co. Secures Patent for M-Commerce in the U.S.; Vending Market Watch", Gale Group, Inc .. Copyright 2005 Cygnus Business Media, No. 3, vol. 47, p. 10, ISSN: 1061-1797, Mar. 1, 2005.

Anon., "Priceline Perfect Yardsale Turns the Internet into a Fast, Safe, Guaranteed Market for Neighbors to Buy and Sell the Quality Goods They no Longer Use," PR Newswire, Jan. 19, 2000.

Anon., "UK Leads Smartcard Trials," Silicon.com, Feb. 8, 2002.

Ptacek, M.J., "Electronic Commerce: Processor Camps Clash in Person-to-Person," American Banker, vol. 165, No. 1 03, p. 14, May 30, 2000.

Authorize. Net, a CyberSource Solution, www.authorize.net, printed on Nov. 17, 2011, 1 page.

"Braintree, High Risk Merchant Account: Third Party Payments Aggregation, www.braintreepayments.com/blog/high-risk-merchant-account-third-party-payments-aggregation; printed on Nov. 17, 2011, 1 page."

Craigslist, boston.craigslist.org; printed on Nov. 17, 2011, 1 page.

eBay, Welcome to Customer Support, ocs.ebay.com/ws/eBayISAP.dll?CustomerSupport; printed on Nov. 17, 2011, 1 page.

Ex Parte Christian-Friedrich von Brockdorff, United States Patent and Trademark Office Board of Patent Appeals and Interferences; Opinion in Support of DEcision of Appeal No. 2003-2102, U.S. Appl. No. 09/254,723; Heard Mar. 18, 2004.

half.com, an ebay company, pages.half.ebay.com/help/seller/fulfill.html, printed on Nov. 17, 2011, 1 page.

International Search Report and Written Opinion dated Mar. 29, 2013 for PCT/US2012/061235, International Filing Date Oct. 21, 2012, 11 pages.

Schmid, B.F., et al., "Elements of a Reference Model for Electronic Markets," HICSS, pp. 0193, Thirty-First Annual Hawaii International Conference on System Sciences, vol. 4, 1998, available online @ http://www2.computer.org/portal/web/csdl/doi/1 0.11 09/HICSS.1998.655275, last accessed Feb. 1, 2009.

"Landry, Lauren, ""Bookzingo: A Cheap Way to Get Textbooks on Your Campus Without Ever Having to Visit the Bookstore,""", http://bostinno.com/2012/01/11/19/bookzingo-a-cheap-way-to-get-textbooks-on-your-campus-without-ever-having-to-visit-thebookstore/,Jan. 19, 2012, Streetwise Media, 9 pages."

Payment Professionals. Technology Visionaries. Service Fanatics, papyros.com; printed on Nov. 17, 2011, 1 page.

PayPal, https://www.paypal.com/webapps/mpp/merchant; printed on Nov. 17, 2011, 1 page.

* cited by examiner

CONFIRMING LOCAL MARKETPLACE TRANSACTION CONSUMMATION FOR ONLINE PAYMENT CONSUMMATION

CROSS-REFERENCE TO RELATED APPLICATIONS

This application is a continuation-in-part of, and claims priority to, U.S. application Ser. No. 14/965,332, which was filed Dec. 10, 2015, which is a continuation application of, and claims priority to, U.S. application Ser. No. 13/800,774, which was filed Mar. 13, 2013, now issued U.S. Pat. No. 9,235,857, issued Jan. 12, 2016, which is a continuation application of, and claims priority to, U.S. application Ser. No. 13/586,560, which was filed Aug. 15, 2012, now issued U.S. Pat. No. 8,429,084, issued Apr. 23, 2013, which is a continuation application of, and claims priority to, U.S. application Ser. No. 13/302,684, which was filed Nov. 22, 2011, now U.S. Pat. No. 8,271,394, Issued Sep. 18, 2012, which was a non-provisional application and which claims priority to U.S. Provisional Application Ser. No. 61/552,328, filed Oct. 27, 2011, all of the above-identified applications being entitled "CONFIRMING LOCAL MARKETPLACE TRANSACTION CONSUMMATION FOR ONLINE PAYMENT CONSUMMATION," the entire content and disclosures of all of which are incorporated for all purposes by reference herein as is fully stated herein.

This application further claims priority to U.S. Provisional Patent Application No. 62/203,029, filed Aug. 10, 2015, entitled "AUTHENTICATION APPARATUS, METHODS AND SYSTEMS," the entire content and disclosures of which are incorporated for all purposes by reference herein as is fully stated herein.

FIELD OF THE INVENTION

The field of the present invention is online payment for transactions arranged online, and more particularly, confirming that a local marketplace transaction has been consummated for authorizing online payment consummation, and further comprising safeguards to facilitate bona fide authentication of an individual, and the transactions of that individual, including bona fide authentication of the mobile device used by that individual.

BACKGROUND OF THE INVENTION

Many online transactions are considered consummated at the point when the item ordered by an online customer is shipped. For example, customers routinely access the Internet to buy items from online stores. At an online store, a customer might browse items available, select an item for purchase, provide a method of payment, such as a credit card or PAYPAL® account number, and identify an address to which the item should be delivered. The online store then sends the item and charges the customer's account.

Alternatively, some stores, including online stores, choose to operate through an online marketplace, such as, for example, AMAZON®, or EBAY®. A customer's experience through an online marketplace is similar to purchasing through an online store, except that the store that actually delivers the purchased item to the address specified by the customer is not provided with payment information details. For example, a customer may purchase an item through an online marketplace by accessing the online marketplace, and similar to accessing an online store directly, browsing items available, selecting an item to purchase, providing a method of payment, such as credit card or PAYPAL® account number, and identifying an address to which the item should be delivered.

Once the customer submits the order, the online marketplace notifies the store, such as an online store, of the item order; the online marketplace notifies the store that the customer has authorized payment for the particular item and provides the store with the address to which the item should be delivered. The online marketplace, however, does not provide the store with any of the payment method details. Rather, the store must first send the item to the customer-indicated delivery address, and must provide a confirmation to the online marketplace that the item has been sent. One way by which stores provide such confirmation is by providing, for example, a USPS Delivery Confirmation number associated with the item sent.

The online marketplace requires receipt from the store of a confirmation that the item has been shipped before the online marketplace authorizes payment to the store according to the payment method authorized by the customer; the online marketplace takes some percentage of the payment as payment for having provided the online and payment services.

As can be seen from the above-outlined process, online transactions through online stores or through stores operating through online marketplaces, are considered to have reliably been consummated for payment authorization purposes upon confirmation that the item ordered has been shipped. That is, for purchases of items through online stores or stores operating through online marketplaces, shipment confirmation of an item is considered to provide reliable confirmation that the transaction has been consummated.

As compared to an online transaction for an item that is to be shipped by an online store, or for an item that is to be shipped by a store after notification by an online marketplace, some Internet websites allow purchasers to arrange for a local, physical, exchange of an item for payment. For example, CRAIGSLIST® provides listings of many different types of items for sale. As compared to an online purchase, a customer browses items for sale through CRAIGSLIST®. Instead of paying for the item through CRAIGSLIST®, the customer contacts the seller and arranges to meet the seller, in order to see the item and determine whether or not to purchase the item. For example, for a car, the customer would want to see the car and test drive it, before consummating its purchase. Once the customer is satisfied with the item, the customer would provide the seller with some form of payment.

The above-described type of transaction that involves a customer meeting a seller to physically exchange the item being purchased for payment may be referred to herein as a "local marketplace transaction." The physical exchanging of an item for payment may be referred to herein as a "local marketplace."

Issues sometimes arise with local marketplace transactions. One issue that sometimes arises is that a local marketplace buyer may provide the local marketplace seller with some form of payment that the seller cannot resolve for sufficient payment. For example, a buyer might provide a seller with a personal check for which there are insufficient funds.

As a result of the above-mentioned insufficient funds problem, some local marketplace sellers require cash payment. In some cases, however, the buyer-provided "cash" may be counterfeit. In other cases, an unsuspecting buyer that brought cash for a local marketplace purchase, has been robbed.

Individuals that might want to sell an item through a website such as CRAIGSLIST® may not be in a position to accept credit cards for payment. Further, a customer may not feel comfortable providing an individual seller that the customer is meeting for the first time in a place such as a grocery store parking lot, or other minimal security location, with credit card information.

As compared to online purchases where shipment confirmation of an item is considered to provide reliable confirmation that the transaction has been consummated, websites that provide for the arrangement of local marketplace transactions have not facilitated online payment because there has been no way to reliably confirm that the local marketplace transaction has been consummated.

Some way is needed to reliably confirm that a local marketplace transaction has been consummated to facilitate reliable online payment consummation.

Further, some companies may not want to, or may not be in a financial position to, provide payment between buyers and sellers on their own website. Such a situation might be a temporary one. Or, for marketing reasons, some companies may want to advertise through a Payment Processor website, that is, a website to which customers provide payment account information, but through which, customers may purchase items from third-party companies. Some buyers may feel more secure providing their payment information to a Payment Processor website than to small operators. However, where companies act to facilitate transactions between third-party Buyers and Sellers, a Payment Processor website owner may not want to be responsible for authorizing payment to such companies unless the companies can provide some way for confirming to the Payment Processor that the transaction for which payment is requested has been completed (consummated). Where companies act to facilitate local marketplace transactions between third-party Buyers and Sellers, a way is needed to reliably confirm to a Payment Processor that the local marketplace transaction has been consummated to facilitate reliable online payment consummation by the Payment Processor.

Many merchants have been upgrading their Point of Service Devices (sometimes referred to herein as "POS devices") to integrate with Near Field Communication ("NFC") technology. The aforementioned POS device integration with NFC technology is being done to allow merchants to accept NFC-based payments. One type of NFC-based payment technology has come to be known as "APPLE PAY™." Notably, each merchant that wants to accept NFC-based payments, such as APPLE PAY™ payments, must upgrade their POS devices to integrate with NFC technology.

As will be understood by someone with ordinary skill in the art, NFC is a set of communication protocols that enable two electronic devices, such as an APPLE® IPHONE®s and an NFC enabled terminal, to establish communication and electronically transfer data.

However, as will be further understood by someone with ordinary skill in the art, not all intelligent phones are NFC-payment-enabled; and not all APPLE® IPHONE®s are NFC-chip-equipped. Therefore, there are many people who have phones that are not NFC-payment-enabled.

That is, presently, if a phone does not have an NFC Chip, then the phone is not NFC-payment-enabled.

After a merchant upgrades to integrate NFC technology with their POS devices, it may not be desirable for the merchant to also consider other types of upgrades in the event that future types of mobile payment technology become available.

Therefore, because not everyone owns an NFC-payment-enabled intelligent phone, it would be helpful for merchants to be able to use their new NFC-enabled POS devices to accept mobile payments from other types of mobile devices, including those that are not NFC-enabled.

Notably, identity theft is at an all-time high. It seems that nearly every day, there are reports of some new cyber-hacking of the confidential and sensitive information of individuals, from banks, retail stores, online retailers, even major medical institutions. Not even the U.S. government has escaped cyber-hacking of confidential information.

Large commercial and governmental institutions are not alone in their vulnerability to cyber-hacking crimes. The emails, websites, and even individual intelligent phones of individuals can be "spoofed"—thereby adding to the identity theft nightmare and authentication dilemma that has unfortunately become so commonplace in our time.

In view of the prevalence of identity theft, including spoofing of individual intelligent phones, a way is needed to safeguard NFC-enabled POS devices from accepting "payment" from spoofed phones that have, and do not have, NFC chips.

SUMMARY OF THE INVENTION

Exemplary embodiment of the present invention would provide systems, including Internet-based systems, and computer-implemented methods, for providing online Buyers and Sellers who physically transact an exchange of an item at a local meeting place, indicia of confirmation of the exchange on which to base a background online payment. In particular, exemplary embodiments of the present invention would provide a way for Buyers and/or Sellers to input an identifier for online authentication to confirm that a physical exchange of an item sold had been transacted and that would accordingly provide an online system with a basis to charge the relevant Buyer's account for a sale amount and pay the Seller for the item sold.

Exemplary embodiments of the present invention would provide systems and computer-implemented methods for reliably confirming that a local marketplace transaction has been consummated thereby facilitating reliable online payment consummation for local marketplace transactions.

One exemplary embodiment of the present invention would provide an Internet-based computer system for confirming that a local marketplace transaction has been consummated; such an exemplary Internet-based computer system would comprise at least one exemplary server computer that would be programmed to: in response to a buyer request to purchase an item featured for sale by a seller, generate an identifier of a transaction for a sale of the item; store in a computer-accessible memory a record that would comprise a relationship between the identifier of the transaction, an identification of the buyer, and an identification of the seller; communicate the identifier of the transaction to the buyer; receive from the seller a communication of the identifier in combination with the identification of the seller; and charge an account associated with the buyer for an amount associated with the sale of the item. In one exemplary embodiment, the exemplary record would comprise a relationship between the identifier of the transaction, an identification of the buyer, an identification of the seller and an identification of the item.

In one exemplary embodiment of the present invention, the identifier would comprise a combination of human-readable characters; communicating the identifier of the transaction to the buyer would comprises communicating a message to a mobile telephone associated with the buyer that would comprise said combination of human-readable characters.

In one exemplary embodiment of the present invention, the identifier would comprise a machine-readable graphic symbology; communicating the identifier of the transaction to the buyer would comprise communicating a message to a mobile telephone associated with the buyer that would comprise a visual representation of said machine-readable graphic symbology.

In one exemplary embodiment of the present invention, an NFC-payment-enabled gateway device would be provided that would integrate with a merchant's NFC-enabled POS device to facilitate the merchant's NFC-enabled POS devices to accept mobile payment from devices that are not themselves NFC-payment-enabled.

An exemplary NFC-payment-enabled gateway embodiment of the present invention would comprise safeguards to facilitate bona fide authentication of an individual, the intelligent telephone of that individual, and the transactions of that individual through that individual's intelligent telephone. As described further below, in some exemplary embodiments, user authentication, and user intelligent telephone authentication, may be provided using a communications network, such as the Internet, or a mobile carrier network, in addition to NFC communications. In other exemplary embodiments, user authentication, and user intelligent telephone authentication, may be provided using "local" authentication, such as where the user intelligent telephone does not have access to a communications network other than local communications with a local NFC-payment-enabled gateway.

As also described further below, in other exemplary embodiments, user authentication may be provided using one or more intermediary devices, such as merchant POS (Point of Service) devices, that are enabled to communicate with user devices without any network, but rather using short-range and/or long-range communication interfaces with user devices, such as, by way of illustrative, non-limiting example, using Bluetooth, such as, for example, Bluetooth low-energy communications; in some such exemplary embodiments, such intermediary devices may communicate with an exemplary Authentication Computer Device (also sometimes referred to herein as an "app"-provider computer device or system) (described in more detail below) using one or more of various communications technologies, including, but not limited to, Internet communications; however, in other such exemplary embodiments, such intermediary devices would be programmed to perform local authentication without support from any network-based device(s).

BRIEF DESCRIPTION OF THE DRAWINGS

These and other features of the present invention are more fully set forth in the following description of exemplary embodiments of the invention. The description is presented with reference to the accompanying drawings in which.

DETAILED DESCRIPTION OF THE INVENTION

Figure 1:
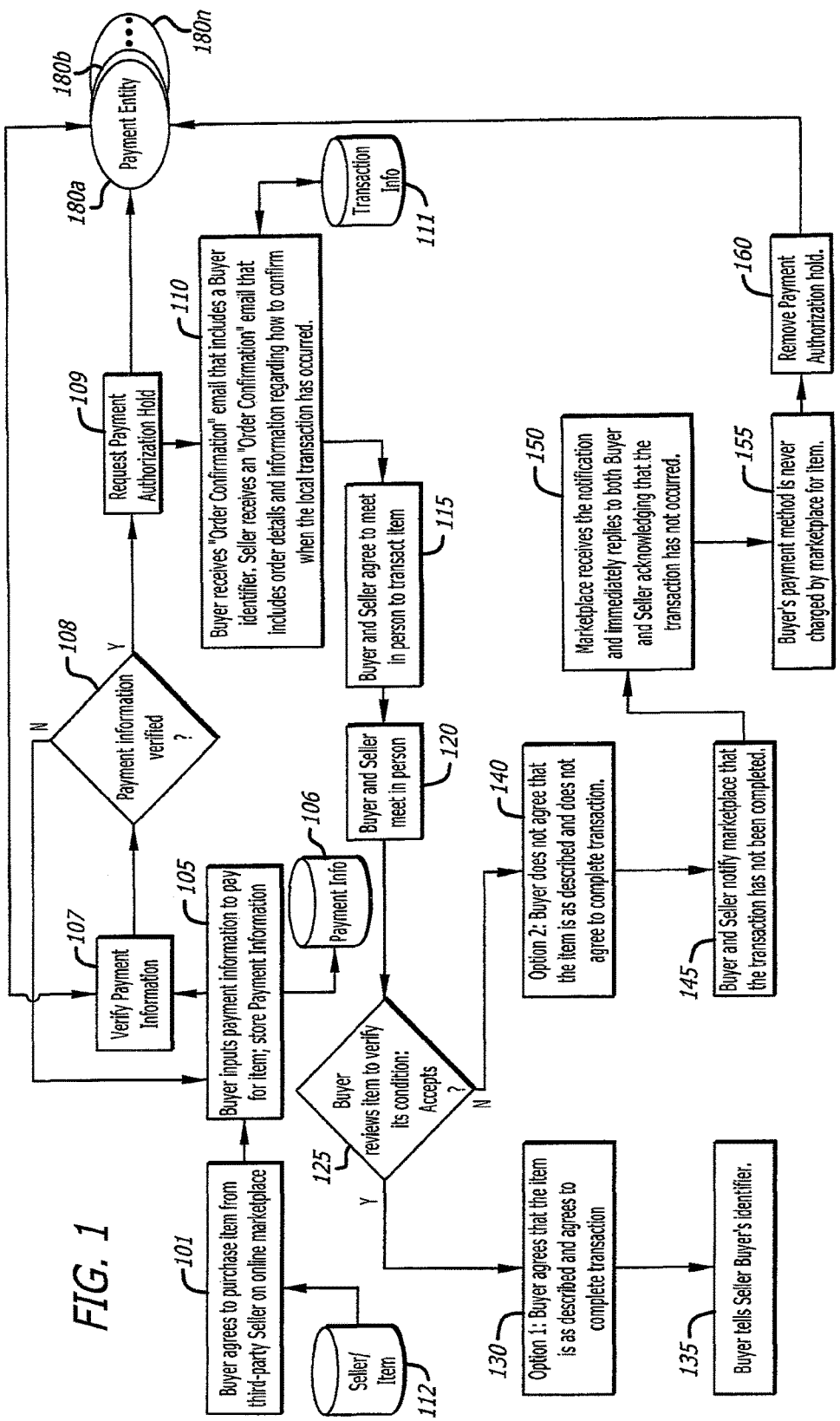
FIG. 1 depicts high-level logic functions for a Buyer's overview perspective of a local marketplace transaction in an exemplary embodiment of the present invention.

FIG. 1 depicts high-level logic functions for a Buyer's overview perspective of a local marketplace transaction in an exemplary embodiment of the present invention. With reference to FIG. 1, as depicted in exemplary logic function 101, an exemplary Buyer would search or browse an online marketplace website (as illustratively depicted by exemplary Seller/Item Information database 112) and would tentatively agree to purchase an item for an advertised sale amount (or, alternatively, for a negotiated price such as may be negotiated through an auction web site, or through a buyer-posting web site, such as, for example, through wwww.zaarly.com, or through other buyer-seller negotiation business models) from a third-party Seller through the online marketplace (which may sometimes be referred to generally as exemplary online "Company A").

Reference herein to an advertised sale amount is illustrative and is not a limitation of the present invention. Rather, in some exemplary embodiments, an exemplary Buyer would negotiate a tentative sale amount for an item such as through an auction website. In other exemplary embodiments, an exemplary Buyer would tentatively agree to an advertised sale amount for an item. Yet other embodiments would provide exemplary Sellers with the opportunity to advertise an item for online auction, for online negotiation and/or for sale; exemplary Buyer's would either tentatively agree to an advertised price, or to a negotiated or auction bid price, as the case may be.

Exemplary embodiments would not be limited to seller-postings of items for sale. Rather, exemplary embodiments of the present invention could be used with buyer-posting driven business models (such as, for example, through www.zaarly.com), or through other buyer-seller negotiation business models whether now known or in the future discovered.

As further explained below, some exemplary embodiments would provide for local marketplace negotiations that could result in a modified final amount for the item as compared to the amount that the exemplary Buyer had initially tentatively agreed to online.

As will be understood by someone with ordinary skill in the art, the exemplary Buyer would be tentatively agreeing to purchase the item subject to the exemplary Buyer's later physical inspection and approval of the item listed for sale. As depicted in exemplary logic function 105, the exemplary Buyer would then input exemplary payment information to tentatively pay for the item that the exemplary Buyer has tentatively agreed to purchase; exemplary payment information would include, for example, a type of payment (e.g., credit card, debit card, bank identifier, PAYPAL®, or the like), a relevant account number, and other Buyer identification information that would be used to verify the payment information. The exemplary embodiment would store the payment information in an exemplary payment information database 106.

As depicted in exemplary logic function 107, the exemplary embodiment would then verify that the payment information that the Buyer had provided was valid; the verification would include a request to verify that the advertised sale amount would be authorized for charge against the Buyer-provided payment type and payment account. As depicted in exemplary logic function 107, to verify the Buyer's payment information, the exemplary embodiment would communicate with the relevant Payment Entity 180a-180n. For example, if the Buyer had provided a particular type of credit card, then the exemplary embodiment would communicate with the relevant Payment Entity that was associated with processing payment for the particular type of credit card.

As depicted by exemplary test logic function 108, the exemplary embodiment would determine from information that would have been provided by the relevant Payment Entity (e.g., one of exemplary Payment Entities 180a-180n) whether or not the Payment Information that had been provided by the Buyer was valid or not.

As depicted by the "N" (No) path from exemplary test logic function 108, if the Buyer Payment Information was not valid, or if the amount of the sale was not authorized, then the exemplary embodiment would notify the Buyer to input valid information (e.g., in exemplary logic function 105). On the other hand, if, as depicted by the "Y" (Yes) path from exemplary test logic function 108, the Buyer Payment Information was verified as being valid and the amount of the sale is authorized, then the exemplary embodiment would request 109 that the relevant Payment Entity (e.g., one of exemplary Payment Entities 180a-180n) put a Hold on a payment authorization against an account associated with the Buyer according to the Buyer Payment Information for the relevant advertised sale amount.

As will be understood by someone with ordinary skill in the art, in exemplary embodiments that may be implemented with auction or other business model-based sites, e.g., with buyer-posting sites, the relevant amount (as negotiated between the Buyer and Seller) of the sale would be the basis for the payment authorization and the Hold.

In one exemplary embodiment, an exemplary Hold as described above would be placed on a payment authorization for the relevant amount against a particular Buyer's account for a pre-established maximum number of days, e.g., for an exemplary pre-established maximum period of seven (7) days. In such an exemplary embodiment, if confirmation of the consummation of the relevant transaction between the Buyer and the Seller (as described further below) is not received before the expiration of the pre-established maximum number of days, then the exemplary Hold would be removed from the relevant Buyer's account, and the Buyer and the Seller would be notified that the Hold had been removed; the Buyer would be instructed to re-enter Payment Information, which would again be processed in a manner similar to that described above, and a new Hold would be placed on a payment authorization against the Buyer's account for the relevant amount.

Continuing with reference to FIG. 1, as depicted in exemplary logic function 110, the exemplary Buyer would receive an exemplary Buyer "Order Confirmation" email (from exemplary online "Company A") that would include an exemplary Buyer identifier (that would be generated by the exemplary embodiment and that would be stored on an exemplary transaction information database as illustratively depicted by exemplary transaction information database 111). In the exemplary embodiment, the exemplary Buyer identifier would be generated by the exemplary embodiment to be sufficiently unique to uniquely identify the particular Buyer during a particular period of time. As will be understood by someone with ordinary skill in the art, and as will be described in more detail below, various forms of a Buyer identifier could be generated without departing from the spirit of the present invention. In some exemplary embodiments, a Buyer identifier would be a human-readable combination of alphanumeric and/or special characters; in other exemplary embodiments, a Buyer identifier would comprise a machine-readable code, such as a machine-readable barcode, whether of a type now known or in the future discovered.

As further depicted in exemplary logic function 110, the exemplary Seller would receive an exemplary Seller "Order Confirmation" email (from an exemplary online marketplace such as exemplary online "Company A") that would include order details and information regarding, for example, how to confirm with the local marketplace transaction has been completed. In one exemplary embodiment, the exemplary Seller "Order Confirmation" email would include an exemplary Seller identifier (sometimes referred to herein as a "Seller-Transaction-Complete-Indicator") that would be generated by the exemplary embodiment to be sufficiently unique to uniquely identify the particular Seller and the particular transaction by the Seller during a particular period of time.

Continuing with reference to FIG. 1, as depicted in exemplary logic function 115, the exemplary Buyer and Seller would agree to meet in person to physically conduct the local marketplace transaction. In some embodiments, the exemplary online marketplace would enable the Buyer and Seller to anonymously exchange email messages in order to arrange a meeting for the Buyer to inspect the item. In other embodiments, the exemplary online marketplace would provide a Seller telephone number to the Buyer for the Buyer to contact the Seller and arrange to meet.

Continuing with reference to FIG. 1, as depicted in exemplary logic function 120, the exemplary Buyer and Seller would meet in person. As depicted in exemplary logic function 125, the exemplary Buyer would inspect the item.

If the exemplary Buyer does not agree to purchase the item, as depicted in exemplary logic function 140, then, as depicted in exemplary logic function 145, the exemplary Buyer and Seller would notify (such as by respective Buyer and Seller email messages) the exemplary online marketplace (e.g., exemplary Company A) that the transaction has not been completed. As depicted in exemplary logic function 150, the exemplary online marketplace would the receive the Buyer and Seller notifications and would respond with a confirmation to both the Buyer and the Seller that the transaction did not occur, and as depicted in exemplary logic function 155, would remove payment authorization for payment of the item, and as depicted in exemplary logic function 160, would notify the relevant Payment Entity (e.g., one of exemplary Payment Entities 180a-180n) to remove the previously-requested payment authorization hold against the relevant Buyer's payment information and account.

If, on the other hand, the exemplary Buyer accepts the item for purchase, then as depicted in exemplary logic function 130, the exemplary Buyer would agree to complete the transaction, and as depicted in exemplary logic function 135, would provide the Seller with the Buyer's exemplary Buyer identifier.

As will be understood by someone with ordinary skill in the art, the Buyer providing the Seller with the Buyer's exemplary Buyer identifier would provide the Seller with evidence that the Buyer has accepted the item and thereby consummated the local marketplace transaction. As will be described in more detail below with respect to FIGS. 2A-2C, the Seller would then provide the exemplary online marketplace with the Buyer's identifier, thereby confirming that the local marketplace transaction has been consummated so that the exemplary online marketplace would then have evidence that the local marketplace transaction has been consummated and would authorize payment consummation for the transaction. Processing of a Seller's confirmation that the local marketplace transaction has occurred is described further below with respect to FIGS. 2A-2C. In such an exemplary embodiment, as described further below, the exemplary online marketplace would require receipt of the Seller's input of the Buyer's identifier, as evidence that the local marketplace transaction had been consummated, before authorizing a charge for the item purchased to the Buyer's previously-authorized payment method.

As previously mentioned above, in an exemplary embodiment that placed an exemplary Hold on a payment authorization for a relevant tentative sale amount against a particular Buyer's account for a pre-established maximum number of days, e.g., for an exemplary pre-established maximum period of seven (7) days, if confirmation of the consummation of the relevant transaction between the Buyer and the Seller (such as receipt of the Seller's input of the Buyer's identifier, or in other embodiments as described elsewhere herein, receipt from the Seller and/or the Buyer of an authentic identifier) had not been received before the expiration of the pre-established maximum number of days, then the exemplary Hold would have been removed from the relevant Buyer's account, and unless the Buyer had re-entered Payment Information, then the exemplary embodiment would respond to an input by the Seller of the Buyer's identifier (or in other embodiments as described elsewhere herein, input from the Seller and/or the Buyer of an authentic identifier) with a notification that the previously-placed Hold against the Buyer's account had been removed and that if the Seller proceeded with the transaction, the Seller would do so at the Seller's own risk of possibly not receiving payment; such an exemplary embodiment would take the input (by the Buyer and/or the Seller) of the confirmation of the transaction as a subsequent Buyer authorization of payment to the previously-identified Buyer's account, and would at that point, process the payment authorization and attempt to charge the Buyer's account for the amount of the sale; if the Buyer's account could successfully be charged for the amount of the sale, such an exemplary embodiment would notify both the Buyer and the Seller that payment from the Buyer's account is successfully transferred to the Seller.

On the other hand, if the previously-placed Hold had expired against the Buyer's account, some exemplary embodiments would deny completion of such a transaction altogether.

If, on the other hand, confirmation of the consummation of the relevant transaction between the Buyer and the Seller is received by such an exemplary embodiment before the expiration of the pre-established maximum period of time, then the exemplary embodiment would notify both the Buyer and the Seller that payment from the Buyer's account is successfully transferred to the Seller.

In some alternative embodiments, both the Buyer and the Seller would provide each other with their respective identifiers, and the online marketplace would receive either the Buyer's input of the Seller's identifier, or the Seller's input of the Buyer's identifier, as evidence that the local marketplace transaction had been consummated. In such an alternative embodiment, the exemplary online marketplace would accept receipt of either, or both, the Seller's input of the Buyer's identifier, and/or the Buyer's input of the Seller's identifier, as evidence that the local marketplace transaction had been consummated, before authorizing a charge for the item purchased to the Buyer's previously-authorized payment method.

As a further alternative, the Seller could provide the Buyer with the Seller's identifier and the online marketplace would receive the Buyer's input of the Seller's identifier as evidence that the local marketplace transaction had been consummated. In such an exemplary embodiment, the exemplary online marketplace would require receipt of the Buyer's input of the Seller's identifier, as evidence that the local marketplace transaction had been consummated, before authorizing a charge for the item purchased to the Buyer's previously-authorized payment method.

As yet a further alternative, rather than generate a transaction-specific identifier, in some further alternative exemplary embodiments, a Buyer could maintain a "Buyer's vault" and could set up one or more passwords to that Buyer's vault; whenever the Buyer decided to purchase an item for which the sale was arranged through the exemplary online marketplace, the Buyer would communicate the Buyer's password to the exemplary online marketplace to confirm that the transaction for the sale of the item had been completed. Because a Buyer might arrange for multiple transactions during a particular time period, such a further alternative exemplary embodiment may require that the Buyer provide the Buyer's password with an identification of the Seller (e.g., the Seller's telephone number) and/or the item (e.g., an SKU, an ISBN, or other identifier).

In one such further alternative exemplary embodiment, an exemplary Buyer would set up a different password, sometimes referred to as a "PIN", for each transaction that the Buyer anticipated conducting. That is, rather than the exemplary online marketplace system generating a transaction-specific Buyer identifier, the exemplary Buyer would setup a transaction-specific Buyer-specific PIN for each contemplated transaction. In such an embodiment, the exemplary online marketplace would facilitate the Buyer identifying an item that would be associated with a particular transaction-specific, Buyer-specific PIN. Then, if the Buyer decided to actually purchase the item, the Buyer would communicate the Buyer's transaction-specific password to the exemplary online marketplace to confirm that the transaction for the sale of the item had been completed. Some such further alternative exemplary embodiments would accept receipt of a particular transaction-specific, Buyer-specific PIN from either the Buyer or from the Seller.

Such a further alternative exemplary embodiment could provide a mobile application that would facilitate the Buyer's input (or in some embodiment, the Seller's input) of the Buyer's password and that would facilitate, such as with an online graphic user interface that would display each item that had previously been identified by the Buyer for potential purchase, the Buyer's (or in some embodiments, the Seller's) selection of one or more items that comprised a particular sale transaction. Alternatively, a mobile application could be provided that identified a particular transaction, such as with an online graphic user interface that would display an identification of the Seller and an identification, such as an SKU, an ISBN, other identifier, or a photo) of the item to be bought.

Once such a further alternative exemplary embodiment received a Buyer's input (or in some embodiment, the Seller's input) of the Buyer's password and/or identification of the transaction (Seller and/or item(s)), the further alternative exemplary online marketplace embodiment would: communicate to both the Buyer and the Seller (e.g., through email, text message, Instant messaging, telephone message, or various other types of communication) that the Buyer (or in some embodiment, the Seller) had provided confirmation of the transaction; charge the Buyer's payment method account; and update the various databases (e.g., the exemplary Transaction Information database 111 and the exemplary Payment Information database 106).

With a Buyer-transaction-confirmation-notification-dependent embodiment, some Sellers might attempt to withhold transferring the item to the Buyer until receiving notification from the further alternative exemplary online marketplace embodiment that the transaction had been confirmed. However, such Seller behavior could defeat the basis for the confirmation, providing the Buyer with an excuse to return the item and/or request a chargeback.

Further, as will be understood by someone with ordinary skill in the art, once an item has changed hands, because the Seller is the party to whom payment would be owed, the Seller would be the party most likely to provide the exemplary online marketplace with confirmation that the transaction had been consummated.

Figure 2A:
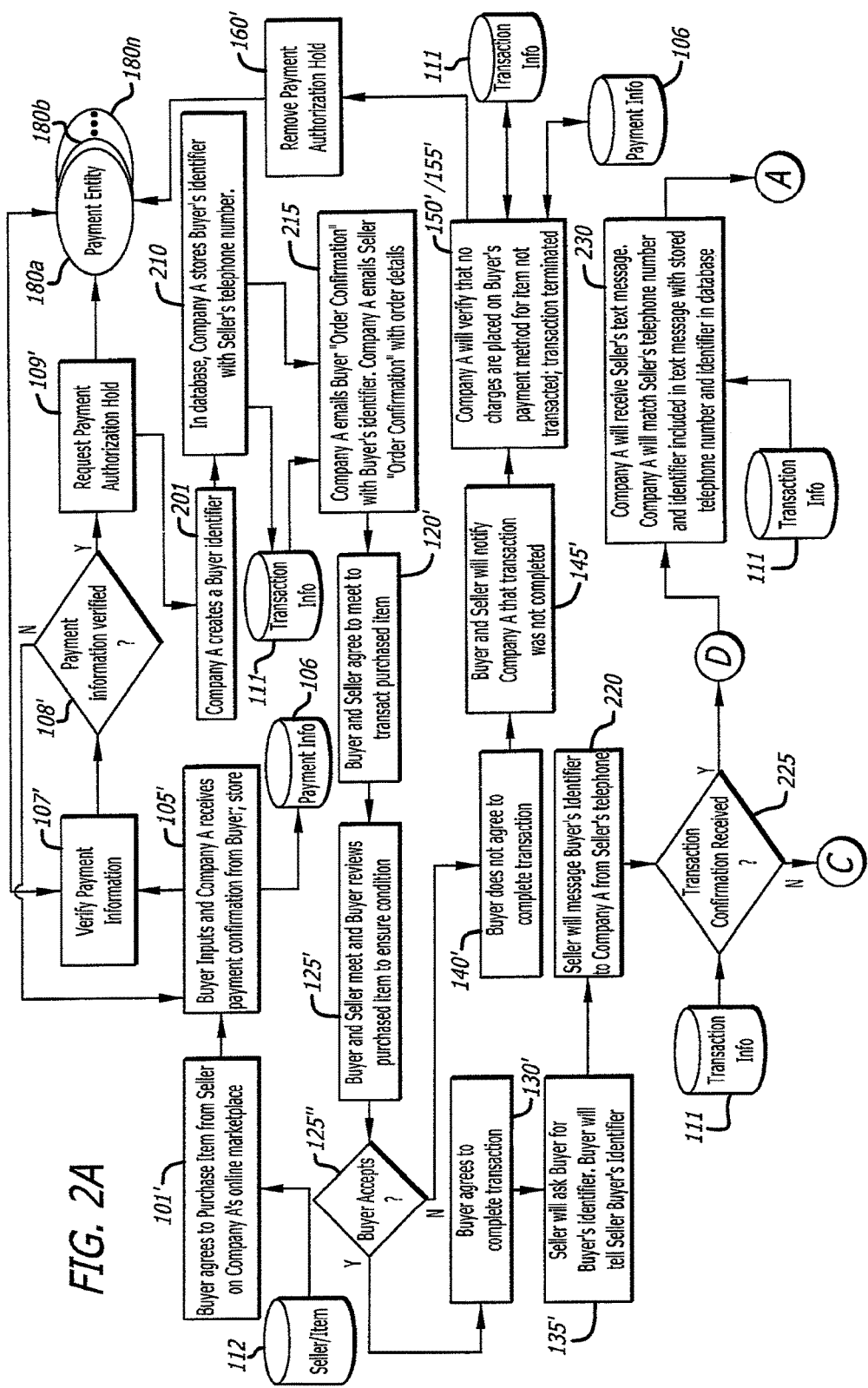
FIGS. 2A-2C depict high-level logic functions for processing a confirmation by a party to a local marketplace transaction of a consummation of the local marketplace transaction in an exemplary embodiment of the present invention.
Figure 2B:
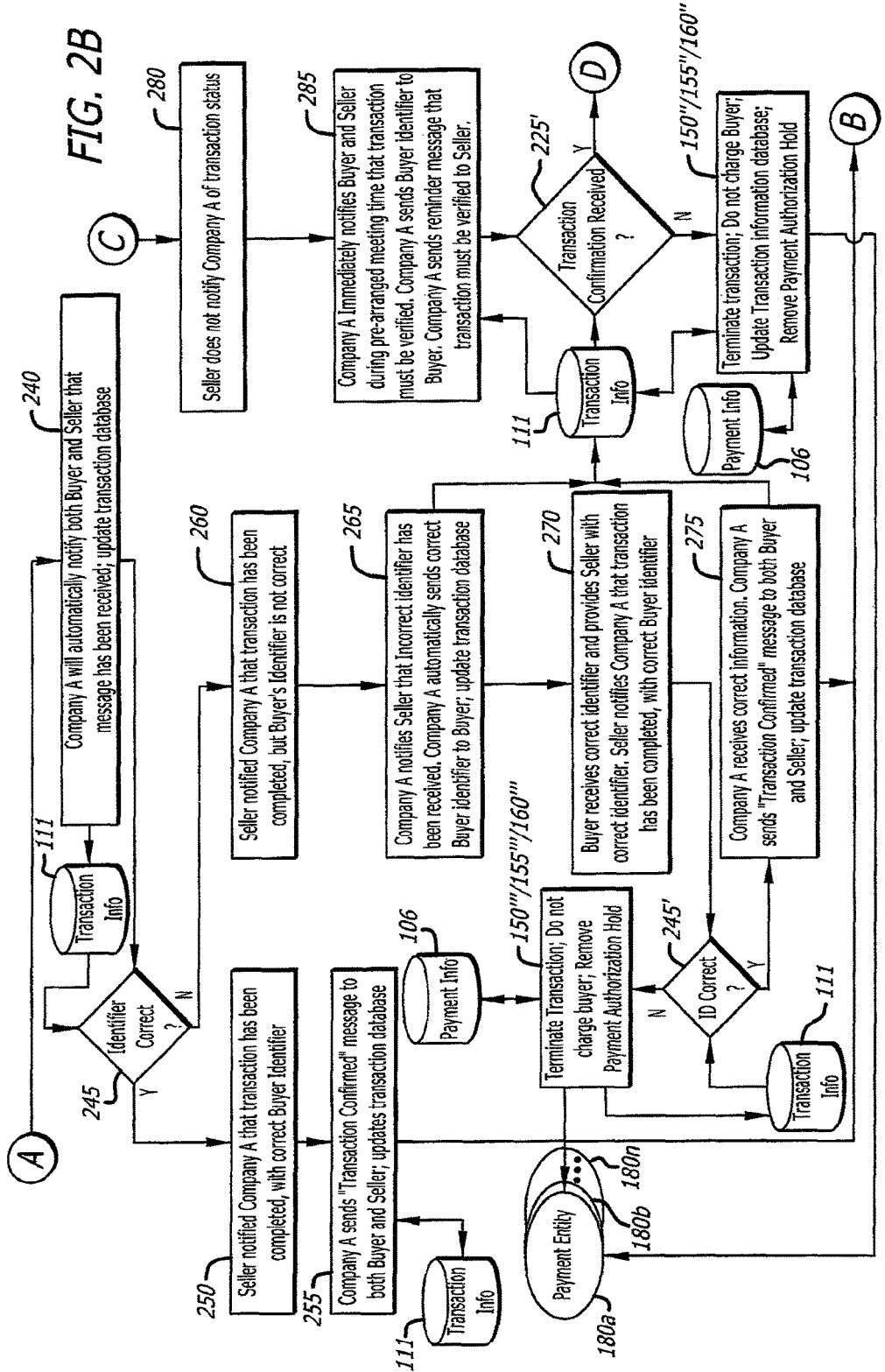
Figure 2C:
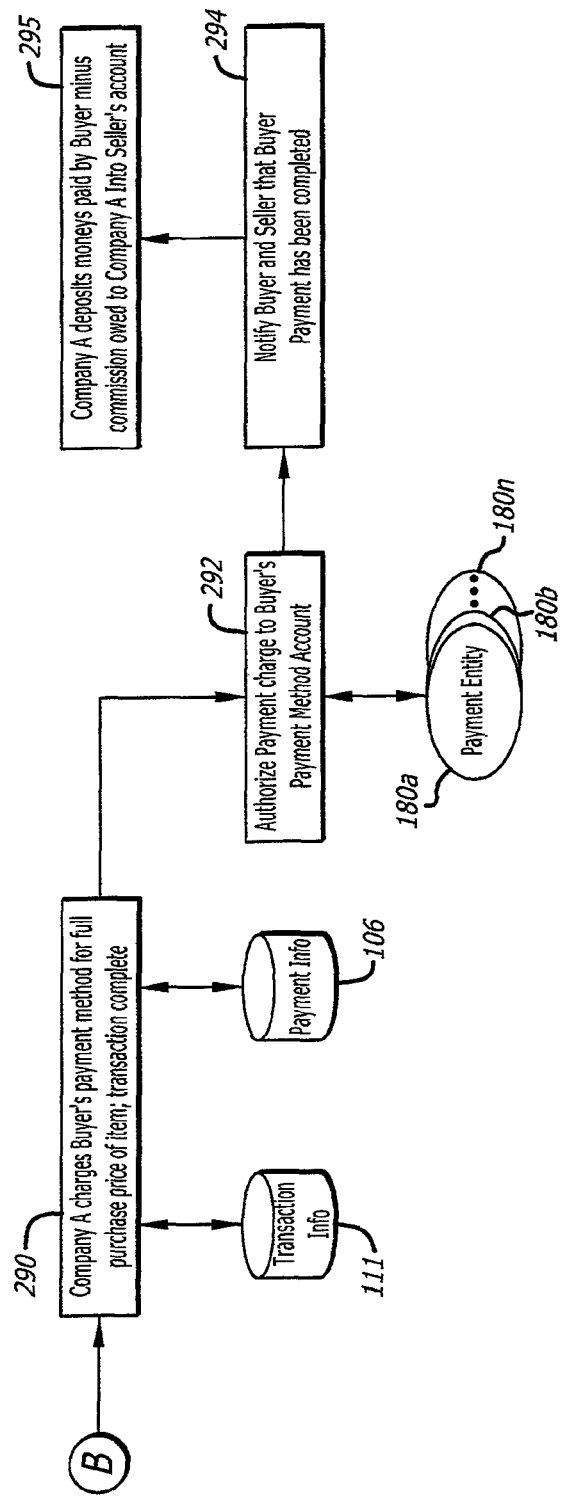

FIGS. 2A-2C depict high-level logic functions for processing a confirmation by a party to a local marketplace transaction of a consummation of the local marketplace transaction in an exemplary embodiment of the present invention. Initiating the high-level logic functions depicted in FIGS. 2A-2C are a number of logic function elements that are similar to those depicted in FIG. 1. In particular, with reference to FIGS. 2A-2C, as depicted in exemplary logic function 101', an exemplary Buyer would search or browse an online marketplace website (as illustratively depicted by exemplary Seller/Item Information database 112) and would tentatively agree to purchase an item from a third-party Seller through an online marketplace for an advertised sale amount. As depicted in exemplary logic function 105', the exemplary online marketplace would receive Buyer input of payment information to tentatively pay for the item that the exemplary Buyer has tentatively agreed to purchase and would store the Buyer input of payment information in an exemplary Payment Information database 106.

Then, as depicted in exemplary logic function 107', the exemplary embodiment would verify that the payment information that the Buyer had provided was valid; the verification would include a request to verify that the advertised sale amount would be authorized for charge against the Buyer-provided payment type and payment account. As depicted in exemplary logic function 107', to verify the Buyer's payment information, the exemplary embodiment would communicate with the relevant Payment Entity (e.g., one of exemplary Payment Entities 180a-180n). As depicted by exemplary test logic function 108', the exemplary embodiment would determine from information that would have been provided by the relevant Payment Entity (e.g., one of exemplary Payment Entities 180a-180n) whether or not the Payment Information that had been provided by the Buyer was valid or not.

As depicted by the "N" (No) path from exemplary test logic function 108', if the Buyer Payment Information was not valid, or if the amount of the sale was not authorized, then the exemplary embodiment would notify the Buyer to input valid information (e.g., in exemplary logic function 105'). On the other hand, if, as depicted by the "Y" (Yes) path from exemplary test logic function 108', the Buyer Payment Information was verified as being valid and the amount of the sale is authorized, then the exemplary embodiment would request 109' that the relevant Payment Entity (e.g., one of exemplary Payment Entities 180a-180n) put a Hold on a payment authorization against an account associated with the Buyer according to the Buyer Payment Information for the relevant advertised sale amount.

Continuing with reference to FIGS. 2A-2C, as depicted in exemplary logic function 201, the exemplary online embodiment would generate an exemplary Buyer identifier (sometimes referred to herein as a "Buyer-Acceptance-Indicator").

As previously mentioned above, in the exemplary embodiment, the exemplary Buyer identifier would be generated by the exemplary online marketplace embodiment to be sufficiently unique to uniquely identify the particular Buyer during a particular period of time. As will be understood by someone with ordinary skill in the art, various forms of a Buyer identifier could be generated without departing from the spirit of the present invention. Some exemplary online marketplace embodiments would generate a Buyer identifier to comprise a human-readable combination of alphanumeric and/or special characters that would itself be a unique identifier during a particular period of time. In such an exemplary embodiment, the exemplary email message that would be sent to the Buyer (see, e.g., element 215, FIGS. 2A-2C), would contain within it the human-readable Buyer identifier. When the Buyer meets the Seller to assess the item, if the Buyer decides to purchase the item, the Buyer could show the Seller the Buyer's email message, or could say the identifier to the Seller, so that the Seller could then provide the Buyer's identifier to the exemplary online marketplace.

Other exemplary online marketplace embodiments would generate a Buyer identifier to comprise a human-readable combination of alphanumeric and/or special characters that would be unique when combined with the Buyer's or Seller's telephone numbers. In such an embodiment, the Seller would need to either email the exemplary online marketplace the Buyer's identifier from the Seller's cell phone, or would need to input the Buyer's identifier and the Seller's cell phone number, such as through a webpage for the exemplary online marketplace.

One exemplary embodiment would generate (create) an exemplary random hash string to identify the transaction; the exemplary embodiment would create a relationship between the transaction/random hash string and both the Buyer's cell phone number and the Seller's cell phone number. Some exemplary embodiments would generate an exemplary random hash string that would uniquely identify a particular transaction for the life of the system. Other exemplary embodiments would generate an exemplary random hash string that would uniquely identify a particular transaction for some period of time. Yet other exemplary embodiments would generate an exemplary random hash string that would uniquely identify a particular transaction when combined with the Buyer's and/or the Seller's cell phone number—in some exemplary embodiments, the combination would be unique for the life of the system; in other exemplary embodiments, the combination would be unique for some period of time.

One exemplary embodiment would generate an exemplary random hash key using a combination of a randomly generated identifier ("UUID") with an internal millisecond timer ("TickCount"). That is, the exemplary random hash key would equal UUID+TickCount.

Another exemplary embodiment would generate an exemplary random hash key using just the randomly generated UUID.

Depending on the embodiment, the exemplary random hash key could be rather long. The longer the hash key, the more difficult it might be for the user (Seller or Buyer, as the case/embodiment may be) to enter the hash key and/or to enter it accurately. As an alternative to sending the entire exemplary random hash key to the Buyer, some exemplary embodiments would also generate a shorter "PIN" code or key and would communicate only the PIN code/key to the Buyer, such as in an email to the Buyer's cell phone. In one such embodiment, the PIN code/key would be generated to be a unique identifier of the transaction for the particular Seller—that is, the PIN code/key would be unique for the particular Seller's cell phone number. In another such embodiment, the PIN code/key would be generated to be a unique identifier of the transaction for the particular Buyer and for the particular Seller—that is, the PIN code/key would be unique for the particular Buyer's cell phone number and for the particular Seller's cell phone number.

Yet other exemplary online marketplace embodiments would generate a Buyer identifier (a Buyer-Acceptance-Indicator) that would comprise a machine-readable code, such as a machine-readable barcode or other machine-readable symbology, whether of a type now known or in the future discovered. In such an exemplary embodiment, the exemplary email message that would be sent to the Buyer (see, e.g., element 215, FIGS. 2A-2C), would contain within it the machine-readable barcode or other machine-readable symbology. In such an embodiment, when the Buyer agrees to purchase the item, the Buyer would need to allow the Seller to use the Seller's cell phone, such as an intelligent cell phone with an infrared or other scanning device, or a digital camera, to scan or take a photographic image of the machine-readable barcode or other machine-readable symbology. The Seller would then use the Seller's cell phone to email the scanned/photographed information from the cell phone's scanning/photographing of the machine-readable barcode or other machine-readable symbology to the exemplary online marketplace.

Yet other exemplary online marketplace embodiments would generate a Buyer-Acceptance-Indicator that would comprise an image that could comprise a picture, or a combination of a picture and a phrase.

Although not shown in FIGS. 2A-2C, an alternative to exemplary logic function 201 would alternatively, or in addition to generating a Buyer-Acceptance-Indicator, would generate an exemplary Seller identifier (sometimes referred to herein as a "Seller-Transaction-Complete-Indicator") that would be generated in much the same ways as described above regarding exemplary generation of a Buyer-Acceptance-Indicator, and would, for example, be sufficiently unique to uniquely identify the particular Seller and the particular transaction by the Seller during a particular period of time.

Continuing with reference to FIGS. 2A-2C, as depicted in exemplary logic function 210, the exemplary embodiment would store the exemplary Buyer-Acceptance-Indicator (and/or, in other embodiments, the exemplary Seller-Transaction-Complete-Indicator) in a memory storage device, such as in a database, such as illustratively depicted by exemplary transaction information database 111, with a relationship to the Seller's telephone number, and in some embodiments, with a relationship to the Buyer's telephone number, and in some embodiments with a relationship to an identification of the item that is to be purchased; for embodiments that would store the exemplary Seller-Transaction-Complete-Indicator, a relationship between the exemplary Seller-Transaction-Complete-Indicator and the Buyer's telephone number would be stored, because the Buyer would communicate the exemplary Seller-Transaction-Complete-Indicator back to the exemplary online marketplace (e.g., exemplary Company A) to confirm that the local marketplace transaction had taken place (i.e., been consummated).

Some exemplary embodiments would store a relationship between an identifier of the transaction, an identification of the buyer, and an identification of the seller. Some exemplary embodiments would store a relationship between the identifier of the transaction, the identification of the buyer, the identification of the seller, and an identification of the item.

As will be understood by someone with ordinary skill in the art, any of various types of identifiers could be used to identify an item, including but not limited to, for example, SKU, ISBN (e.g., for books (International Standard Book Number)), a customized system-specific identifier, an Internet address at which a seller posts an advertisement for the item, or various other types and/or combination(s) of product identifiers.

Continuing with reference to FIGS. 2A-2C, as depicted in exemplary logic function 215, the exemplary embodiment would communicate, such as through an email, to the Buyer an exemplary Buyer's "Order Confirmation" that would comprise the exemplary generated Buyer's identifier (Buyer-Acceptance-Indicator) (which in the exemplary embodiment would be stored on exemplary Transaction Information database 111); the exemplary embodiment would also communicate, such as through an email, to the Seller, an exemplary Seller's "Order Confirmation" that would comprise order details, and if appropriate, an exemplary Seller-Transaction-Complete-Indicator.

Continuing with reference to FIGS. 2A-2C, as depicted in exemplary logic function 120', the Buyer and Seller would agree, such as through telephone calls, emails, anonymous marketplace emails, or the like, to meet to transact the exchange of the item to be purchased, for payment authorization.

When the Buyer and Seller meet, the Buyer would assess the item to be purchased as depicted in exemplary logic function 125' to determine whether or not to complete the transaction.

As depicted in exemplary test function 125", if the Buyer declines to accept (a "No" path), then the Buyer would not agree to complete the transaction 140', the Buyer and/or the Seller would notify the exemplary online marketplace (e.g., exemplary Company A) that the transaction was not completed 145', and the exemplary embodiment would terminate the transaction, and would not submit any charges against the Buyer's previously-indicated payment method 150'/155'; the exemplary Transaction Information database 111 and the exemplary Payment Information database 106 would be updated to show that the transaction had been terminated; and as depicted in exemplary logic function 160', the exemplary embodiment would notify the relevant Payment Entity (e.g., one of exemplary Payment Entities 180a-180n) to remove the previously-requested payment authorization Hold against the relevant Buyer's payment information and account.

As previously mentioned above, in an exemplary embodiment that placed an exemplary Hold on a payment authorization for a relevant tentative sale amount against a particular Buyer's account for a pre-established maximum number of days, e.g., for an exemplary pre-established maximum period of seven (7) days, if confirmation of the consummation of the relevant transaction between the Buyer and the Seller (such as receipt of the Seller's input of the Buyer's identifier, or in other embodiments as described elsewhere herein, receipt from the Seller and/or the Buyer of an authentic identifier) had not been received (i.e., the "Y" path from exemplary function 125" depicted in FIGS. 2A-2C) before the expiration of the pre-established maximum number of days, then the exemplary embodiment depicted in FIGS. 2A through 2C would follow the exemplary "N" path from exemplary test function 125", taking the expiration of the pre-established maximum number of days as an indication that the Buyer had not agreed to complete the transaction 140' and as a default notification by the Buyer and/or the Seller that the transaction was not completed 145'; the exemplary embodiment would terminate the transaction, and would not submit any charges against the Buyer's previously-indicated payment method 150'/155'; the exemplary Transaction Information database 111 and the exemplary Payment Information database 106 would be updated to show that the transaction had been terminated; and as depicted in exemplary logic function 160', the exemplary embodiment would notify the relevant Payment Entity (e.g., one of exemplary Payment Entities 180a-180n) to remove the previously-requested payment authorization Hold against the relevant Buyer's payment information and account.

If, on the other hand, confirmation of the consummation of the relevant transaction between the Buyer and the Seller is received by such an exemplary embodiment such as depicted in exemplary test function 125" depicted in FIGS. 2A-2C before the expiration of the pre-established maximum period of time, then the exemplary embodiment would proceed with the exemplary "Y" path from exemplary test function 125" as described further below.

As depicted in exemplary test function 125", if the Buyer decides to accept (a "Yes" path), then the Buyer would agree to complete the transaction 130', the Buyer would provide the Seller with the Buyer's identifier (Buyer-Acceptance-Indicator) 135', and the Seller would communicate the Buyer's identifier (Buyer-Acceptance-Indicator) to the exemplary online marketplace (e.g., exemplary Company A) 220.

In the event that the Buyer had deleted the communication (e.g., the email, or text message) that provided the Buyer's identifier (Buyer-Acceptance-Indicator), the exemplary embodiment would provide for Buyer communications (using any of various media and forms as illustratively described herein) to request another copy of the Buyer's identifier (Buyer-Acceptance-Indicator).

In order to communicate a human-readable, e.g., alphanumeric/special character, Buyer's identifier (Buyer-Acceptance-Indicator) to the exemplary online marketplace, the Seller would send the exemplary online marketplace an email, text message, or Instant message, using the Seller's cell phone, or could call a telephone number associated with the exemplary online marketplace and verbally state the Buyer's identifier (Buyer-Acceptance-Indicator), or could use the Seller's phone's keypad to input the Buyer's identifier (Buyer-Acceptance-Indicator).

In order to communicate an image-based Buyer-Acceptance-Indicator, the Seller could photograph the image (including with a corresponding phrase, as the case may be) as it would be shown to the Seller by the Buyer on the display of the Buyer's cell phone; the Seller would then communicate the image (including with a corresponding phrase, as the case may be) to the exemplary online marketplace (e.g., exemplary Company A) to confirm consummation of the local marketplace transaction.

Alternatively, in order to communicate such an image-based Buyer-Acceptance-Indicator, the Seller could sign on to a Mobile App (as described in more detail below), and select an image and a phrase from a list of presented images and phrases that match the image and phrase presented in the Buyer-Acceptance-Indicator.

As will be understood by someone with ordinary skill in the art, there would be other ways, without departing from the spirit of the present invention, for exemplary embodiments to provide for Seller communication of such an image/phrase Buyer-Acceptance-Indicator. For example, the Seller could call a telephone number associated with the online marketplace and could select from a verbal list of image descriptions, an image description that matches the image presented in the Buyer-Acceptance-Indicator; and the Seller could select from a verbal list of phrases, the phrase that matches the phrase presented in the Buyer-Acceptance-Indicator, or alternatively, the Seller could use the cell phone's keypad to key in the phrase presented in the Buyer-Acceptance-Indicator.

The exemplary description above regarding generating and sending email messages to a Buyer, and receiving email messages from a Seller to confirm consummation of a local marketplace transaction are illustrative and non-limiting. Other ways of communicating the transaction identifier (random hash string, PIN code/key, or machine-readable symbology) could be used without departing from the spirit of the present invention. For example, the above-mentioned identifier (human-readable or machine-readable) could be communicated to a Buyer in a text message, or Instant Messaging, and could similarly be communicated to the exemplary online marketplace by a Seller using text or Instant messaging. As yet another alternative, a mobile application (Mobile App) could be provided; the Buyer would be provided with a sign-in PIN code/key. By signing into the Mobile App using the Buyer's sign-in PIN code/key, the Mobile App would present a screen that would comprise a Buyer-Acceptance-Indicator that would comprise, for example, a randomly generated hash string, a PIN code/key for the transaction, or a machine-readable symbology.

For a machine-readable symbology, the Seller could use the Seller's cell phone scanning device or digital camera to scan/photograph the Buyer-Acceptance-Indicator from the screen of the Buyer's cell phone. The Seller would then need to communicate that Buyer-Acceptance-Indicator to the online marketplace, such as for example, by signing into the Mobile App using a sign-on Seller's PIN code/key, and either typing in the Buyer-Acceptance-Indicator, or pasting a scanned-in or photographed copy of the Buyer-Acceptance-Indicator. Alternatively, as could be done with other embodiments described herein, the Seller could call a telephone number associated with the online marketplace and verbally repeat a code or type in a code using the phone keypad; or the Seller could text message the code to the online marketplace, or could access the online marketplace website (whether a full website or a mobile version the website) and provide the Buyer-Acceptance-Indicator.

As will be understood by someone with ordinary skill in the art, the description herein regarding exemplary use of Buyer and Seller cell phones is illustrative and not a limitation of the invention. Rather, intelligent devices that are capable of communicating using a communications network, such as PDA's (Personal Digital Assistants), IPADs®, and other such devices whether now known or in the future discovered, could be used.

Further alternatives for communicating the Buyer-Acceptance-Indicator to the Buyer (or in an alternative embodiment, communicating a Seller-Transaction-Complete-Indicator to the Seller), and/or for receiving a corresponding confirmation of the consummation of the relevant local marketplace transaction from the other of the two parties (Buyer or Seller) could include voice mail, automated telephone calls and messages to the Buyer and/or Seller, telephone calls to the Buyer and/or Seller, Mobile Apps, text messaging, Instant messaging, email, local online marketplace email, social media postings (e.g., through TWITTER®, FACEBOOK®, LINKEDIN®, GOOGLE®, or the like), pager communications, fax (facsimile) communications, and/or hardcopy mail.

As a yet further alternative, as compared to a system-generated code, a user (Buyer or Seller) could create their own transaction-specific code (comprising numbers, alphabetic characters, special characters, images (such as images that could be selected from a visual selection menu of images), or a combination of one or more images and text (alphanumeric and/or special characters).

Continuing with reference to FIGS. 2A-2C, as depicted in exemplary test logic function 225, the exemplary embodiment (as implemented by the exemplary online marketplace (e.g., exemplary Company A)) would determine whether or not a transaction confirmation, such as a Seller's communication, had been received. To determine whether or not a transaction confirmation had been received, the exemplary embodiment access the exemplary Transaction Information database 111.

As depicted by the "N" (No) path from exemplary test logic function 225, in the event that the exemplary online marketplace (e.g., exemplary Company A) did not receive any notification from either the Buyer or the Seller within some period of time, one exemplary embodiment would determine that no Seller confirmation of the transaction had been received 280 and would send 285, an exemplary supplemental communication to the Buyer and/or the Seller requesting confirmation that the transaction took place or was declined; the exemplary embodiment would include in the communication to the Buyer the Buyer's identifier.

As depicted in exemplary test logic function 225', the system would again access the exemplary Transaction Information database 111 to determine whether or not a transaction confirmation had been received. In the event that the exemplary online marketplace (e.g., exemplary Company A) still did not receive any notification from either the Buyer or the Seller (i.e., the "N" path (the No path)) from exemplary test logic function 225'), such as within some period of time (such as, for example, within an exemplary pre-established maximum number of days, as previously mentioned above), one exemplary embodiment would then automatically terminate the transaction, would not submit any charges against the Buyer's previously-indicated payment method as depicted in exemplary function(s) 150"/155"/160" and would update the exemplary Transaction Information database 111 and the exemplary Payment Information database 106 to show that the transaction had been terminated; as part of exemplary logic function 160", the exemplary embodiment would notify the relevant Payment Entity (e.g., one of exemplary Payment Entities 180a-180n) to remove the previously-requested payment authorization hold against the relevant Buyer's payment information and account.

If, on the other hand, as depicted by the "Y" path (the Yes path) from exemplary test logic function 225, the exemplary online marketplace embodiment determines that a transaction consummation confirmation has been received (and, in some exemplary embodiments, has been received within the previously-mentioned pre-established number of days), then the exemplary embodiment would receive the transaction consummation confirmation (e.g., would receive the Seller's communication of the Buyer's identifier (Buyer-Acceptance-Indicator), and/or would receive the Buyer's communication of the Seller-Transaction-Complete-Indicator) 230, and would compare the Seller's (and/or Buyer's) input with information on the aforementioned exemplary Transaction Information database 111 in order to attempt to find a match between the Seller's input of the Buyer's identifier (Buyer- Acceptance-Indicator) and the Seller's telephone number as stored on the aforementioned database.

As depicted in exemplary logic function 240, the exemplary embodiment would notify both the Buyer and the Seller that a transaction confirmation had been received and would update the exemplary Transaction Information database 111.

Then, if based on the comparison done as depicted in exemplary logic function 230, it is determined as depicted in exemplary test function 245 that the identifier provided (the Seller's communication of the Buyer's identifier (Buyer-Acceptance-Indicator), and/or the Buyer's communication of the Seller-Transaction-Complete-Indicator) matches the information stored on the database, then as depicted by the "Y" (Yes) path from exemplary test function 245, it would be determined 250 that the identifier that had been provided is correct, the exemplary embodiment would send 255 an exemplary "Transaction Confirmed" communication to both the Buyer and the Seller and would update the exemplary Transaction Information database 111, the exemplary embodiment would charge 290 the Buyer's previously-indicated payment method for the full purchase price of the item and would update the exemplary Transaction Information database 111 and the exemplary Payment Information database 106. As depicted by exemplary logic function 292, in order to charge the Buyer, the exemplary embodiment would authorize the relevant Payment Entity (e.g., one of exemplary Payment Entities 180a-180n) to charge the Buyer's payment method and account for the advertised sale amount; the relevant Payment Entity would confirm to the exemplary embodiment that payment had been charged; the exemplary embodiment would then notify 294 both the Buyer and Seller that payment had been made and confirmed. Then, the exemplary embodiment would, as depicted in exemplary logic function 295, deduct from the full purchase price of the item a commission for exemplary Company A, and would deposit the remaining amount into an account for the Seller.

Some exemplary embodiments would facilitate a revision of the sale price, such as may occur with local marketplace transaction negotiations. In one such exemplary embodiment, the Seller would be allowed to input an actual sale price that would be lower than the advertised sale amount; the exemplary embodiment would email the Seller's input of the actual sale price to the Buyer for confirmation; the Buyer's confirmation of the actual sale price would cause the exemplary embodiment to notify the relevant Payment Entity (e.g., one of exemplary Payment Entities 180a-180n) with an authorization to the relevant Payment Entity (e.g., one of exemplary Payment Entities 180a-180n) to charge the Buyer's payment method and account for the actual sale price and to remove any Hold on any amount difference between the actual sale price and the advertised sale amount.

In the exemplary embodiment, the exemplary "Transaction Confirmed" communication to the Buyer would comprise, among other things, some identifier, such as, for example, an exemplary Buyer confirmation password or passphrase that had previously been selected by the Buyer, or an exemplary Buyer confirmation image that had previously been selected by the Buyer, or some other exemplary Buyer confirmation identifier that had previously been selected by the Buyer; the exemplary "Transaction Confirmed" communication to the Seller would similarly comprise, among other things, some identifier, such as, for example, an exemplary Seller confirmation password or passphrase that had previously been selected by the Seller, or an exemplary Seller confirmation image, or some other exemplary Seller confirmation identifier that had previously been selected by the Seller. The exemplary respective Seller and Buyer confirmation identifiers would be provided to provide authenticity to the respective Seller and Buyer of the Transaction Confirmed communication so that the respective Seller and Buyer would know that the Transaction Confirmed communication had been sent by the exemplary online marketplace as opposed to having been sent by some unscrupulous party, such as by an unscrupulous Buyer or Seller.

If on the other hand, based on the comparison done as depicted in exemplary logic function 230, it is determined as depicted in exemplary test function 245 that the identifier provided (the Seller's communication of the Buyer's identifier (Buyer-Acceptance-Indicator), and/or the Buyer's communication of the Seller-Transaction-Complete-Indicator) did not match the information stored on the database, then as depicted by the "N" (No) path from exemplary test function 245, it would be determined 260 that the identifier that had been provided was incorrect, the exemplary embodiment would, as depicted in exemplary logic function 265, notify the Seller that the incorrect identifier had been received, would update the exemplary Transaction Information database 111, and would again send the Buyer the correct Buyer identifier. At that point, it would be possible as depicted in exemplary logic function 270 for the Buyer to provide the Seller with the correct identifier and for the Seller to provide the correct Buyer identifier to the exemplary online marketplace. Then, as depicted in exemplary logic function 275, the exemplary online marketplace (e.g., exemplary Company A) would access the exemplary Transaction Information database 111 and would confirm that the identifier provided is correct as depicted by the "Y" (Yes) path from exemplary test logic function 245', and if so, would send an exemplary "Transaction Confirmed" notification to both the Buyer and the Seller and would update the exemplary Transaction Information database 111; the exemplary embodiment would charge 290 the Buyer's previously-indicated payment method for the full purchase price of the item and would update the exemplary Transaction Information database 111 to reflect that the transaction had been confirmed as having been completed and would update the exemplary Payment Information database to reflect the charge to the Buyer's payment method account, the exemplary embodiment would, as depicted in exemplary logic function 295, deduct from the full purchase price of the item a commission for exemplary Company A, and would deposit the remaining amount into an account for the Seller. As will be understood by someone with ordinary skill in the art, charges to a Buyer's payment method account would be processed according to communications with appropriate credit card, debit card and/or other financial payment entities.

On the other hand, if it were determined that the provided identifier was still not correct (as depicted by the "N" (No) path from exemplary test logic function 245', the exemplary embodiment would terminate the transaction and would not charge the Buyer as depicted in exemplary logic function 150''' and 155'''/160'''; the exemplary embodiment would update the exemplary Transaction Information database 111 and the exemplary Payment Information database 106 to show that the transaction had been terminated; as part of exemplary logic function 160''', the exemplary embodiment would notify the relevant Payment Entity (e.g., one of exemplary Payment Entities 180a-180n) to remove the previously-requested payment authorization hold against the relevant Buyer's payment information and account. In such event, some exemplary embodiments would flag the Seller for more stringent review for future proposed transactions.

Some exemplary embodiments would further provide for the Buyer and/or Seller to communicate to the exemplary online marketplace a scheduled date and time for meeting. Some exemplary embodiments would automatically send the Buyer the Buyer's identifier just prior to the scheduled meeting and would automatically send the Seller a reminder of the scheduled meeting and that the transaction completion must be confirmed in order for payment to the Seller to be authorized. Some exemplary embodiments would add an agreed-to meeting location, date and time to user calendars, such as, for example, an exemplary online-marketplace website meeting calendar, personal computer calendars, or calendars associated with email accounts for the Buyer and Seller (e.g., GOOGLE® CALENDAR).

In some exemplary embodiments, the form and/or media for such communications between the exemplary online marketplace and the Buyer and Seller would be definable by the respective Buyer and Seller. In some exemplary embodiments, the form and/or media for such communications could be limited depending on the type of device that the respective Buyer and/or Seller would be using. For example, for a Buyer and Seller that are each using intelligent phones with digital cameras or scanning devices, the exemplary embodiment would agree, if requested, to provide the Buyer identifier in the form of a machine-readable barcode; but if one or the other of the Buyer's or Seller's phones were not enabled to take digital photographs or scan images, then the exemplary embodiment would limit the form, and would, for example, communicate by email or text message.

Payment Processor Embodiments

Some online companies may not be in a position to provide payment completion through their own websites. Or, for other reasons, some online companies may prefer to operate through what will be referred to herein as "Payment Processors." In the context of describing alternative exemplary embodiments, the term Payment Processor will be understood to mean an online forum, such as an online Internet website, that would provide for user payment to third-party companies for purchases made through those third-party companies. An exemplary embodiment of the present invention could be implemented for payment to exemplary Company A through an exemplary Payment Processor.

A Payment Processor may refuse to process payments for an exemplary Company A unless and until the exemplary Company A can provide confirmation that each online transaction for which Company A demands payment has occurred. As was previously mentioned above, in circumstances where an online Company is itself responsible for selling an item, and where the online Company itself is responsible for shipping the item that is being sold to the purchaser, such an online Company may tender to the relevant online Payment Processor as confirmation that the relevant online transaction has been consummated, a shipping document, such as, for example, a Delivery Confirmation number associated with a shipping of the item.

Even with such a shipping-document-based transaction confirmation basis as described above, a purchaser may contest ever receiving the item, or alternatively, once the purchaser receives the item, may find it unacceptable and want to return it. When a purchaser returns an item, or contests ever receiving the item, a Payment Processor must process a charge back from the relevant online merchant (e.g., the exemplary Company A) and adjust the purchaser's payment method account for the amount of the refund/ charge-back.

However, online companies, such as the exemplary Company A, that do not actually ship items to purchasers, would not be able to provide any type of shipment confirmation, and therefore, would need some other form of transaction consummation confirmation, to provide to, and that would be acceptable by, Payment Processors.

As will be described further below, exemplary embodiments of the present invention could be implemented in various ways to provide online marketplace companies, such as the exemplary Company A, that do not actually ship items to purchasers, with a reliable form of transaction consummation confirmation, that the online marketplace company could provide to, and that would be acceptable by, Payment Processors to confirm transaction consummation and provide a basis for the Payment Processor to charge the relevant purchaser's payment method account, and pay the relevant online marketplace company, or alternatively, pay the actual seller directly.

In one exemplary Payment Processor embodiment, an exemplary Payment Processor would store the Buyer's payment information on the Payment Processor's own website, but would require that exemplary online marketplace Company A (or other "Third-Party Payment Aggregator") implement an exemplary embodiment of the present invention on Company A's own website. In such an exemplary online-marketplace-based-Payment-Processor embodiment, the exemplary Payment Processor would agree to process payments for the relevant online marketplace (e.g., exemplary Company A) but would require that the relevant online marketplace process transaction arrangements substantially as described above with regard to FIG. 1 and could require that the relevant online marketplace process transaction consummation confirmations substantially as described previously above with regard to FIGS. 2A-2C.

Figure 3:
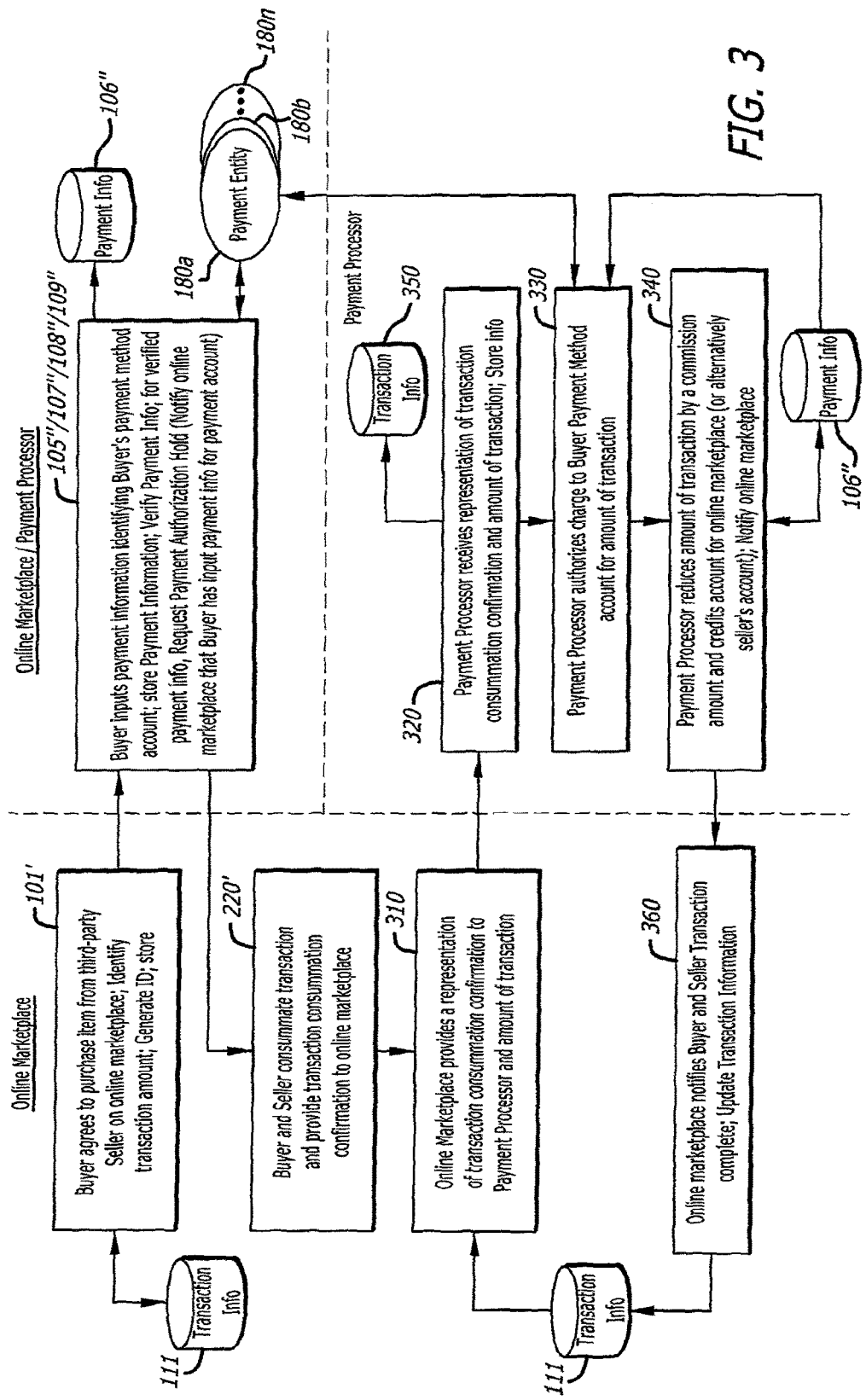
FIG. 3 depicts alternative high-level logic functions for an exemplary Payment Processor to process payments for third-party online marketplace companies in an exemplary embodiment of the present invention.

FIG. 3 depicts alternative high-level logic functions for an exemplary Payment Processor to process payments for third-party online marketplace companies in an exemplary embodiment of the present invention. One difference, or additional process, in such an exemplary online-marketplace-based-Payment-Processor embodiment, not shown in FIG. 1, would be that the relevant exemplary online marketplace would provide the Buyer's payment information and an amount for the transaction (see, e.g., the exemplary logic function identified by element number 105"/107"/ 108"/109" in FIG. 3) to the relevant Payment Processor.

Alternatively, in some embodiments, when a Buyer is to provide payment information, the payment information input pages could be provided so that the Buyer would directly input the payment method information into the Payment Processor's system as illustratively depicted in exemplary logic function 105"/107"/108"/109" depicted in FIG. 3. As part of exemplary logic function 105"/107"/108"/ 109" depicted in FIG. 3, the exemplary embodiment would verify payment information through communications with the relevant Payment Entity (e.g., one of exemplary Payment Entities 180a-180n), and for verified payment information, would request a Payment Authorization Hold for the amount of the proposed sale amount for the item. Payment information would be stored (whether by the exemplary online marketplace or by the exemplary Payment Processor) on an exemplary Payment Information database 106".

In one exemplary embodiment where the Buyer inputs payment method information directly into the Payment Processor's system/website, the Payment Processor would return the Buyer to the online marketplace website when the payment method information input had been completed, and would notify the online marketplace that the payment information had been successfully input for the relevant payment amount.

As compared to the processes depicted in FIGS. 1 and 2A-2C, another difference, or additional process, would be that the relevant exemplary online marketplace would provide the relevant Payment Processor with confirmation that a transaction had been consummated as described further below and as illustratively depicted at a high level by exemplary logic function 310 in FIG. 3.

In one exemplary online-marketplace-based-Payment-Processor embodiment, the exemplary Payment Processor would require that the relevant exemplary online marketplace notify the Payment Processor of the transaction completion confirmation as illustratively depicted in exemplary logic function 310 depicted in FIG. 3; upon receipt 320 of a transaction completion confirmation and an amount of the transaction from the relevant exemplary online marketplace, the exemplary Payment Processor would store information regarding the transaction in an exemplary database 350, and would access the exemplary Payment Information database 106" and would charge 330 the Buyer's account for the amount of the transaction, including communicating an authorization to the relevant Payment Entity (e.g., one of exemplary Payment Entities 180a-180n) to charge the Buyer's payment method and account for the amount of the transaction; as depicted in exemplary logic function 340, the exemplary Payment Processor would reduce the amount of the transaction by an amount of a commission, which would be deposited to the behalf of the Payment Processor, would then credit an account associated with the exemplary online marketplace (or alternatively, directly to an account for the third-party Seller) for the remaining amount, and would notify the exemplary online marketplace that payment for the transaction had been completed. The exemplary online marketplace would then notify 360 the Buyer and Seller that the transaction had been completed and would update transaction information on the exemplary Transaction Information database 111.

In some exemplary online-marketplace-based-Payment-Processor embodiments, the transaction complete confirmation number provided to the Payment Processor by the relevant exemplary online marketplace and saved by the exemplary Payment Processor would be unique, or substantially unique, during, for example, a particular period of time. The term substantially unique is used herein to mean that the relevant identifier is capable of identifying a particular transaction as distinct from other transactions, whether on its own, or when combined with some other factors, such as a date, a time, a date and a 5, or other such information. Even though the transaction complete confirmation number provided to the Payment Processor would be substantially unique, it would not necessarily be the same as either the above-described exemplary "hash" string, or the exemplary PIN code/key. Rather, the exemplary online marketplace would conduct the exemplary transaction consummation confirmation process substantially as described above with regard to FIGS. 2A-2C, but, as an alternative to providing the Payment Processor with the above-described exemplary "hash" string, or the exemplary PIN code/key, could instead provide the exemplary Payment Processor with a separate alternative identifier for the same transaction.

In the event that the exemplary online marketplace provides an alternative transaction identifier as confirmation of a transaction (i.e., as a transaction complete confirmation number) that is not the same as either the above-described exemplary "hash" string, or the exemplary PIN code/key, the exemplary Payment Processor would require that, and the exemplary online marketplace (such as exemplary Company A) would, store a relationship between the transaction complete confirmation number provided to the Payment Processor by the exemplary online marketplace (such as exemplary Company A) and the Buyer identifier, the Seller identifier, the Buyer telephone number and the Seller telephone number. In the event that a chargeback (e.g., a return, or a Buyer "stop payment") issued, the Payment Processor would provide the transaction complete confirmation number to the exemplary online marketplace (such as exemplary Company A) so that the exemplary online marketplace (such as exemplary Company A) could apply the appropriate adjustment in the database(s) for the exemplary online marketplace system.

Figure 4:
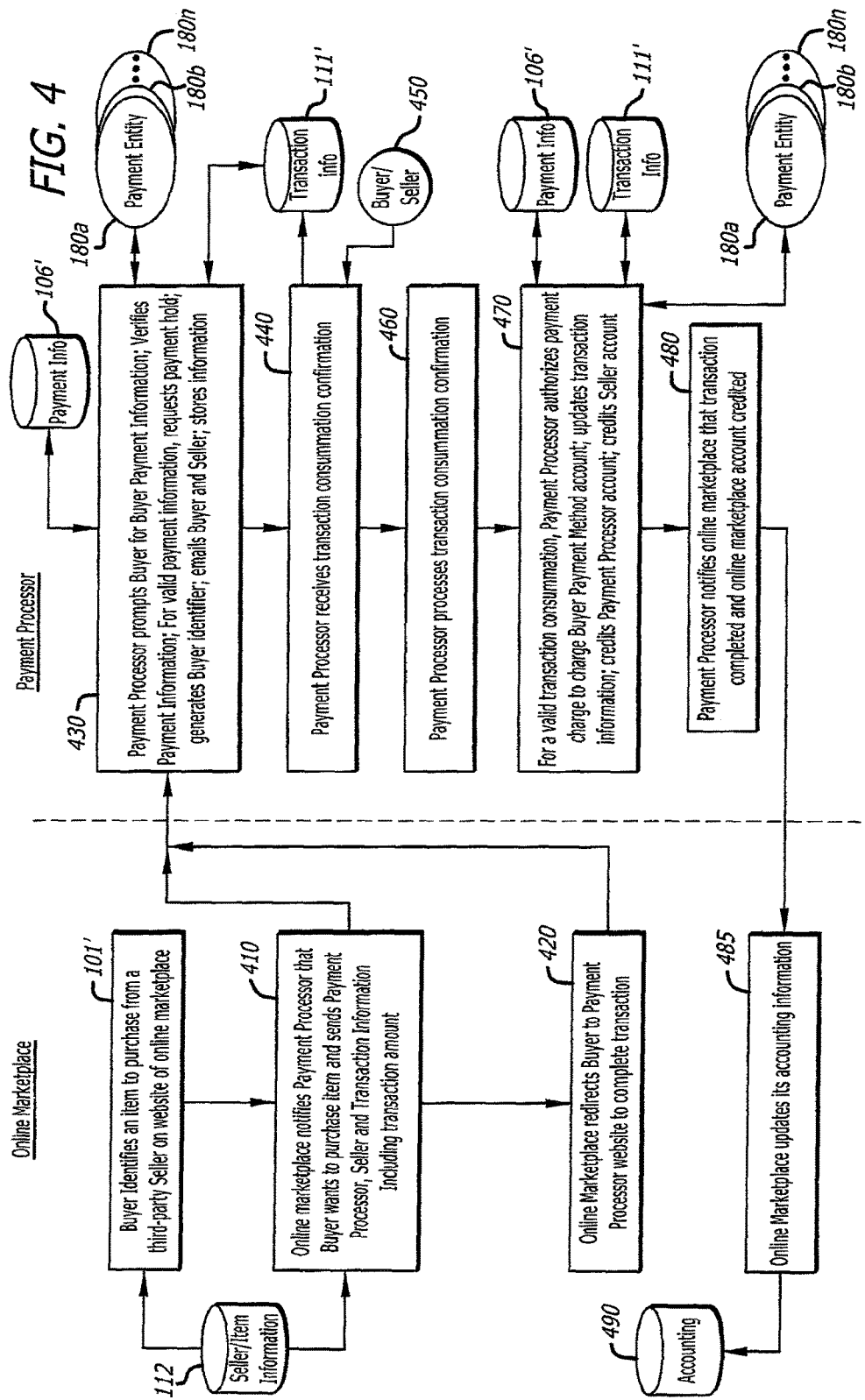
FIG. 4 depicts further alternative high-level logic functions for an exemplary Payment Processor for processing a confirmation by a party to a local marketplace transaction of a consummation of the local marketplace transaction in an exemplary embodiment of the present invention.

As an alternative to each online marketplace implementing a separate embodiment of the present invention, one alternative embodiment would be implemented through the Payment Processor's own website. FIG. 4 depicts further alternative high-level logic functions for an exemplary Payment Processor for processing a confirmation by a party to a local marketplace transaction of a consummation of the local marketplace transaction in an exemplary embodiment of the present invention.

As will be described further below, in one such self-implemented Payment Processor embodiment, the Payment Processor would store Seller and Buyer information, including the Buyer's payment information, and transaction verifications on the Payment Processor's own website. In such an embodiment, once an exemplary online marketplace has identified a Buyer who has agreed to tentatively purchase an item from a Seller identified on the website of the exemplary online marketplace, the rest of the transaction completion verification process that had been depicted and described previously above with regard to FIGS. 2A-2C would be handled through the Payment Processor's website rather than through the website of the exemplary online marketplace. In such an embodiment, the exemplary Payment Processor would stand in the shoes of the exemplary Company A depicted in FIGS. 2A-2C substantially beginning with exemplary logic function 105'. In such an embodiment, the exemplary Payment Processor would notify the exemplary online marketplace when a transaction has been completed and would credit an account for the behalf of the exemplary online marketplace with some percentage of the transaction amount for such a completed transaction. In such an embodiment, the exemplary online marketplace would essentially be outsourcing confirmation of transactions and payment for such transactions to the exemplary Payment Processor.

One exemplary self-implemented Payment Processor embodiment is illustratively depicted in FIG. 4. As depicted in FIG. 4, an exemplary Buyer would search or browse the website of an exemplary online marketplace (as illustratively depicted by exemplary Seller/Item Information database 112) and would identify 101' an item to purchase from a third-party Seller.

As illustratively depicted in exemplary logic function 410, the exemplary online marketplace would notify the relevant Payment Processor that the Buyer wants to purchase a particular item from a particular third-party Seller and would send the relevant Payment Processor information regarding the Seller, the item and the proposed transaction, including a transaction amount. Then, as illustratively depicted in exemplary logic function 420, the exemplary online marketplace would redirect the Buyer to the Payment Processor's website to complete the transaction.

Then, as illustratively depicted in exemplary logic function 430, the exemplary Payment Processor would prompt the Buyer for Buyer Payment Method information, would verify the payment information with the relevant Payment Entity (e.g., one of exemplary Payment Entities 180a-180n), for valid payment information, would request the relevant Payment Entity (e.g., one of exemplary Payment Entities 180a-180n) to place an authorization hold on the Buyer's payment method and account for the relevant amount of the transaction, would generate Buyer identifier, would email the Buyer and the Seller the information previously described above regarding, for example, a Buyer identifier (and/or a Seller identifier), and would store the payment and transaction information on databases, such as exemplary Payment Information Database 106' and exemplary Transaction Information Database 111', on the Payment Processor's website. That is, once the exemplary online marketplace redirects the Buyer to the Payment Processor's website, the rest of the transaction completion verification process that had been depicted and described previously above beginning substantially with exemplary logic function 105' illustratively depicted in FIGS. 2A-2C, would be handled through the Payment Processor's website rather than through the website of the exemplary online marketplace.

The processes beginning substantially with exemplary logic function 105' illustratively depicted in FIGS. 2A-2C are illustratively summarized for the exemplary Payment Processor embodiment as exemplary summary logic functions 430, 440 (Payment Processor would receive transaction consummation confirmation from Buyer/Seller 450), 460 (Payment Processor would process transaction consummation confirmation), and 470 (For a valid transaction consummation confirmation, the Payment Processor would authorize the relevant Payment Entity (e.g., one of exemplary Payment Entities 180a-180n) to charge the Buyer Payment Method Account for the transaction amount; updates transaction information, and would credit an account for the Payment Processor with a percentage of the transaction amount and credits the Seller's account for the remainder, minus a percentage for the online marketplace). Once the transaction has been completed, the exemplary Payment Processor would then notify 480 the relevant online marketplace that the transaction had been completed and would credit an account for the online marketplace with a percentage of the transaction amount. The online marketplace would then update 485 its accounting information in an exemplary Accounting database 490.

Exemplary NFC-Enabled-Gateway Embodiments

In some exemplary embodiments, an exemplary Authentication/Payment system would be provided that would comprise: application software that would be installed on user mobile devices; NFC-payment-enabled gateway devices that would be integrated to communicate with merchant NFC-enabled POS devices; an "app"-provider computer system/device; and an Authentication Computer Device.

In some exemplary embodiments, the exemplary "app"-provider computer system/device would act as the Authentication Computer Device. In other exemplary embodiments, the exemplary gateway devices would act as the Authentication Computer Device.

In such an exemplary embodiment, an NFC-payment-enabled gateway device would be provided that would integrate with a merchant's NFC-enabled POS device to facilitate the merchant's NFC-enabled POS devices to accept mobile payment from devices that are not themselves NFC-payment-enabled In some exemplary NFC-Payment-Enabled Gateway embodiments, an exemplary NFC-Payment-Enabled Gateway device would be provided that would be positioned on, or near, the relevant merchant's exemplary NFC-enabled Point of Service (POS) devices and that would act as a communications gateway between user devices and merchant Point of Service (POS) devices to authenticate a user and a user's device, and thereby authenticate and enable a Virtual NFC-Enabled payment, even by mobile devices that are not themselves, NFC-Payment-Enabled devices.

An exemplary NFC-Payment-Enabled Gateway device (also sometimes referred to herein as a "BOOM BOX™", or as a "BOOM BOX™ Gateway Device") would, for example, comprise an exemplary Bluetooth low-energy communications chip that would facilitate communications with Bluetooth-communication-enabled intelligent phones in a nearby vicinity to the exemplary NFC-Payment-Enabled Gateway device. In some embodiments, an exemplary Bluetooth low-energy communications chip would be programmed to correlate receipt of information with a particular hardware device from which the information had been received, so that when the biometric measurements explained further below are taken, the face of the user that bears the particular hardware device is the facial image that is measured.

A user would use a particular user device, such as, for example, the user's intelligent phone, and would obtain (e.g., download) an installable copy of what will sometimes be referred to herein as the "Virtual NFC-Enabled Payment" applications software (the "app," also sometimes referred to herein as the "BOOM BOX™ app"), e.g., from an "app" store or from a website enabled to provide installable copies of the "app," such as an exemplary "app"-provider computer system.

Figure 5:
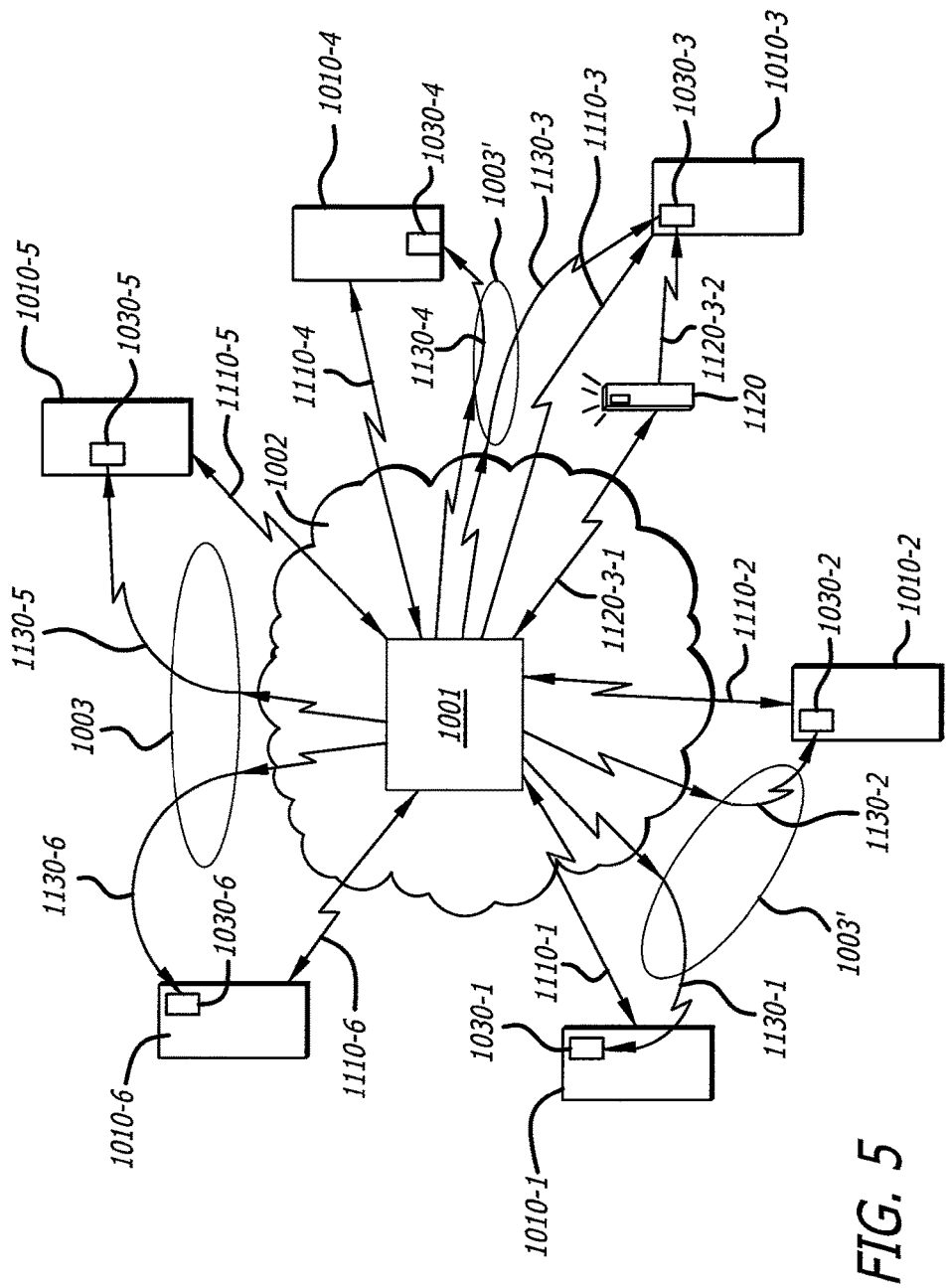
FIG. 5 is a block diagram depicting exemplary communication interfaces between exemplary types of devices in an exemplary embodiment of the present invention.

FIG. 5 is a block diagram depicting exemplary communication interfaces between exemplary types of devices in an exemplary embodiment of the present invention. As illustratively depicted in FIG. 5, an exemplary embodiment "app"-provider system device/system would provide an exemplary Authentication Computer Device 1001 that would be accessible to an exemplary plurality of particular exemplary user devices (e.g., illustratively depicted in FIG. 5 as particular exemplary user devices 1010-1 through 1010-6) via an exemplary communications network 1002, such as the Internet. The exemplary Authentication Computer Device 1001 may be a computer device such as a server computer, a bank of computer devices, such as a bank of server computers, or one or more computer devices, such as server computers, that would operate in the "cloud." Alternatively, in some exemplary embodiments, the NFC-Payment-Enabled Gateway device may also be the exemplary Authentication Computer Device 1001. In other embodiments, the "app"-provider system device/system may also be the exemplary Authentication Computer Device 1001.

As further illustratively depicted in FIG. 5, an exemplary notification system 1003 (and 1003'), such as the "SNS" network, would be used to "push" communications from the exemplary Authentication Computer Device 1001 to particular exemplary user devices, e.g., 1010-1 through 1010-6. As will be understood by someone with ordinary skill in the art, exemplary notification system 1003 (and 1003'), such as the "SNS" network, would detect upon initial registration installation of an exemplary device-specific "app" (as will be described in more detail below) on a particular exemplary user device, a bona fide device-specific "app" identifier; exemplary notification system 3 (and 3'), such as the "SNS" network, would maintain a true identification of the particular exemplary user device on which the exemplary device-specific "app" is installed; and exemplary notification system 1003 (and 1003'), such as the "SNS" network, would maintain a corresponding communications path with the particular exemplary user device on which the device-specific "app" is installed.

As will be understood by someone with ordinary skill in the art, the aforementioned exemplary use of the SNS Network is illustrative and non-limiting. Other types of secure networks, whether now known or in the future discovered, could be used to transmit the aforementioned "push" communication to the expected, actual device that had registered with the "app"-provider computer system.

The exemplary plurality of particular exemplary user devices 1010-1 through 1010-6 illustratively depicted in FIG. 5 would comprise, by way of illustrative, non-limiting example, intelligent phones and/or other devices, whether now known or in the future discovered, that are enabled with network communications technology (such as Internet-enabled) and/or that are enabled with short-range and/or long-range non-network communications, such as, for example, Bluetooth, or other non-network communications technologies whether now known or in the future discovered.

As further depicted in FIG. 5, exemplary intermediary devices, such as, for example, exemplary intermediary device 1120, would be enabled with network communications technology (such as Internet-enabled) and/or with short-range and/or long-range non-network communications, such as, for example, Bluetooth, or other non-network communications technologies whether now known or in the future discovered. In exemplary embodiments, exemplary intermediary devices, such as, for example, exemplary intermediary device 1120 depicted in FIG. 5, may comprise, by way of illustrative, non-limiting examples, a "beacon" device, or a point-of-sale device, or a point-of-entry device, or other type of intermediary device, whether now known or in the future discovered.

Figure 6:
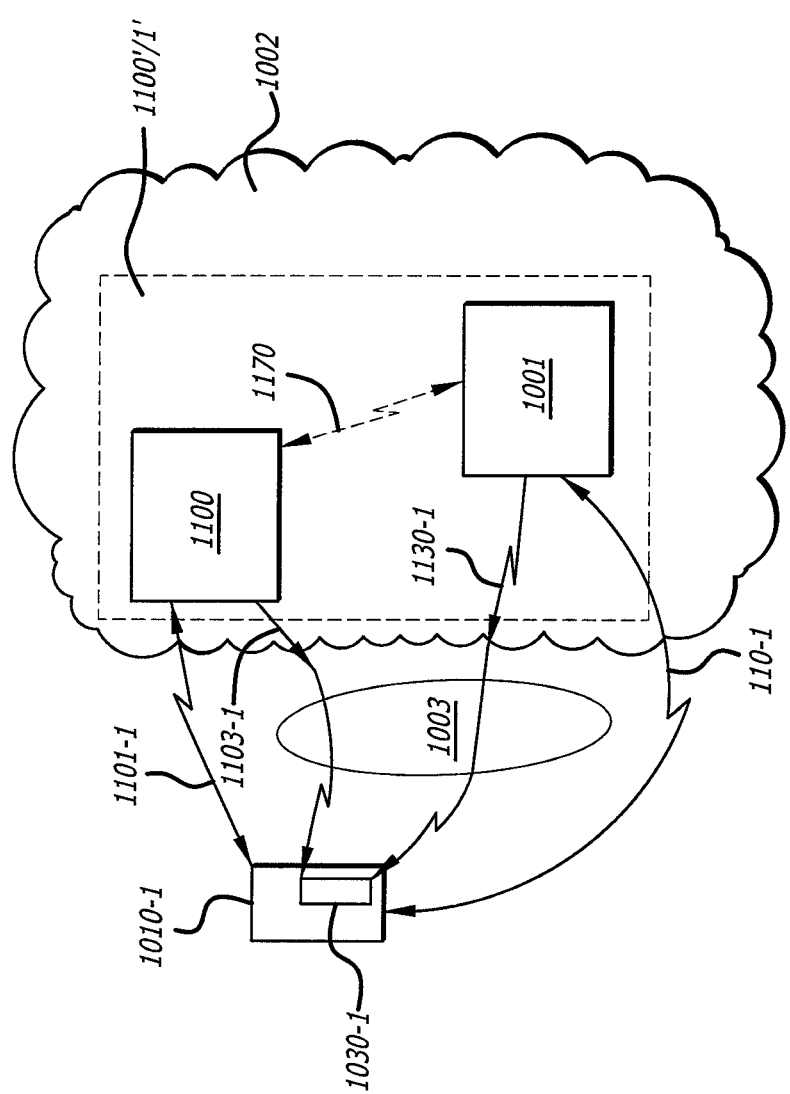
FIG. 6 is a block diagram depicting exemplary high-level communication interfaces between an exemplary "app"-provider computer device (or bank of devices) and an exemplary Authentication Computer Device (or bank of devices) in an exemplary embodiment of the present invention.

As will be understood by someone with ordinary skill in the art, an exemplary "app"-provider computer system would comprise, for example, at least one, and alternatively, a plurality, of computer devices, such as, for example, server computer devices; the exemplary "app"-provider computer system/device (e.g., element 1100 illustratively depicted in FIG. 6) would be operable over a communications network (e.g., element 1002 illustratively depicted in FIG. 6), such as, for example, the Internet; the exemplary "app"-provider computer system/device (e.g., element 1100 illustratively depicted in FIG. 6) would further be operable over an exemplary notification system, e.g., "SNS" (illustratively depicted in FIG. 6 as element 1003).

FIG. 6 is a block diagram depicting exemplary high-level communication interfaces between an exemplary "app"-provider computer device (or bank of devices) and an exemplary Authentication Computer Device (or bank of devices) in an exemplary embodiment of the present invention.

As illustratively depicted in FIG. 6, in some exemplary embodiments, the exemplary "app"-provider computer device (or bank of devices) 1100 may be a separate computer device (or bank of computer devices) from the exemplary Authentication Computer Device (or bank of computer devices) 1001; in other exemplary embodiments, the exemplary "app"-provider computer device (or bank of devices) 1100' may be the same as, or shared in common with, the exemplary Authentication Computer Device (or bank of devices) 1001'.

In an exemplary embodiment, the User would install (e.g., by clicking an onscreen "Install" button) the exemplary "BOOM BOX™ app" on the User's particular user device. During the installation process, the User would be prompted to provide, or alternatively, would be provided, certain information, such as, for example, a User ID and/or a PIN.

In some exemplary embodiments, the exemplary "BOOM BOX™ app" would generate a User ID and/or a PIN; in other embodiments, the exemplary "BOOM BOX™ app" (or the server computer) would prompt the user to input a user-specified User ID and/or a user-specified PIN.

In some exemplary embodiments, a PIN would function as a User ID. In other exemplary embodiments, a user-specific identifier may comprise a device identifier (described further below) for the device that the user uses, and/or an "app"-specific identifier (described further below) for the exemplary "BOOM BOX™ app" that the user installed in the user's intelligent phone (or other type of device, whether now known or in the future discovered).

In some exemplary embodiments, the user's choice of the "Install" button for the exemplary "BOOM BOX™ app" would cause the exemplary "BOOM BOX™ app" or executable software enabled with the "app" to communicate with the "app"-provider computer device (or system). In other embodiments, the "app"-provider server communications software associated with the "BOOM BOX™ app" would be activated after the "BOOM BOX™ app" had been installed on the User's particular user device and once the User opened the "BOOM BOX™ app."

In some exemplary embodiments, the exemplary "app"-provider computer device would provide a device-specific "app" to the User's particular user device to be installed; a device-specific "app" identifier (ID) would be generated by the "app"-provider computer device (which may be a server computer, a bank of server computers, or other type of computer device configuration, whether now known or in the future discovered) and encrypted within the "BOOM BOX™ app" to be installed on the User's particular user device. As will be understood by someone with ordinary skill in the art, as previously mentioned above, in some exemplary embodiments, such a device-specific "app" identifier would be, that is, would function as, the buyer-specific identifier (User ID) previously described hereinabove.

In alternative exemplary embodiments, the information mentioned above as being generated by the "app"-provider computer system/device, would instead be generated by the "app" itself, and would be encrypted by the "app" and stored by the "app," such as in a "secure element" of the User's particular user device.

In some exemplary embodiments, the exemplary "app" being installed on a device would identify a device ID for the particular exemplary user device, and would transmit that device ID to the exemplary "app"-provider computer device.

In some exemplary embodiments, an exemplary device ID for the particular exemplary user device would comprise a UUID (Universally Unique Identifier). In other embodiments, an exemplary device ID for the particular exemplary user device would comprise an exemplary "SNS" device ID.

In some exemplary embodiments, as a user installs the exemplary "BOOM BOX™ app," the exemplary "app"-provider computer device would select, or generate, an exemplary device-specific set of executable program instructions; the exemplary "app"-provider computer device would save a copy of, or an address to, the exemplary device-specific set of executable program instructions in an association with the exemplary device ID and/or the exemplary device-specific "app" identifier (ID). As will be described further below, the exemplary device-specific set of executable program instructions would be used in a "local" authentication process to help ensure that the exemplary "app"-provider computer device, the relevant exemplary BOOM BOX™ Gateway Device, and the relevant merchant Point of Service device, are not communicating with a "spoofed" user device and/or with a "spoofed" "app."

However, in other exemplary embodiments, a device-specific public key would be provided to each device on which an "app" is installed; the executable program instructions comprising the "app" would not be device-specific, but rather, would be the same, or substantially the same, across multiple user devices.

Exemplary Authentication Computer Device and the Exemplary "App" would have Mirror Device-Specific Software In some exemplary embodiments, device-specific "app" ID generation, encryption and/or de-encryption software would be mirrored on both the "app" and the Authentication Computer Device.

As will be understood by someone with ordinary skill in the art, in an exemplary embodiment where the exemplary "app"-provider computer device (or bank of devices) 1100' is the same as, or is shared in common with, the exemplary Authentication Computer Device (or bank of devices) 1001', then the exemplary Authentication Computer Device (or bank of devices) 1001' would have access to (e.g., would "know") information regarding the content or identity of the device-specific "app" ID generation, encryption and/or de-encryption software that the exemplary "app"-provider computer device (or bank of devices)1100' would make available to a User's particular user device.

However, in exemplary embodiments where the exemplary "app"-provider computer device (or bank of devices) 1100 would be a separate computer device (or bank of computer devices) from the exemplary Authentication Computer Device (or bank of computer devices) 1001, one exemplary way in which the device-specific "app" ID generation, encryption and/or de-encryption software would be mirrored on both the "app" and the Authentication Computer Device would be accomplished by the exemplary "app"-provider computer device (or bank of devices) 1100 communicating the device-specific software, or an identification of the device-specific software, or an otherwise indication of the device-specific software, that would be sent to the User's particular user device, to the exemplary Authentication Computer Device (or bank of devices) 1001, such as, for example, using exemplary communication path 1170.

In alternative embodiments, however, the alternative exemplary Authentication System/Computer Device would not mirror the device-specific "app" identifier generation software (whether that software was executed on the user device on which the "app" was installed, or by the "app"-provider system). Instead, the alternative exemplary Authentication System/Computer Device would have been provided with the device-specific "app" identifier (either by the user device on which the "app" was installed, and/or by the "app"-provider system). That is, in some alternative exemplary embodiments, when the Authentication "app" is installed either (or both) the user device and/or the alternative exemplary "app"-provider system would execute executable computer program instructions that would generate the device-specific "app" identifier, and then, depending on the embodiment, either, or both, as the case may be, the user device and/or the alternative exemplary "app"-provider system would communicate or otherwise make available the generated device-specific "app" identifier, to the alternative exemplary Authentication System/Computer Device.

In alternative exemplary embodiments where both the user device and the alternative exemplary "app"-provider system would communicate or otherwise make available the generated device-specific "app" identifier, to the alternative exemplary Authentication System/Computer Device, the alternative exemplary Authentication System/Computer Device would store in a computer-accessible memory storage device a record of the device-specific "app" identifier that it had been provided by the user device, and would store in a computer-accessible memory storage device a record of the device-specific "app" identifier that it had been provided by the alternative exemplary "app"-provider system.

Exemplary Authentication Computer Device and the Exemplary "App"-Provider Computer Device would have Mirror Device-Specific Software In an exemplary embodiment where the exemplary "app"-provider computer device (or bank of devices) 1100 does not actually send a copy of the device-specific software to the exemplary Authentication Computer Device (or bank of devices) 1001, one way that the exemplary "app"-provider computer device (or bank of devices) 1100 would communicate (or otherwise make available) to the exemplary Authentication Computer Device (or bank of devices) 1001, an identification of the device-specific software, or an otherwise indication of the device-specific software, that would be sent to the User's particular user device, would be for the exemplary "app"-provider computer device (or bank of devices) 1100 and the exemplary Authentication Computer Device (or bank of devices) 1001 to maintain mirror program software components; the software components would be associated with component-specific identifiers; the exemplary "app"-provider computer device (or bank of devices) 1100 would communicate, or otherwise make available, to the exemplary Authentication Computer Device (or bank of devices) 1001 one or more component-specific identifiers associated with the program software components that would be sent to the User's particular user device.

As a simple, illustrative, non-limiting example, an exemplary plurality of device-specific "app" ID generation software modules, an exemplary plurality of encryption modules, and/or an exemplary plurality of de-encryption software modules could be maintained by each of the exemplary "app"-provider computer device (or bank of devices) 1100 and the exemplary Authentication Computer Device (or bank of devices) 1001. An exemplary module-specific identifier would be associated with each of the exemplary plurality of device-specific "app" ID generation software modules, the exemplary plurality of encryption modules, and/or the exemplary plurality of de-encryption software modules.

The exemplary "app"-provider computer device (or bank of devices) 1100 would construct (e.g., using a random-number generator) an appropriate set of device-specific "app" ID generation software modules, encryption modules, and/or de-encryption software modules, and would record, such as on a computer-accessible memory storage, the corresponding exemplary module-specific identifiers associated with each of the exemplary modules used in a relationship with an identifier of the particular device on which the constructed "app" would be installed.

The exemplary "app"-provider computer device (or bank of devices) 1100 would communicate, or otherwise make available, to the exemplary Authentication Computer Device (or bank of devices) 1001, a set, or string, of the corresponding exemplary module-specific identifiers (in some embodiments, in encrypted form) associated with each of the exemplary modules used, with a corresponding identifier of the particular device on which the constructed "app" would be installed.

In some exemplary embodiments, an identifier of the particular device on which the constructed "app" would be installed would be equal to a device-specific "app" identifier.

In some exemplary embodiments, then, the exemplary "app"-provider computer device (or bank of devices) 1100 would generate the device-specific "app" identifier. However, in other exemplary embodiments, the exemplary "app"-provider computer device (or bank of devices) 1100 would communicate to the particular exemplary user device, software that would be executed as part of the "app" installation process to generate the device-specific "app" identifier—that software would be installed as part of, or in association with, the installation of the "app;" installation of the "app" and subsequent user registration would cause the device-specific "app" identifier generation software to execute, thereby generating the particular exemplary device-specific "app" identifier, and causing the "app" to communicate the generated particular exemplary device-specific "app" identifier to the Authentication Computer Device (or bank of devices) 1001 (or in some embodiments, to the exemplary "app"-provider computer device (or bank of devices) 1100, which would then communicate the generated particular exemplary device-specific "app" identifier to the Authentication Computer Device (or bank of devices) 1001).

The Buyer's Choice of the "Buyer's Secret"

In some exemplary embodiments, as a user installs the exemplary "BOOM BOX™ app," the user would be prompted to choose whether or not to use a PIN, or alternatively, to allow the user's intelligent telephone to view a "selfie" of the user's facial image and take various biometric measurements of the user's facial image (sometimes referred to herein as a "Pay by Face" option).

In such an exemplary embodiment, the exemplary "BOOM BOX™ app" would record the user's choice; the "BOOM BOX™ app" would communicate the user's choice to the "app"-provider computer device; if the user chose the PIN option, the "BOOM BOX™ app" would record it and would communicate the PIN to the "app"-provider computer device; if the user chose the facial image option, the "BOOM BOX™ app" would be programmed to use the camera lens of the user's intelligent telephone to take, and would take, various biometric measurements of the user's facial image (such as, by way of illustrative, non-limiting example, retina pattern biometric measurements, pupil biometric measurements, iris biometric, and other authentication biometric facial image measurements); the exemplary "BOOM BOX™ app" would transmit those facial image biometric measurements to the "app"-provider computer device, which would in turn, store the user's facial image biometric measurements in a computer-accessible memory storage device in relation to a buyer-specific identifier (e.g., such as a device-specific "app" identifier). In some exemplary embodiments, the "BOOM BOX™ app" would also encrypt and store the user's facial image biometric measurements and/or PIN on a computer-accessible memory storage accessible by the user's intelligent telephone.

An exemplary NFC-Payment-Enabled Gateway device would, for example, comprise a camera lens and image processing software for taking various biometric measurements of a paying user's facial image.

An exemplary NFC-Payment-Enabled Gateway device would, for example, be positioned so that as a paying user approaches the merchant's POS device, the exemplary NFC-Payment-Enabled Gateway device would have a clear view of the paying user's face, so that, for a user that had selected a Pay by Face option, the exemplary NFC-Payment-Enabled Gateway device would scan the user's face.

Figure 8:
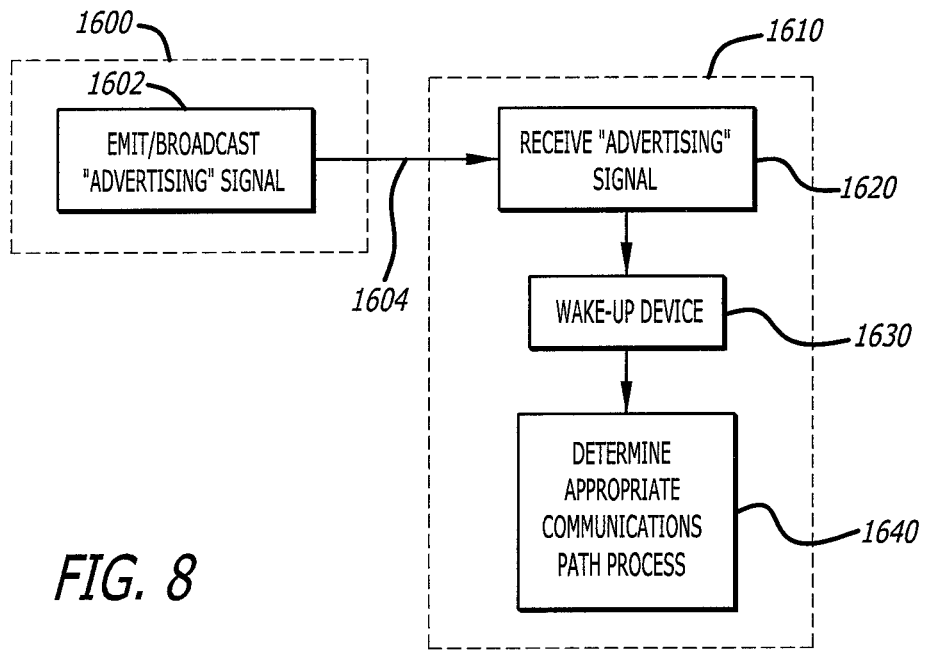
FIG. 8 is a high-level flow diagram that illustratively depicts exemplary logic processes for receiving Gateway-broadcast advertising signals for waking up an exemplary particular user device in an exemplary embodiment of the present invention.

FIG. 8 is a high-level flow diagram that illustratively depicts exemplary logic processes for initiating an exemplary authentication request by a particular "app" installed on a particular user device in an exemplary embodiment of the present invention.

As illustratively depicted in FIG. 8, an exemplary NFC-Payment-Enabled Gateway device 1600 would, for example, be programmed to constantly (or, for example, on some repetitive basis) automatically emit (or broadcast) 1602 an exemplary "advertising" signal (i.e., an advertising signal 1604 (also sometimes referred to as a BOOM BOX™ advertising signal), e.g. through Bluetooth low-energy communications) that could be received by any and all nearby (e.g., within some vicinity or radius, within Bluetooth low-energy communications reach of the Bluetooth low-energy communications emitted by the relevant NFC-Payment-Enabled Gateway device) exemplary user "BOOM BOX™ app"-enabled intelligent phones 1610. In some embodiments, an exemplary BOOM BOX™ advertising signal emitted by an exemplary NFC-Payment-Enabled Gateway device would include data comprising, for example, an NFC-Payment-Enabled Gateway device ID.

An exemplary user "BOOM BOX™ app"-enabled intelligent telephone would be programmed to automatically receive 1620 the exemplary BOOM BOX™ advertising signal from the exemplary NFC-Payment-Enabled Gateway device that emits/broadcasts such a signal and (e.g., when the "BOOM BOX™ app"-enabled intelligent telephone is within range of an exemplary NFC-Payment-Enabled Gateway device) when a BOOM BOX™ Phone advertising signal, as described above, is received, the exemplary user "BOOM BOX™ app"-enabled intelligent telephone would be programmed to automatically "wake up" 1630 and determine 1640, as described further below, an appropriate communications path/process for authenticating a payment by the exemplary user "BOOM BOX™ app"-enabled intelligent telephone to the relevant exemplary NFC-Payment-Enabled Gateway device.

As will be understood by someone with ordinary skill in the art, descriptions herein regarding Bluetooth low-energy communications are illustrative and non-limiting; exemplary user devices and exemplary Point of Service devices (i.e., the exemplary NFC-Payment-Enabled Gateway device that sent the BOOM BOX™ Phone advertising signal) may communicate using Bluetooth low-energy communications, or through other communications technology whether now known or in the future discovered.

Figure 9:
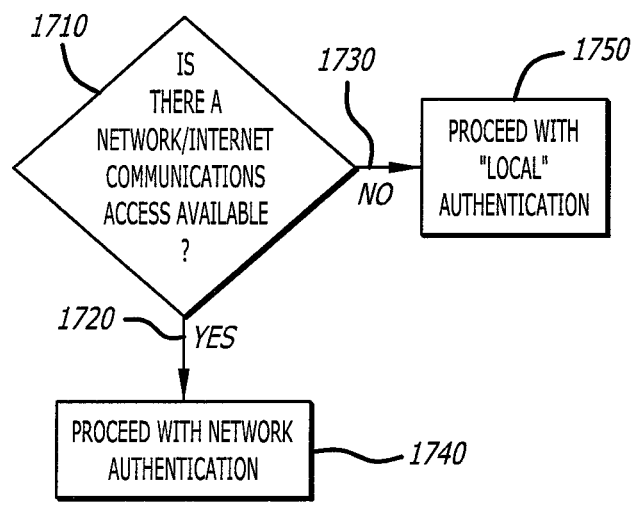
FIG. 9 is a high-level flow diagram that illustratively depicts exemplary logic processes for determining an appropriate communications path/process for initiating an exemplary authentication request by a particular "app" installed on a particular user device in an exemplary embodiment of the present invention.

FIG. 9 is a high-level flow diagram that illustratively depicts exemplary logic processes for determining an appropriate communications path/process for initiating an exemplary authentication request by a particular "app" installed on a particular user device in an exemplary embodiment of the present invention.

As illustratively depicted in FIG. 9, an exemplary user "BOOM BOX™ app"-enabled intelligent phone would perform the following processes in order to determine an appropriate communications path/process for initiating an exemplary authentication request.

Once the exemplary user "BOOM BOX™ app"-enabled intelligent phone has been activated ("woken up") by a Gateway advertising signal, the exemplary user "BOOM BOX™ app"-enabled intelligent phone would be programmed to test 1710 whether or not there is a network communications access available to it.

If there is 1720 a network communications access available to the exemplary user "BOOM BOX™ app"-enabled intelligent phone (the "Y" path), then the exemplary user "BOOM BOX™ app"-enabled intelligent phone would proceed with an exemplary Internet/Network authentication 1740, as illustratively described further below with respect to FIG. 10.

If, on the other hand, there is not 1730 a network communications access available to the exemplary user "BOOM BOX™ app"-enabled intelligent phone (the "N" path), then the exemplary user "BOOM BOX™ app"-enabled intelligent phone would proceed with an exemplary "Local" authentication 1750, as illustratively described further below with respect to FIG. 11.

Figure 10:
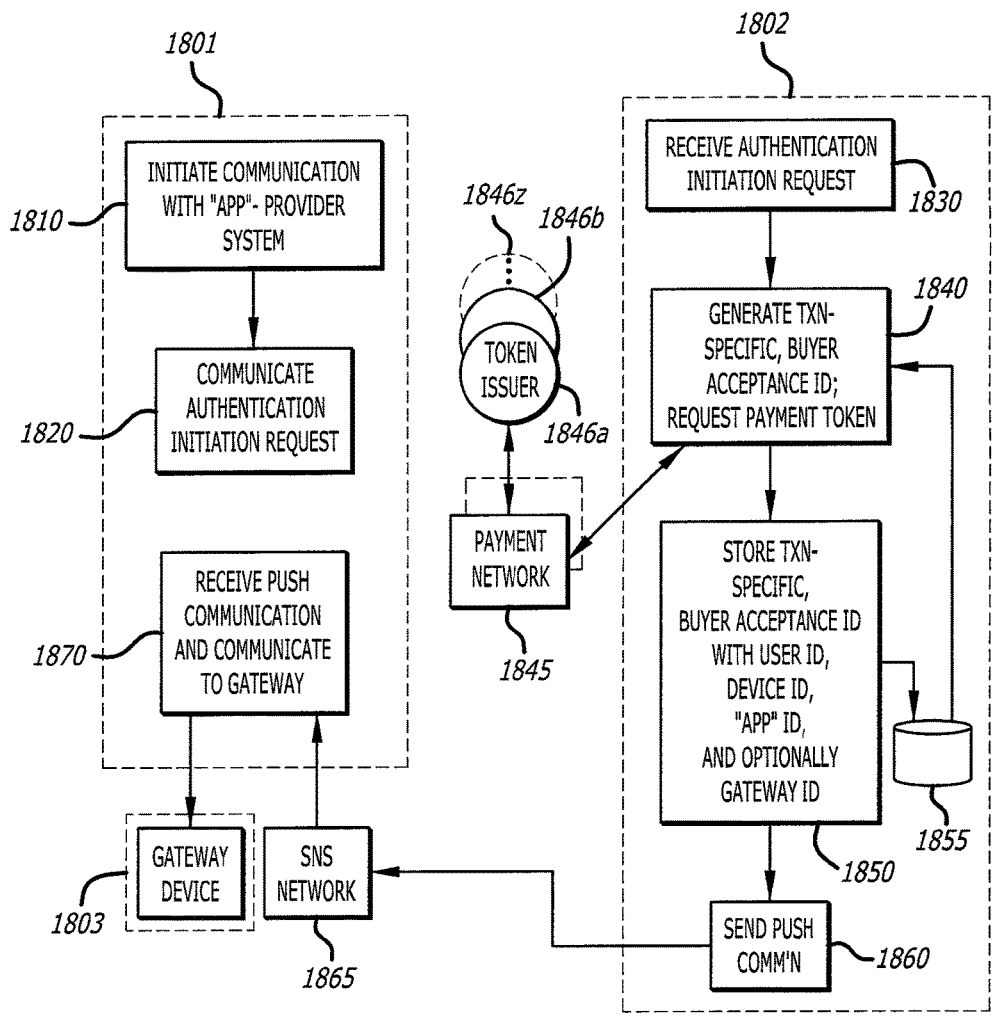
FIG. 10 is a high-level flow diagram that illustratively depicts exemplary logic processes for the initiation of exemplary Network-based authentication of exemplary NFC-based payment by a particular "app" installed on a particular user device in an exemplary embodiment of the present invention.

Exemplary Internet/Network Transaction-Specific, Buyer-Acceptance Identification Generation FIG. 10 is a high-level flow diagram that illustratively depicts exemplary logic processes for the initiation of exemplary Network-based authentication of exemplary NFC-based payment by a particular "app" installed on a particular user device in an exemplary embodiment of the present invention.

As depicted in FIG. 10, when an exemplary "BOOM BOX™ app" has determined that there is a Network/Internet communications access available to it (the "Y" Path 1720 depicted in FIG. 9), the exemplary user "BOOM BOX™ app"-enabled intelligent phone 1801 would initiate 1810 an exemplary communication directly with the exemplary "app"-provider computer system 1802. The exemplary "BOOM BOX™ app"-enabled intelligent phone would be programmed to communicate 1820 to the exemplary "app"-provider computer system, an exemplary authentication initiation request comprising, for example, an exemplary User ID, an exemplary device ID, and exemplary "app" ID, and in some exemplary embodiments, an exemplary Gateway device ID (i.e., a Seller ID).

The exemplary "app"-provider computer system would be programmed to, and would, receive 1830 the exemplary authentication initiation request, and would generate 1840 an exemplary transaction-specific, buyer acceptance identifier (ID); the exemplary "app"-provider computer system would be programmed to, and would, issue a request to an appropriate Token Issuer (e.g., 1846a-1846z) through the exemplary Payment Network 1845, such as, for example, an appropriate credit card network, for an exemplary Payment Token. For example, to request a Payment Token, the exemplary "app"-provider computer system would access a computer-accessible memory storage 1855 to obtain an exemplary credit card identifier for the particular exemplary User ID, and would send a request for a transaction-specific Payment Token, comprising the User ID and the exemplary credit card identifier to an appropriate Token Issuer (e.g., 1846a-1846z), and would obtain in return, an exemplary transaction-specific Payment Token. In some embodiments, the exemplary "app"-provider computer system could be the Token Issuer as well.

The exemplary "app"-provider computer system would store 1850 in a computer-accessible memory storage 1855 the exemplary transaction-specific, buyer acceptance identifier (ID) that it had generated in a computer-accessible memory storage in association with, for example, the exemplary User ID, the exemplary device ID, and the exemplary "app" ID, and in some exemplary embodiments, the exemplary Gateway device ID (ie., the Seller ID) and/or received payment token.

The exemplary "app"-provider computer system would be programmed to, and would, send 1860 an exemplary communication using a secure transmission; the exemplary communication could include, for example, the exemplary transaction-specific, buyer acceptance identifier (ID) that it had generated.

In some exemplary embodiments, the exemplary "app"-provider computer system would be programmed to, and would, send 1860 an exemplary "push" communication, such as using the SNS Network 1865 as described elsewhere herein, to an "SNS" device ID that the exemplary "app"-provider computer system had previously stored (e.g., when the user originally registered with the "app.") in associate with the exemplary "app" ID that it had received as part of the exemplary authentication initiation request. The exemplary "push" communication would comprise, among other things, the exemplary transaction-specific, buyer acceptance identifier (ID) that it had generated.

As will be understood by someone with ordinary skill in the art, the aforementioned exemplary use of the SNS Network is illustrative and non-limiting. Other types of secure networks, whether now known or in the future discovered, could be used to transmit the aforementioned "push" communication to the expected, actual device that had registered with the "app"-provider computer system.

In an exemplary embodiment that uses the SNS Network as illustratively described above, if the "SNS" device ID was the actual device ID for the exemplary user "BOOM BOX™ app"-enabled intelligent telephone, the exemplary user "BOOM BOX™ app"-enabled intelligent telephone would be programmed to, and would, receive 1870 the exemplary "push" communication, and would then be programmed to, and would, communicate an exemplary payment authorization "payload" to the exemplary NFC-Payment-Enabled Gateway device that sent the BOOM BOX™ Phone advertising signal.

Exemplary Payment Authorization "Payload"

The exemplary payment authorization "payload" that would be sent by an exemplary user "BOOM BOX™ app"-enabled intelligent telephone would comprise one, many and/or all of, for example: the exemplary transaction-specific, buyer acceptance identifier (ID), payment information (which, in one exemplary embodiment would comprise an exemplary Payment Token, as described further below), the user's choice for a buyer-specific identifier (which, in an exemplary embodiment provided, and where the user selected, the option for user-biometrics, would be the identification of the user's choice to "Pay by Face"; where the user selected using a PIN, the user's choice would be identified to be the user's option to enter a PIN at the Gateway device and an encryption of the PIN would be included in the exemplary payment authorization "payload"), the buyer-specific identifier, the device-specific "app" identifier, and the device ID for the particular exemplary user device. In some exemplary embodiments, where the user had selected the "Pay by Face" option, or other biometric option, the exemplary payment authorization "payload" would include an encryption of the biometric measurement date. In some exemplary embodiments, the exemplary payment authorization "payload" would also be encrypted in full and/or in part to ensure data security.

In some exemplary embodiments, the data elements themselves, e.g., the transaction-specific buyer-acceptance identifier, the device-specific "app" identifier, the device ID for the particular exemplary user device, and the exemplary PIN and/or biometric measurements would be stored in the exemplary user "BOOM BOX™ app"-enabled intelligent telephone in encrypted form, and in some exemplary embodiments, would be stored in a "secure element" of the exemplary user "BOOM BOX™ app"-enabled intelligent telephone.

In circumstances where the exemplary user "BOOM BOX™ app"-enabled intelligent telephone has determined (see the "Y" path 1720 in FIG. 9) that it has a Network/Internet Communications Access available, the exemplary user "BOOM BOX™ app"-enabled intelligent telephone would include in the exemplary payment authorization "payload" an indication that "Network" authentication processes were used by the exemplary "BOOM BOX™ app"-enabled intelligent telephone.

In circumstances where the exemplary user "BOOM BOX™ app"-enabled intelligent telephone has determined (see the "N" path 1730 in FIG. 9) that it does not have a Network/Internet Communications Access available, the exemplary user "BOOM BOX™ app"-enabled intelligent telephone would generate, as described elsewhere herein, a transaction-specific, buyer-acceptance identifier, and would include in the exemplary payment authorization "payload," an indication that "Network" authentication processes were not used by the exemplary "BOOM BOX™ app"-enabled intelligent telephone.

Exemplary Payment "Tokens"

Exemplary embodiments would use an exemplary payment "token" as payment data.

As will be understood by someone with ordinary skill in the art, an exemplary Token Issuer, such as, for example, an exemplary credit card network, would be contacted to issue an exemplary payment token. Depending on the embodiment, and on the particular circumstances, contact with an exemplary Token Issuer may be made at different times.

For example, as described further below, when an exemplary user "BOOM BOX™ app"-enabled intelligent telephone determines that it has Network/Internet access, the exemplary "app"-provider computer system/device would issue a request to an appropriate exemplary Token Issuer for a Payment Token.

However, in some exemplary embodiments, an exemplary user "BOOM BOX™ app"-enabled intelligent telephone may also determine that its "wallet" is "low" on Payment Tokens (these would be Payment Tokens that could be used during a "local" authentication process as described further below). In some exemplary embodiments, in such circumstances, the exemplary user "BOOM BOX™ app"-enabled intelligent telephone would contact the exemplary "app"-provider computer system/device and request, as described further below, one or more "local" Payment Tokens for it "wallet."

An exemplary Payment Token could be a static token, or, as would be used by some exemplary embodiments, would be a transaction-specific Payment Token. As a further alternative, Payment Tokens could be single-use Payment Tokens that would not be associated with a particular transaction unless and until it is sent for payment to a particular merchant.

In some exemplary embodiments, the exemplary transaction-specific Payment Token would be provided to the exemplary Gateway device as part of the exemplary payment authorization "payload."

In alternative exemplary embodiments, the exemplary user device (e.g., the exemplary user "BOOM BOX™ app"-enabled intelligent telephone) would not include a Payment Token with the initial "payload," but would instead wait to receive an authentication confirmation from the relevant Gateway device, and would then provide the Payment Token.

In alternative exemplary embodiments, the "app"-provider computer system/device would pass a Payment Token following successful Internet/Network authentication directly to the exemplary NFC-Payment-Enabled Gateway device.

As briefly mentioned above, in exemplary "local" payment authentication processes, in situations where neither the user's intelligent phone, nor the Gateway device, has access to a Network/the Internet, the user's "app" could use pre-stored "wallet" tokens that it had previously obtained when it had access to the relevant Token Issuer. For example, at times when the user's "app" has Network access, an exemplary user "BOOM BOX™ app"-enabled intelligent phone would be programmed to, and would, access the exemplary "app"-provider computer device/system with a request for "wallet" tokens; the exemplary "app"-provider computer device/system would securely authenticate with the actual "app" and intelligent phone (such as by using a "push" communication as described elsewhere herein); once the "app"/phone have been authenticated, the exemplary "app"-provider computer device/system would issue a request to an appropriate Token Issuer to obtain exemplary "wallet" tokens, which it would then send to the exemplary user "BOOM BOX™ app"-enabled intelligent telephone.

Exemplary Internet/Network-Based "Pay by Face"/PIN Authentication

Figure 11A:
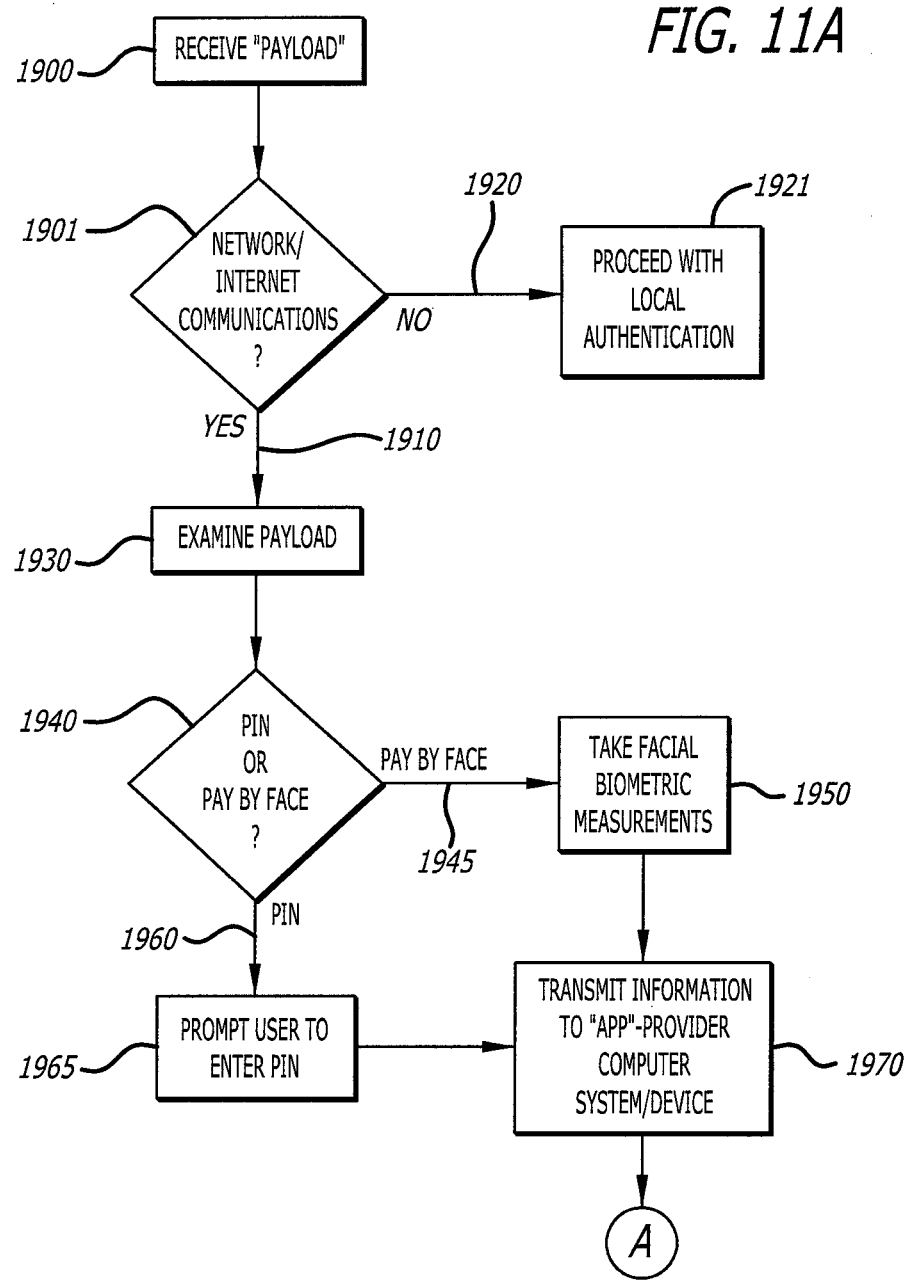
FIGS. 11A-B are a high-level flow diagram that illustratively depict exemplary logic processes for exemplary Network/Internet-based authentication of exemplary NFC-based payment by a particular "app" installed on a particular user device in an exemplary embodiment of the present invention.
Figure 11B:
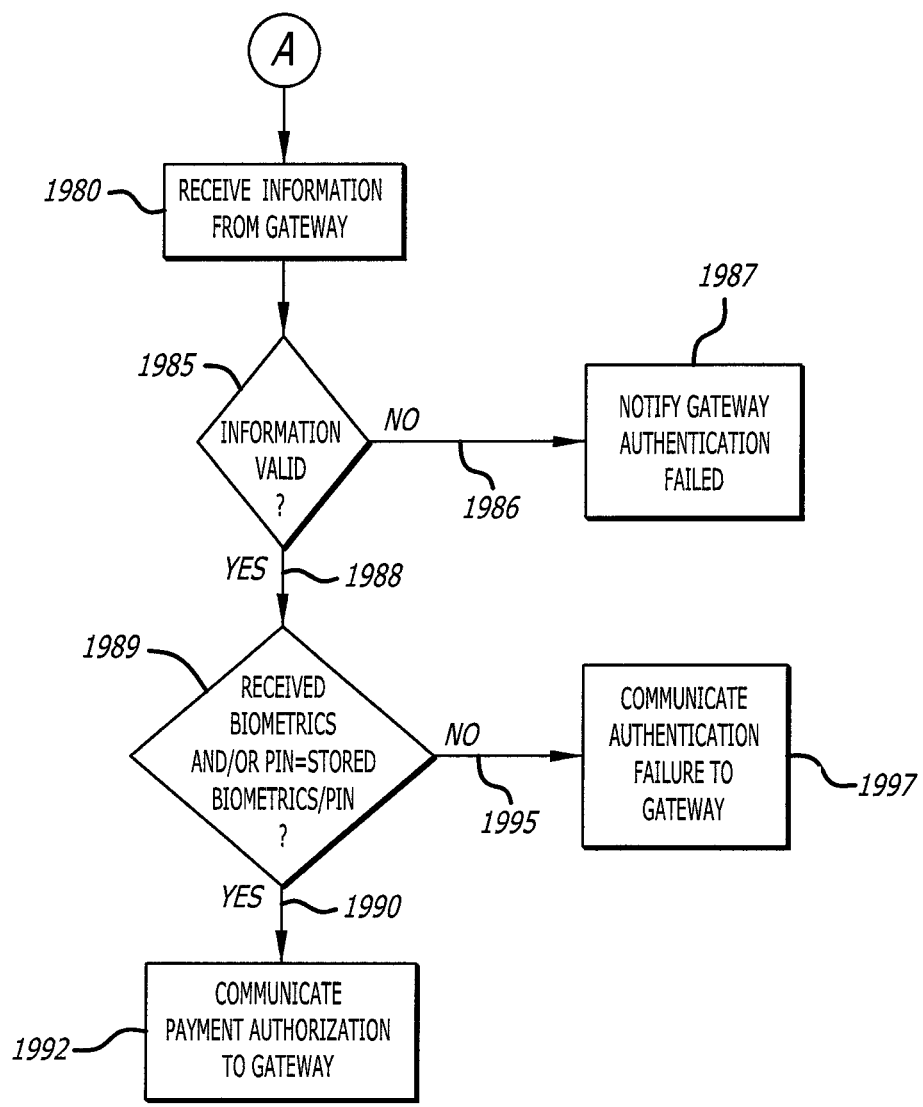

FIGS. 11A-B are a high-level flow diagram that illustratively depict exemplary logic processes for exemplary Network/Internet-based authentication of exemplary NFC-based payment by a particular "app" installed on a particular user device in an exemplary embodiment of the present invention.

As depicted in FIGS. 11A-B, in response to receiving 1900 an exemplary payment authorization "payload," the exemplary NFC-Payment-Enabled Gateway device would be programmed to test 1901 to see if the exemplary NFC-Payment-Enabled Gateway device has Network/Internet Communications access. If it does (the "Y" path 1910), then the exemplary NFC-Payment-Enabled Gateway device would proceed with exemplary Internet/Network-based payment authentication as described further below. If there is not Network/Internet communications access available to the exemplary NFC-Payment-Enabled Gateway device (the "N" path 1920), then the exemplary NFC-Payment-Enabled Gateway device would proceed 1921 with "local" authentication as described further below.

If there is Network/Internet communications access available to the exemplary NFC-Payment-Enabled Gateway device (the "Y" path 1910), then the exemplary NFC-Payment-Enabled Gateway device would be programmed to, and would, examine 1930 the exemplary payment authorization "payload" that it had received from the relevant exemplary user "BOOM BOX™ app"-enabled intelligent telephone. In particular, the exemplary NFC-Payment-Enabled Gateway device would be programmed to test 1940 the payload for an indication as to whether the buyer/user had opted to enter a PIN, or had in the alternative, opted to Pay by Face (or, in further alternative exemplary embodiments, had opted for other types of user-specific identification, including, but not limited to, fingerprints, etc.).

The exemplary NFC-Payment-Enabled Gateway device would further comprise a facial biometric measurement chip and a lens that would enable the exemplary NFC-Payment-Enabled Gateway device to the take facial image, or scan facial image, biometrics (e.g., biometric measurements) of the paying user's facial image, without requiring the user to provide a static image (i.e., a "photo").

In response to receiving an exemplary payment authorization "payload," that indicates that the buyer/user had opted to Pay by Face 1945, the exemplary NFC-Payment-Enabled Gateway device facial biometric measurement chip would be programmed to take facial image biometric measurements 1950 of the paying user's facial image (i.e., the facial image of the user that bears the particular device from which the buyer-specific identifier was received).

In response to receiving an exemplary payment authorization "payload," that indicates that the buyer/user had instead opted to enter a PIN 1960, the exemplary NFC-Payment-Enabled Gateway device would also be programmed to prompt 1965 the user to enter a PIN.

In some exemplary embodiments, in a Network/Internet Authentication, process, the exemplary NFC-Payment-Enabled Gateway device would, for example, transmit 1970 the buyer-specific identifier (e.g., the facial image biometric measurements that it took, or the PIN that the user entered, or in other embodiments, other data and/or biometrics (e.g., fingerprint(s)) could be used, alone or in combination, to identify a user), the transaction-specific buyer-acceptance identifier, the device ID for the particular exemplary user device, the "app"-specific identifier that it had received from the exemplary user "BOOM BOX™ app"-enabled intelligent telephone, and the particular NFC-Payment-Enabled Gateway device ID, to the "app"-provider computer device/system.

In some exemplary embodiments, the "app"-provider computer system/device would receive 1980 information, e.g., the particular device ID, and the "app"-specific identifier, from the exemplary NFC-Payment-Enabled Gateway device, and would validate 1985 the particular device ID, and the "app"-specific identifier that it receives from the exemplary NFC-Payment-Enabled Gateway device with respect to the transaction-specific, buyer-acceptance identifier that it receives from the exemplary NFC-Payment-Enabled Gateway device.

For invalid information (the "N" path 1986), the exemplary "app"-provider computer system/device would notify 1987 the exemplary NFC-Payment-Enabled Gateway device that the authentication failed.

For validated information (the "Y" path 1988) of the above-mentioned information, in exemplary embodiments, the exemplary "app"-provider computer system/device would compare 1989 the facial image information (or the PIN, as the case may be) that it had stored for the particular device ID, and the "app"-specific identifier with the facial image (or the PIN, as the case may be) information that it receives from the exemplary NFC-Payment-Enabled Gateway device.

If the compared information matches 1990 (the "Y" path) the received information, the exemplary "app"-provider computer system/device would communicate 1992 to the exemplary NFC-Payment-Enabled Gateway device an authorization for payment by the relevant user/user device.

If, on the other hand, the compared information does not match 1995 (the "N" path) the received information, the exemplary "app"-provider computer system/device would communicate 1997 to the exemplary NFC-Payment-Enabled Gateway device an authorization failure for the relevant user/user device.

In alternative exemplary embodiments, rather than the exemplary "app"-provider computer system/device performing the above-mentioned comparison, the exemplary "app"-provider computer system/device would communicate the facial image information (or the PIN, as the case may be) that it had stored for the particular device ID, and the "app"-specific identifier to the exemplary NFC-Payment-Enabled Gateway device, and the exemplary NFC-Payment-Enabled Gateway device would perform the comparison to determine whether or not payment by the user/user device should be authorized. In alternative exemplary embodiments, the exemplary "app"-provider computer system/device would communicate the transaction-specific, buyer-acceptance identifier (and the other information in an exemplary payment authorization "payload" directly to the exemplary NFC-Payment-Enabled Gateway device.

In yet other exemplary embodiments (such as, for example, in connection with a "local" authentication process as described further below), the exemplary NFC-Payment-Enabled Gateway device would receive, for example, encrypted facial image biometric measurements (or a PIN, as the case may be) from the exemplary user "BOOM BOX™ app"-enabled intelligent telephone. The exemplary NFC-Payment-Enabled Gateway device would use a "private" key to de-encrypt the encrypted facial image biometric measurements (or the encrypted PIN, as the case may be) that it had received from the exemplary user "BOOM BOX™ app"-enabled intelligent telephone. The exemplary NFC-Payment-Enabled Gateway device would then make the comparison between the facial image biometric measurements that it took (or the PIN that the user had entered, as the case may be), and the de-encrypted facial image biometric measurements (or the de-encrypted PIN as the case may be) in order to authenticate payment by the user/user device on its own and without having to communicate with the "app"-provider computer device/system.

Exemplary Communication Gateways

As illustratively depicted in FIG. 6, an exemplary User's particular user device 1010-1 would have installed on it an exemplary "app" 1030-1. When the User's particular user device 1010-1 communicates to either an exemplary "app"-provider computer device (or bank of devices) 1100 or an exemplary Authentication Computer Device (or bank of devices) 1001, exemplary network (e.g., Internet) communications paths 1101-1 and 1110-1 respectively, would be used.

Similarly, when an exemplary "app"-provider computer device (or bank of devices) 1100 or an exemplary Authentication Computer Device (or bank of devices) 1001 communicates with the User's particular user device 1010-1 (not through the "app"), such communications would be accomplished using exemplary network (e.g., Internet) communications paths 1101-1 and 1110-1 respectively.

As will be understood by someone with ordinary skill in the art, the exemplary Authentication System described herein would, for purposes of ensuring that it is communicating with the appropriate user device, sometimes engage in "push" communications (as described elsewhere herein) with the user device through the exemplary Notification System. However, as will be understood by someone with ordinary skill in the art, the exemplary Authentication System would also sometimes communicate, or would be able to communicate, with the user device, using a communications network, such as the Internet.

However, when an exemplary "app"-provider computer device (or bank of devices) 1100 or an exemplary Authentication Computer Device (or bank of devices) 1001 provides "push" communications to the device-specific "app" (e.g., 1030-1), such communications would be accomplished using exemplary notification system gateways, e.g., "SNS", 1103-1 and 1130-1 respectively.

Exemplary Data Relationships Stored to Facilitate Authentication

In some exemplary embodiments, a data relationship would be stored in a computer-accessible memory between a device-specific "app" ID, a device ID for the particular exemplary user device, the corresponding User ID, and the corresponding User PIN. Depending on the embodiment, the device-specific "app" ID, the device ID, the corresponding User ID, and the corresponding User PIN may be saved in encrypted form, and/or in de-encrypted form, and would be saved in a further association, or relationship, to an identification of the device-specific "app" ID generation software, the encryption software, and the de-encryption software installed in the particular exemplary user device.

In some exemplary embodiments, an exemplary device ID for the particular exemplary user device would comprise a UUID (Universally Unique Identifier). In other embodiments, an exemplary device ID for the particular exemplary user device would comprise an exemplary "SNS" device ID.

In some exemplary embodiments, a data relationship would comprise an identity of the relevant notification system identifier for the particular exemplary user device.

In some exemplary embodiments, a data relationship would further comprise information about the device on which the "app" is installed, such as, for example, the make and model of the device, the relevant telecommunications company/system provider (e.g., the telephone company), etc.

In an exemplary embodiment where the exemplary "app"-provider computer device (or bank of devices) 1100 does not actually send a copy of the device-specific software to the exemplary Authentication Computer Device (or bank of devices)1001 (as depicted in FIG. 6), but instead communicates, or otherwise makes available, to the exemplary Authentication Computer Device (or bank of devices) 1001, a set, or string, of the corresponding exemplary module-specific identifiers associated with each of the exemplary modules used to construct the software "app" to be installed on a particular exemplary user device, a data relationship will be stored in a computer-accessible memory that would relate the device-specific "app" ID to the corresponding set, or string, of the corresponding exemplary module-specific identifiers associated with each of the exemplary modules used to construct the software "app."

In yet other exemplary embodiments, an exemplary device-specific "app" ID would be generated by the Authentication Computer Device (or bank of devices) 1 when the "app" is installed on the particular exemplary user device; the Authentication Computer Device (or bank of devices) 1001 would communicate the exemplary device-specific "app" ID to the relevant "app" on the relevant particular exemplary user device.

In some exemplary embodiments, an exemplary binary string, or other identifier or relationship, would be used to identify whether the device-specific "app" identifier was generated by the "app", by the exemplary Authentication Computer Device (or bank of devices) 1001, or the exemplary "app"-provider computer device (or bank of devices) 1100; the exemplary binary string, or other identifier or relationship, would be stored in a computer-accessible memory storage in association or relationship with the device-specific "app" ID and/or the relevant notification system identifier for the particular exemplary user device and/or the corresponding User ID, and the corresponding PIN.

Figure 7:
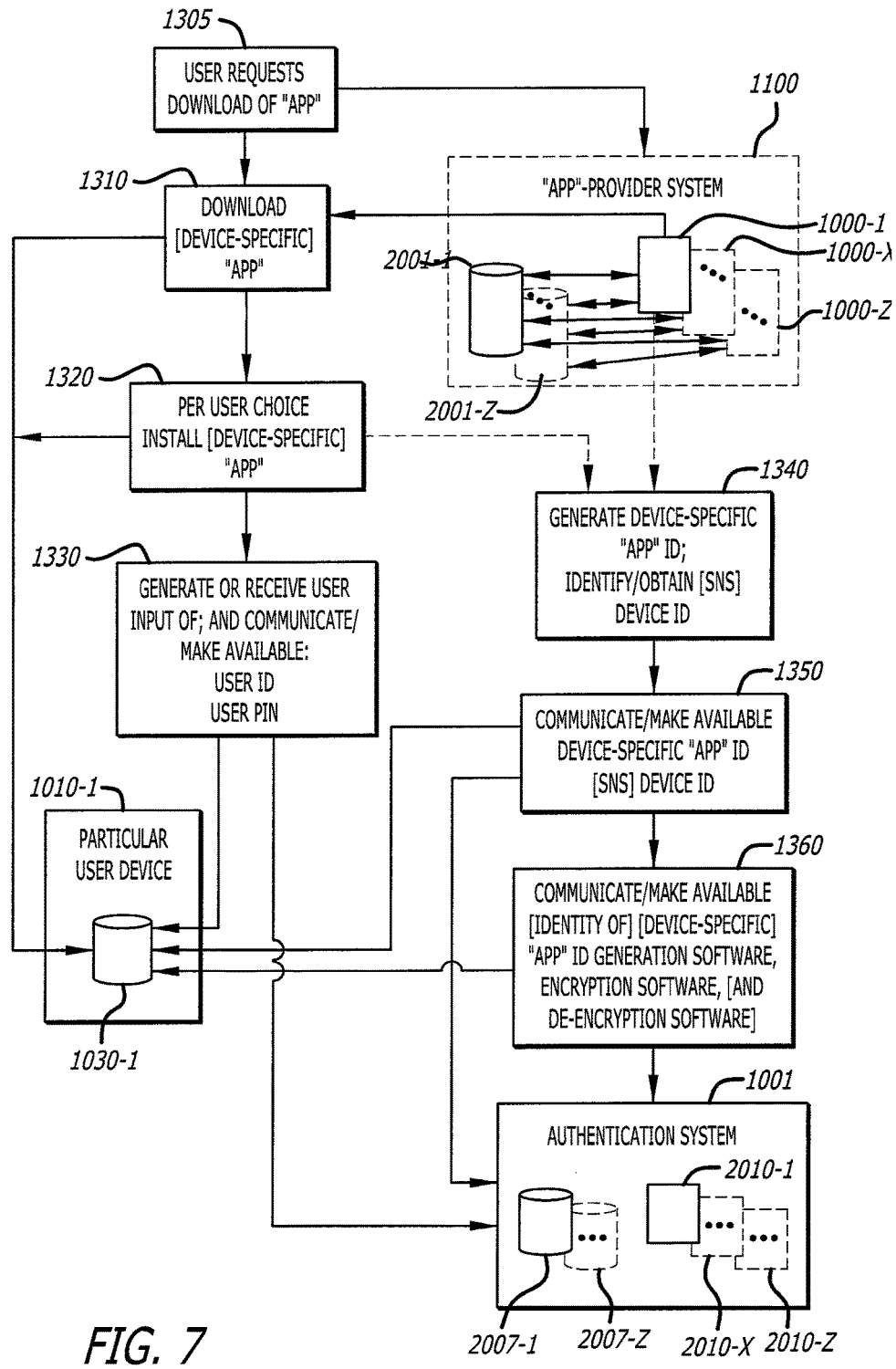
FIG. 7 is a high-level logic flow diagram that illustratively depicts exemplary high-level logic functions of an exemplary "app" download and install in an exemplary embodiment of the present invention.

Exemplary "App" Data/Software Synchronization Between Authentication System and Particular User Device FIG. 7 is a high level logic flow diagram that illustratively depicts exemplary high-level logic functions of an exemplary "app" download and install in an exemplary embodiment of the present invention. As will be explained in more detail below, and as indicated in the description above, the exemplary process depicted in FIG. 7 would result in an exemplary device-specific synchronization (i.e., sometimes referred to herein as "mirroring") of certain data and software between an exemplary particular user device and the exemplary Authentication System. As explained further below, and as indicated above, exemplary mirroring of certain data and software between an exemplary particular user device and the exemplary Authentication System would facilitate a simplified user authentication experience, while providing authentication safeguards against cyber-hacking.

As illustratively depicted in FIG. 7, the exemplary embodiment depicted there would comprise an exemplary "app"-provider system 1100. The exemplary "app"-provider system 1100 would comprise at least one exemplary computer device 1000-1 (such as, e.g., a server computer device), and optionally, an exemplary bank (plurality) of computer devices 1000-1 through 1000-x through 1000-z.

As illustratively depicted in FIG. 7, the exemplary "app"-provider system 1100 depicted there would further comprise exemplary computer-accessible memory storage 2001-1 (and optionally, through 2001-z); the exemplary computer-accessible memory storage 2001-1 (and optionally, through 2001-z) would be mutually accessible by the exemplary computer device 2000-1 (and optionally, by the exemplary bank (plurality) of computer devices 2000-1 through 2000-x through 2000-z.

As illustratively depicted in FIG. 7, an exemplary particular user would request a download of the Authentication "app" 1305. As previously mentioned above, the request could be initiated through an "app" store or directly to the exemplary "app"-provider system. However, for illustrative purposes, FIG. 7 illustratively depicts that the exemplary particular user would initiate a request for a download of the Authentication "app" directly to the exemplary "app"-provider system 1100.

As illustratively depicted in FIG. 7, the exemplary embodiment depicted there would download 1310 the "app" 1030-1 to the particular exemplary user device 1010-1. As illustratively depicted in FIG. 7, the exemplary embodiment depicted there would optionally download 1310 a "device-specific" "app" 1030-1 to the particular exemplary user device 1010-1.

As illustratively depicted in FIG. 7, the exemplary embodiment depicted there, would (according to a detection of a user choice to) install the "app" install 1320 of the exemplary Authentication "app" 1030-1 on the particular exemplary user device 1010-1. As illustratively depicted in FIG. 7, the exemplary embodiment depicted there would optionally install 1320 an exemplary "device-specific" "app" 1030-1 on the particular exemplary user device 1010-1.

As illustratively depicted in FIG. 7, in exemplary process 1330, the exemplary embodiment would either receive the exemplary user's input of the User ID and User PIN, or alternatively, as was mentioned above, the exemplary embodiment would generate a User ID and User PIN; the exemplary embodiment would then communication or otherwise make the User ID and User PIN available to both the exemplary installed "app" 1030-1 on the particular exemplary user device 1010-1 and the exemplary Authentication System 1001.

As illustratively depicted in FIG. 7, in exemplary process 1340, the exemplary embodiment would generate a device-specific "app" ID and would obtain, or would otherwise identify, a device ID for the particular exemplary user device (element 1010-1), such as an exemplary "UUID" device ID.

As illustratively depicted in FIG. 7, in exemplary process 1350, the exemplary embodiment would communicate, or would otherwise make available, the exemplary device-specific "app" ID and the exemplary device ID, such as an exemplary "UUID" device ID to both the exemplary [device-specific] "app" 1030-1 installed on the particular exemplary user device 1010-1 and to the exemplary Authentication System 1001.

As illustratively depicted in FIG. 7, in exemplary process 1360, the exemplary embodiment depicted there would also communicate, or would otherwise make available, the (or the identity of) [device-specific] "app" ID generation software, the [device-specific] encryption software, and (as appropriate) the [device-specific] de-encryption software, to both the exemplary [device-specific] "app" 1030-1 installed on the particular exemplary user device 10-1 and to the exemplary Authentication System 1001.

As was previously mentioned above, in some exemplary embodiments, the device-specific "app" ID would be generated by either the exemplary "app"-provider system (e.g., element 1100 illustratively depicted in FIG. 7) or by the exemplary Authentication System (e.g., element 1001 illustratively depicted in FIG. 7), and then provided (either in an encrypted form, or non-encrypted form) to the exemplary [device-specific] "app" 1030-1 installed on the particular exemplary user device 1010-1.

As indicated above, some of the values that are identified as "device-specific" would not be device-specific in some embodiments, That is, in some alternative exemplary embodiments, the above described device-specific values, including said "device-specific encryption software" and "device-specific decryption software" would not be device-specific. Rather, in some alternative exemplary embodiments, the same, or similar, software would be used for all user devices; only the "public key" that was issued to a particular device would be device-specific.

Alternatively, as was previously described above, the "app"-provider system (e.g., element 1100 illustratively depicted in FIG. 7) would provide exemplary device-specific "app" ID generation software to be installed as part of the exemplary [device-specific] "app" 1030-1, so that the exemplary [device-specific] "app" 1030-1 would itself generate the exemplary device-specific "app" ID; depending on the particular exemplary embodiment, the exemplary [device-specific] "app" 1030-1 would then communication, or otherwise make available, the exemplary device-specific "app" ID to the "app"-provider system (e.g., element 1100 illustratively depicted in FIG. 7; which would then communicate the information to the exemplary Authentication System) or directly to the exemplary Authentication System (e.g., element 1001 illustratively depicted in FIG. 7)

As mentioned above, the "app"-provider system may also be the same as the Authentication System. In the event this is the case, each of the above steps outlined for "app"-provider system would be executed by Authentication System.

Exemplary "Local" (Non-Network) User Authentication Using the "App"

As will be explained in more detail below, in some exemplary embodiments, there would be two types of "local" authentication.

Figure 13A:
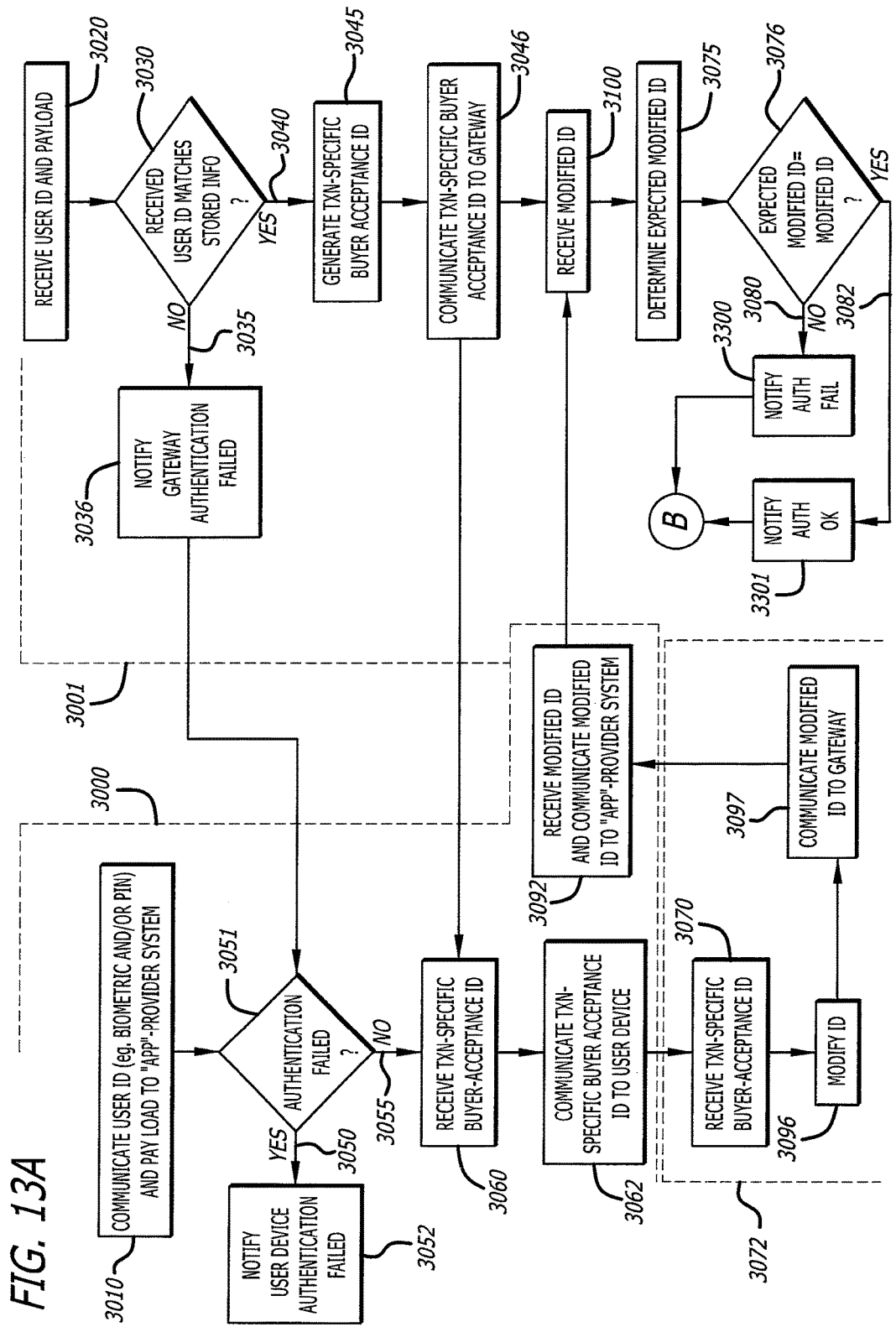
FIGS. 13A-B are a high-level flow diagram that illustratively depicts exemplary high level logic processes for exemplary "local" authentication of exemplary NFC-based payment by a particular "app" installed on a particular user device in an exemplary embodiment of the present invention.
Figure 13B:
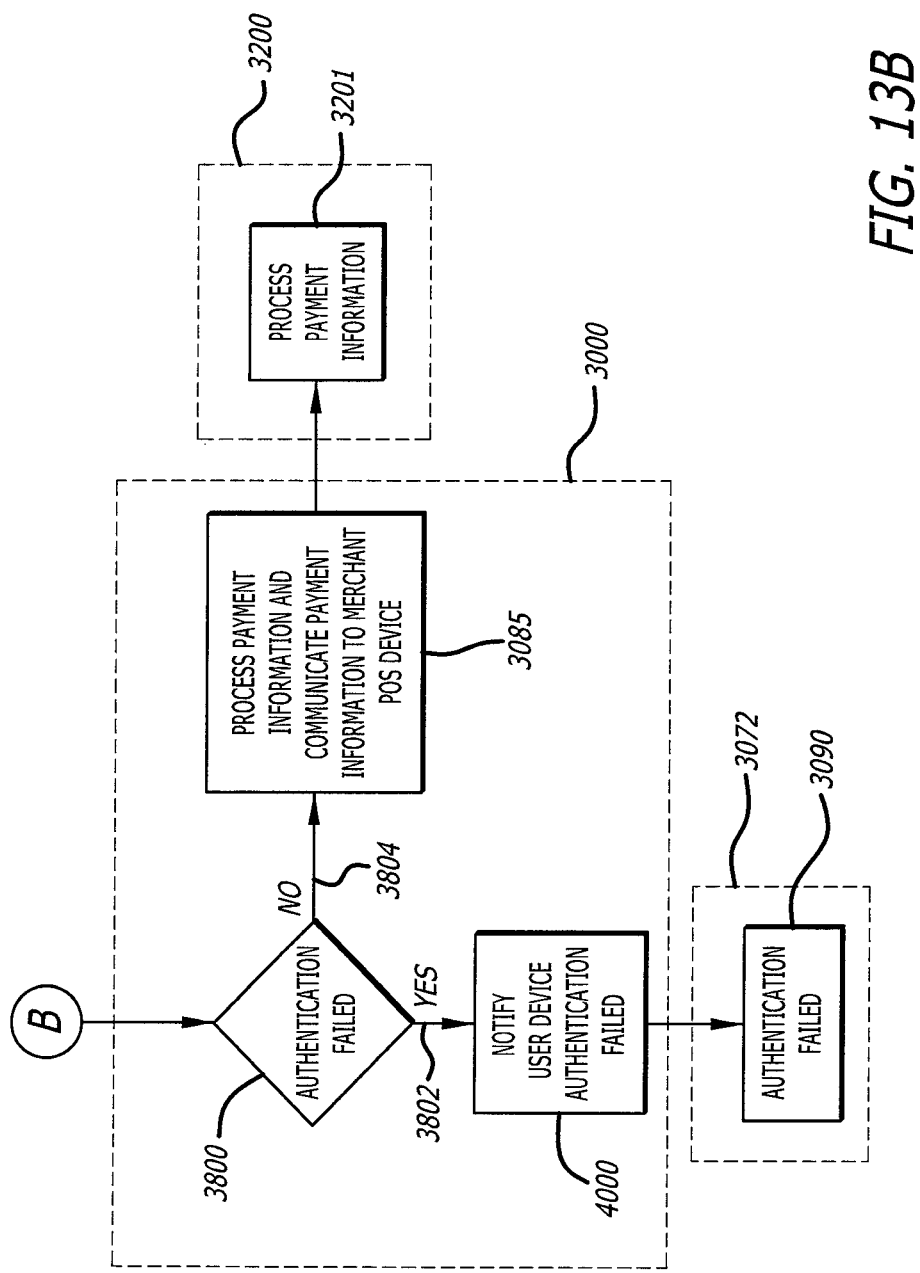

One type of local authentication, which is the type of local authentication that is depicted in FIGS. 13A-B, is where the relevant exemplary user "BOOM BOX™ app"-enabled intelligent telephone would have determined that it does not have any Network/Internet Communications access (e.g., as depicted with element 1730 (the "N" path) in FIG. 9), but where the relevant BOOM BOX™ Gateway Device would have, or would have through the relevant merchant's point of service device, Network/Internet Communications access.

Figure 12:
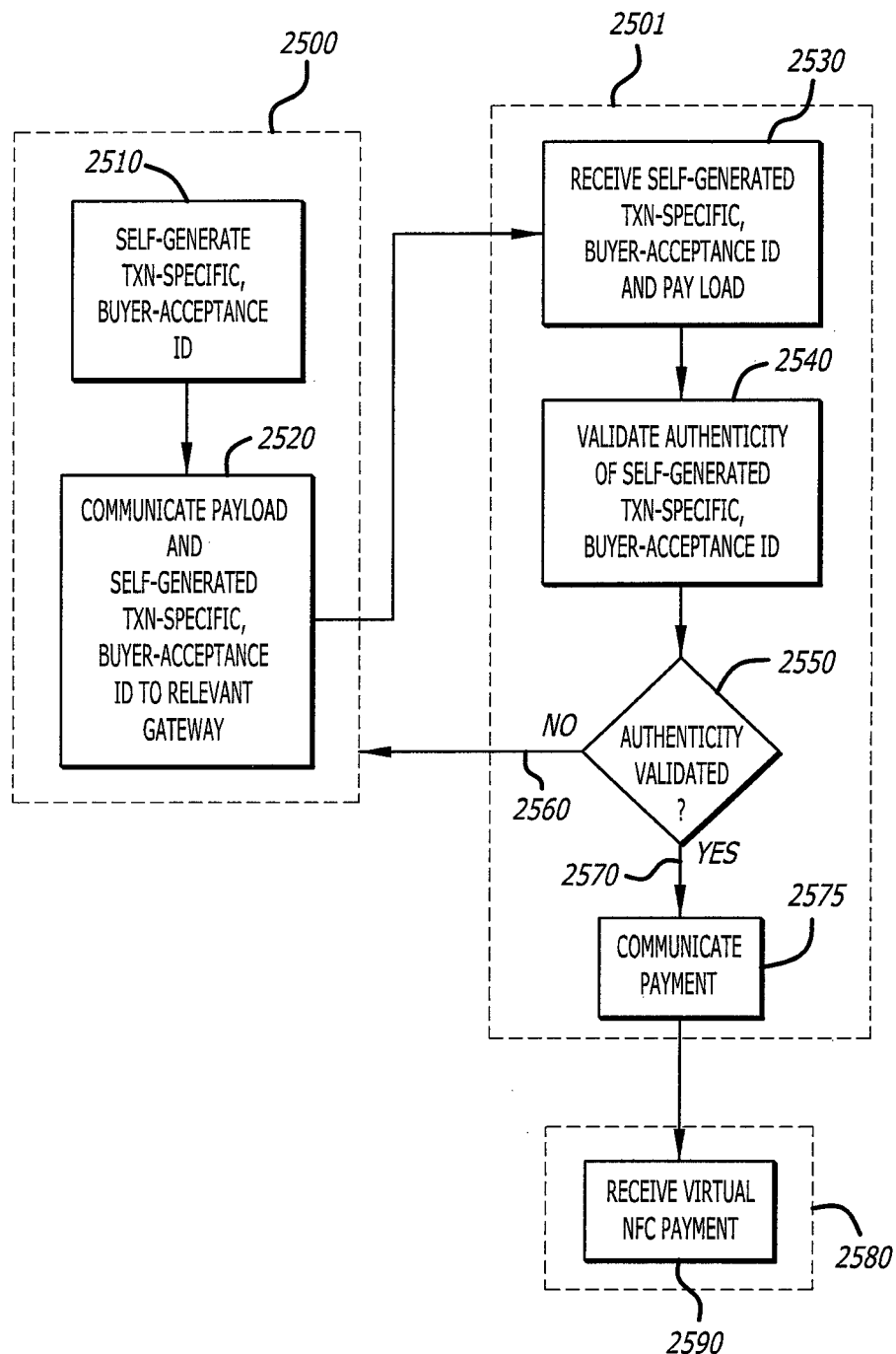
FIG. 12 is a high-level flow diagram that illustratively depicts exemplary logic processes for exemplary "absolute local" authentication of exemplary NFC-based payment by a particular "app" installed on a particular user device in an exemplary embodiment of the present invention.

A second type of local authentication, which is the type of local authentication (sometimes referred to as "absolute local authentication" or "local local authentication") that is depicted in FIG. 12, is where neither the relevant exemplary user "BOOM BOX™ app"-enabled intelligent telephone nor the relevant BOOM BOX™ Gateway Device has any Network/Internet Communications access.

As described in more detail below, in some exemplary embodiments, in circumstances where the relevant exemplary user "BOOM BOX™ app"-enabled intelligent telephone has determined that it does not have any Network/Internet Communications access, then, as described further below, it would "self-generate" (as depicted in FIG. 12) an exemplary authentication-request-specific identifier (also sometimes referred to herein as a "transaction-specific, buyer-acceptance identifier").

In some alternative exemplary embodiments (illustratively depicted in FIGS. 13A-B), where the relevant exemplary user "BOOM BOX™ app"-enabled intelligent telephone has determined that it does not have any Network/Internet Communications access, the relevant exemplary intermediary BOOM BOX™ Gateway Device would communicate with the relevant exemplary user "BOOM BOX™ app"-enabled intelligent telephone (sometimes simply referred to herein as the "User's mobile device") using exemplary short-range and/or long-range communications (e.g., Bluetooth), and would communicate with the exemplary "app"-provider computer device through the relevant communications network, such as the Internet, or alternatively, through the merchant's relevant Point of Service (POS) device, which would in turn communicate with the exemplary "app"-provider computer device. In such an alternative exemplary embodiment, the relevant exemplary intermediary BOOM BOX™ Gateway Device would not only act as a communication "gateway" between the exemplary user "BOOM BOX™ app"-enabled intelligent telephone and the merchant's POS device, but would also act as a communication "gateway" between the exemplary "app"-provider computer device and the particular relevant exemplary user "BOOM BOX™ app"-enabled intelligent telephone.

Figure 14:
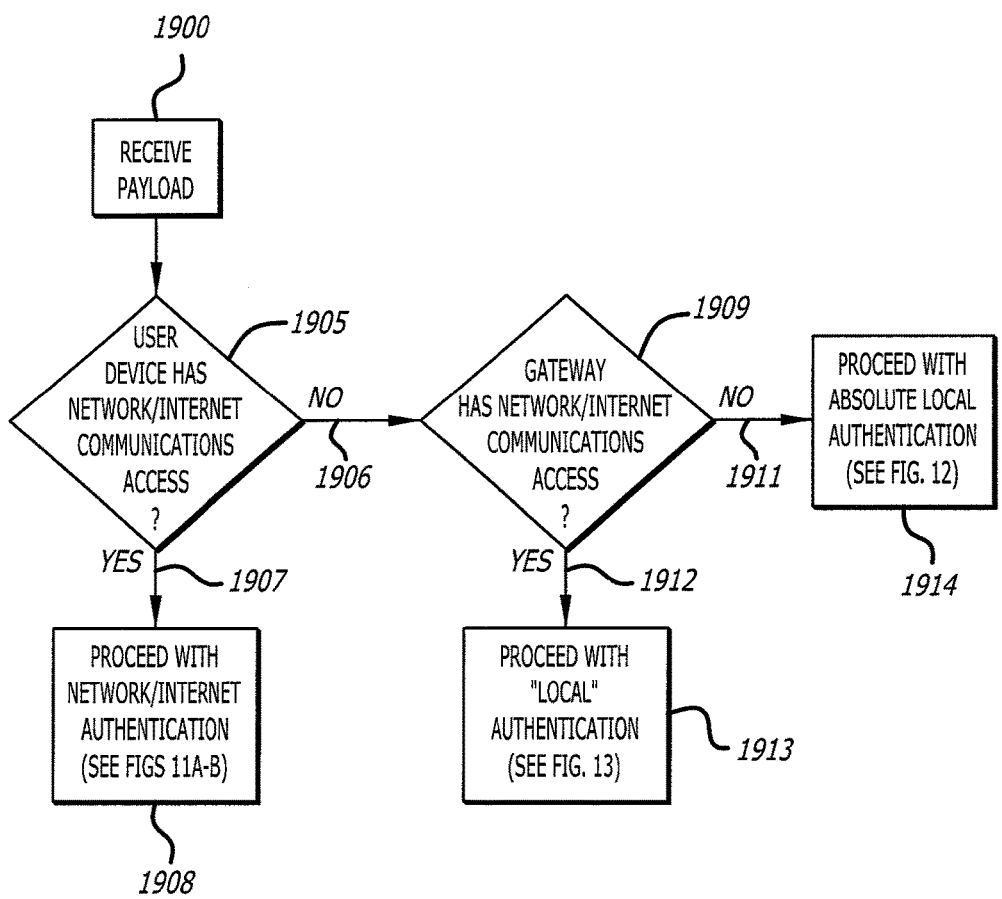
FIG. 14 is a high-level flow diagram that illustratively depicts exemplary high level logic processes for determining which type of exemplary authentication processes should be used to process exemplary NFC-based payment by a particular "app" installed on a particular user device in an exemplary embodiment of the present invention.

FIG. 14 is a high-level flow diagram that illustratively depicts exemplary high level logic processes for determining which type of exemplary authentication processes should be used to process exemplary NFC-based payment by a particular "app" installed on a particular user device in an exemplary embodiment of the present invention.

As depicted in FIG. 14, an exemplary intermediary BOOM BOX™ Gateway Device would receive 1900 an exemplary payload from an exemplary user "BOOM BOX™ app"-enabled intelligent telephone. The exemplary Gateway device would then test 1905 to see, for example, from information in the payload, whether or not the User mobile device has Network/Internet Communications access.

If the User mobile device has Network/Internet Communications access (the "Y" path 1907), then the exemplary Gateway device would proceed 1908 with Network/Internet Authentication as depicted in FIGS. 11A-B. If the User mobile device does not have Network/Internet Communications access (the "N" path 1906), then the exemplary Gateway device would test 1909 whether or not the Gateway device has Network/Internet Communications access (either directly, or through a relevant merchant POS device).

If the Gateway device does not have Network/Internet Communications access (the "N" path 1911), then the Gateway Device would proceed 1914 with "absolute local authentication" processes, as described further below with respect to FIG. 12.

If the Gateway device has Network/Internet Communications access (the "Y" path 1912), then the Gateway Device would proceed 1914 with "local authentication" processes, as described further below with respect to FIG. 13.

FIG. 12 is a high-level flow diagram that illustratively depicts exemplary logic processes for exemplary "absolute local" authentication of exemplary NFC-based payment by a particular "app" installed on a particular user device in an exemplary embodiment of the present invention.

In particular, FIG. 12 depicts exemplary high level logic processes for the previously mentioned second type of "absolute local authentication" (that may also sometimes be referred to herein as "local local authentication") which is authentication where neither the relevant exemplary user "BOOM BOX™ app"-enabled intelligent telephone nor the relevant BOOM BOX™ Gateway Device has any Network/Internet Communications access.

In the exemplary Local-based authentication processes depicted in FIG. 12, the relevant exemplary user "BOOM BOX™ app"-enabled intelligent telephone has determined (as depicted in FIG. 9 as the "N" path) that it does not have a Network/Internet Communications Access available to it; the relevant exemplary user "BOOM BOX™ app"-enabled intelligent telephone would then include in its payment authorization "payload" a notice to the relevant exemplary NFC-Payment-Enabled BOOM BOX™ Gateway device to proceed with "local" authentication; and its payment authorization "payload" may, depending on the exemplary embodiment, comprise a self-generated transaction-specific, buyer-acceptance identifier (or in some alternative exemplary embodiments, would comprise a "wallet" transaction-specific, buyer-acceptance identifier that it had previously obtained from the exemplary "app"-provider computer system/device (e.g., during times when the relevant exemplary user "BOOM BOX™ app"-enabled intelligent telephone had Network/Internet communications access).

As depicted in FIG. 12, the relevant exemplary user "BOOM BOX™ app"-enabled intelligent telephone 2500 may, in response to receiving an exemplary advertising signal from a BOOM BOX™ Gateway Device, self-generate 2510 an exemplary authentication-request-specific identifier (also sometimes referred to herein as a "transaction-specific, buyer-acceptance identifier") and would communicate 2520 an exemplary "payload" and the self-generated transaction-specific, buyer-acceptance identifier to the relevant exemplary NFC-Payment-Enabled BOOM BOX™ Gateway device that had emitted/broadcast the relevant advertising signal.

The relevant exemplary BOOM BOX™ Gateway Device 2501 would receive 2530 the exemplary self-generated transaction-specific, buyer-acceptance identifier, and would then validate the authenticity 2540 of the exemplary transaction-specific, buyer-acceptance identifier.

As will be understood by someone with ordinary skill in the art, there would be a number of ways that an exemplary Gateway could validate the authenticity of a self-generated transaction-specific, buyer-acceptance identifier. As an illustrative, non-limiting example, one way for an exemplary Gateway to validate the authenticity of a self-generated transaction-specific, buyer-acceptance identifier would be with the use of private/public keys. For example, the relevant exemplary BOOM BOX™ Gateway Device would execute executable program instructions that would create/generate an expected transaction-specific, buyer-acceptance identifier based upon information that it received as part of the "payload" from the relevant exemplary user "BOOM BOX™ app"-enabled intelligent telephone (e.g., the relevant device ID and "app"-specific identifier), and based on a "public key." For example, the relevant exemplary BOOM BOX™ Gateway Device may use a public key in combination with information that it received as part of the "payload" from the relevant exemplary user "BOOM BOX™ app"-enabled intelligent telephone, to generate an expected transaction-specific, buyer-acceptance identifier.

Alternatively, in some exemplary embodiments, the exemplary "app"-provider computer system/device would generate a "master" private key. When a user registers an "app" with the exemplary "app"-provider computer system/device, the exemplary "app"-provider computer system/device would use it's "master" private key to generate an "app"-specific (e.g., unique, or substantially unique, such as for a particular period of time) public key, which the exemplary "app"-provider computer system/device would communicate to the "app" that would then install the "app"-specific public key in a secure area of the exemplary user "BOOM BOX™ app"-enabled intelligent telephone. For example, the exemplary user "BOOM BOX™ app"-enabled intelligent telephone could, in some embodiments, install the "app"-specific public key in a "secure element" area of the exemplary user "BOOM BOX™ app"-enabled intelligent telephone.

Further, in some exemplary embodiments, for each NFC-Payment-Enabled BOOM BOX™ Gateway device, the exemplary "app"-provider computer system/device would communicate the "master" private key to the NFC-Payment-Enabled BOOM BOX™ Gateway device and instruct the NFC-Payment-Enabled BOOM BOX™ Gateway device to install the "master" private key in a secure area of the NFC-Payment-Enabled BOOM BOX™ Gateway device, such as, for example, in a "secure element" area of the NFC-Payment-Enabled BOOM BOX™ Gateway device.

Alternatively, in some exemplary embodiments, for each NFC-Payment-Enabled BOOM BOX™ Gateway device, the exemplary "app"-provider computer system/device would use the "master" private key to generate a Gateway-specific (e.g., unique, or substantially unique, such as for a particular period of time) "sub" private key and would communicate the Gateway-specific "sub" private key to the NFC-Payment-Enabled BOOM BOX™ Gateway device and instruct the NFC-Payment-Enabled BOOM BOX™ Gateway device to install the Gateway-specific "sub" private key in a secure area of the NFC-Payment-Enabled BOOM BOX™ Gateway device, such as, for example, in a "secure element" area of the NFC-Payment-Enabled BOOM BOX™ Gateway device.

An NFC-Payment-Enabled BOOM BOX™ Gateway device would then use the "master" private key, or the Gateway-specific "sub" private key, as the case may be, to de-encrypt signatures that may be encrypted by exemplary user "BOOM BOX™ app"-enabled intelligent telephones, and/or to generate expected values for transaction-specific, buyer-acceptance identifiers from a particular exemplary user "BOOM BOX™ app"-enabled intelligent telephone.

The exemplary BOOM BOX™ Gateway Device would then compare the expected transaction-specific, buyer-acceptance identifier that it had generated with the transaction-specific, buyer-acceptance identifier that it had received from the relevant exemplary user "BOOM BOX™ app"-enabled intelligent telephone. In addition, the BOOM BOX™ Gateway Device would then make some or all of the same comparisons outlined above regarding other received values in payload, including buyer-specific ID with buyer entered buyer-specific ID.

If the expected and received identifiers match, then payment authentication would be validated (the "Y" path 2570). If the expected and received identifiers do not match, then payment authentication would fail (the "N" path 2560).

Once payment authentication has been validated (the "Y" path 2570 by the exemplary NFC-Payment-Enabled BOOM BOX™ Gateway device, then the exemplary NFC-Payment-Enabled Gateway device would communicate payment 2575 to an exemplary NFC-enabled Point of Service (POS) device 2580. In particular, communication of payment would comprise communicating the payment information received from the user's "BOOM BOX™ app"-enabled intelligent telephone as part of the exemplary "payload" to the relevant exemplary NFC-enabled Point of Service (POS) device, which would receive 2590 the virtual NFC Payment information in the same way in which payment information would be communicated and received if an NFC-Payment-Enabled intelligent phone had tapped the exemplary NFC-enabled Point of Service (POS) device to transmit payment information (such as would be done with APPLE PAY™)

FIGS. 13A-B are a high-level flow diagram that illustratively depicts exemplary high level logic processes for exemplary "local" authentication of exemplary NFC-based payment by a particular "app" installed on a particular user device in an exemplary embodiment of the present invention.

In particular, FIGS. 13A-B depicts exemplary high level logic processes for the previously mentioned first type of "local authentication" which is authentication where the relevant exemplary user "BOOM BOX™ app"-enabled intelligent telephone does not have any Network/Internet Communications access, but where the relevant BOOM BOX™ Gateway Device does have Network/Internet Communications access (see element 1913 depicted in FIG. 15).

As depicted in FIGS. 13A-B, in some exemplary embodiments, the exemplary BOOM BOX™ Gateway Device would communicate 3010 the exemplary payload information that it receives from the relevant exemplary user "BOOM BOX™ app"-enabled intelligent telephone to the exemplary "app"-provider computer system/device, as well as the facial image biometric measurements that it takes (and/or the PIN that the user enters, as the case may be) (much as previously described above). In such a case, the exemplary "app"-provider computer system/device would perform authentication processes similar to those previously described above.

In the exemplary embodiment depicted in FIGS. 13A-B, the exemplary intermediary BOOM BOX™ Gateway Devices would not only act as a communication "gateway" between the User's device and the merchant's POS device, but would also act as a communication "gateway" for the exemplary "app"-provider computer device to communicate with the particular exemplary User device.

As depicted in FIGS. 13A-B, the exemplary "app"-provider computer device/system 3001 would receive 3020 the Payload and User ID. The exemplary "app"-provider computer device/system 3001 would test 3030 to see if the received information matched information for the relevant user/device that had been stored when the user had registered the "app." If the information did not match (the "N" path 3035, the exemplary "app"-provider computer device/system 3001 would notify 3036 the Gateway 3000 that Authentication had failed.

The Gateway would receive the notification and test 3051 the notification to determine if Authentication failed. If Authentication failed (the "Y" path 3050, the Gateway would notify 3052 the User mobile device accordingly.

For the most part, with exemplary "local" authentication embodiments, the previously above-described Authentication processes that were described with respect to FIGS. 11A-B as being performed by the exemplary "app"-provider computer device would also be performed by the exemplary "app"-provider computer device for "local" authentication, with the exception of the way that the "push" communications were previously described above. In particular, as will be described further below, because with local authentication, there would not be, or at least, may not be, a network available to the particular user device, local authentication embodiments would not require a "push" contact directly between the Authentication System and the user device.

In the exemplary embodiment depicted in FIGS. 13A-B, the User mobile device does not have Network access. Therefore, direct "push" contact by the exemplary "app"-provider computer device to the exemplary User mobile device would not be available. Therefore, in the exemplary embodiment depicted in FIGS. 13A-B, for local authentication, when the received information matches the stored information (the "Y" path 3040), the exemplary "app"-provider computer device would generate 3045 a unique (or substantially unique, for a period of time) value for an exemplary authentication-request-specific (transaction-specific, buyer-acceptance) identifier and would communicate 3046 the identifier to the exemplary intermediary BOOM BOX™ Gateway Device, (which would receive 3060 the transaction-specific, buyer-acceptance identifier) and would communicate 3062 it to the authentication-requesting User mobile device 3072, through the local exemplary intermediary BOOM BOX™ Gateway Device connection.

As depicted in FIGS. 13A-B, the Authentication "app" on the particular authentication-requesting User mobile device 3072 would receive 3070 through the exemplary intermediary BOOM BOX™ Gateway Device 3000, the value for the exemplary authentication-request-specific identifier that had been generated by the exemplary "app"-provider computer device/system 3001.

An exemplary user "BOOM BOX™ app"-enabled intelligent telephone would be programmed to then modify 3096 the exemplary authentication-request-specific identifier in a way (according, e.g., to a device-specific set of executable program instructions, that would be expected by the exemplary "app"-provider computer device). The exemplary user "BOOM BOX™ app"-enabled intelligent telephone would be programmed to then communicate 3097 the modified version of the exemplary authentication-request-specific identifier to the local exemplary intermediary BOOM BOX™ Gateway Device, which would then receive the modified ID and would then communicate 3092 the modified ID back to the exemplary "app"-provider computer device.

For example, an exemplary user "BOOM BOX™ app" may, depending on the specific "app" software, modify the exemplary authentication-request-specific identifier, such as by encrypting it, or by applying some keyed modification, etc. The way in which the particular device-specific exemplary user "BOOM BOX™ app" would be expected to modify the exemplary authentication-request-specific identifier would be recorded in a computer-accessible memory storage accessible by the exemplary "app"-provider computer device.

The exemplary "app"-provider computer device would then receive 3100 the modified version of the exemplary authentication-request-specific identifier through the local exemplary intermediary BOOM BOX™ Gateway Device from the particular device-specific exemplary user "BOOM BOX™ app," the exemplary "app"-provider computer device would determine 3075 an expected ID, and would then test 3076 whether or not the exemplary authentication-request-specific identifier had been modified in the way expected for the particular device-specific exemplary user "BOOM BOX™ app." That is, for example, the exemplary "app"-provider computer device would identify, and execute, mirror executable program instructions to create a modified version of the exemplary authentication-request-specific identifier.

The exemplary "app"-provider computer device would then compare 3076 the expected value that it had created with the modified version that it had received through the local exemplary intermediary BOOM BOX™ Gateway Device from the particular device-specific exemplary user "BOOM BOX™ app." If the expected modified exemplary authentication-request-specific identifier matches (the "Y" path 3082) the received modified exemplary authentication-request-specific identifier, then the exemplary "app"-provider computer device 3001 would notify 3301 the Gateway device 3000 that it is dealing with the appropriate user device and the appropriate "app;" the Gateway device 3000 would in turn determine 3800 whether or not Authentication had failed, and if it had not failed (the "N" path 3804), would process 3085 payment information and would communicate that information to the relevant merchant's POS device 3200, which would in turn, process the payment information as if an NFC-enabled device had directly communicated payment information to it.

If the expected identifier did not match the modified identifier (the "N" path 3080), then the exemplary "app"-provider computer device would notify 3300 the Gateway device 3000, which would in turn determine 3800 whether or not Authentication had failed, and if it had failed (the "Y" path 3802), would notify 4000 the User mobile device 3072, that authentication had failed 3090.

The above-described local authentication process would safeguard the exemplary "app"-provider computer device, the local exemplary intermediary BOOM BOX™ Gateway Device, and the merchant's POS device, from dealing with either a "spoofed" user device and/or a "spoofed" "app" even when the user mobile device did not have Network/Internet communications access.

Virtual NFC-Enabled Payment

An exemplary NFC-Payment-Enabled BOOM BOX™ Gateway device would, for example, further comprise an NFC chip that would facilitate communications between the NFC-Payment-Enabled Gateway device and exemplary NFC-enabled Point of Service (POS) devices.

Once confirmation by the exemplary "app"-provider computer device of payment authorization had been received by the exemplary NFC-Payment-Enabled BOOM BOX™ Gateway device, or once "local" authentication had been confirmed, exemplary communications between an exemplary NFC-Payment-Enabled Gateway device and an exemplary NFC-enabled Point of Service (POS) devices would pass the payment information received from the user's "BOOM BOX™ app"-enabled intelligent telephone, or from the "app"-provider computer device depending on exemplary embodiment, to the relevant exemplary NFC-enabled Point of Service (POS) device in the same way in which payment information would be communicated if an NFC-Payment-Enabled intelligent phone had tapped the exemplary NFC-enabled Point of Service (POS) device to transmit payment information (such as would be done with APPLE PAY™)

As will be understood by someone with ordinary skill in the art, descriptions herein regarding Near Field Communication ("NFC") are illustrative and non-limiting; exemplary user devices and exemplary Point of Service devices) may communicate using NFC communications, or through other communications technology whether now known or in the future discovered.

For example, in one exemplary embodiment, magnetic stripe card technology (e.g., SAMSUNG®-owned LOOP-PAY's magnetic secure transmission technology ("MST")) could be used to transfer payment data between BOOM BOX™ Gateway device and an exemplary non-NFC-enabled Point of Sale (POS) device.

Exemplary Physical Device Security

As will be understood by someone in the art, security of physical devices is a top concern when enabling commerce. In some exemplary embodiments, in order to ensure security and safekeeping of BOOM BOX gateway devices, additional measures may be put in place.

In one exemplary embodiment, BOOM BOX gateway devices may be paired upon setup to work with a particular POS or terminal.

The system may also require location (or "GPS") measurements during setup to ensure device is not moved to different location following setup.

In addition, merchants may be provided a unique Merchant ID when setting up an exemplary BOOM BOX gateway device. Merchants may use a Merchant ID to set up multiple BOOM BOX gateway devices, or may be asked to create or enter unique BOOM BOX device IDs upon setup.

In addition, exemplary BOOM BOX gateway devices may be automatically programmed to require a reset after losing power or being unplugged.

In addition, merchants may have an exemplary "master" BOOM BOX device that emits a signal (i.e. over Bluetooth Low Energy) that registered BOOM BOXES must receive in order to continue working within the exemplary Authentication/Payment system. In the event an exemplary registered (having gone through set up) BOOM BOX gateway device stops receiving the required signal, that exemplary registered BOOM BOX gateway device would immediately shut down and would need to be reset in order to resume operation within the exemplary Authentication/Payment system.

As will be understood by someone in the art, these above security precautions would protect and maintain the integrity of above described Authentication/Payment system.

Usefulness; Advantages

Some exemplary embodiments of the present invention would provide Buyer protections. For example, with exemplary embodiments of the present invention, a Buyer would not need to show up to a local meeting with a potential Seller with a lot of cash in the Buyer's pocket. Further, the Buyer would not be charged prior to viewing an item and agreeing to complete the purchase transaction.

Some exemplary embodiments of the present invention would also provide Seller protections. For example, Sellers, and online marketplaces that implement an embodiment of the present invention, could implement a no return/no refund policy because the transaction would not be completed, and the Buyer would not be charged, unless and until the Buyer meets the Seller, personally inspects the item, and agrees to purchase the item. For example, an online marketplace could implement a policy to instruct each Buyer to verify the condition of the item to be purchased during the Buyer's inspection meeting with the Seller; the policy could inform that Buyer that receipt of transaction confirmation would be confirmation that the buyer has: agreed to transaction; has actually met with seller; has verified the condition of the item as satisfactory; and has received the item.

Another Seller protection would be provided by the process of obtaining a payment authorization from a relevant Payment Entity, and requesting an immediate Payment Authorization Hold on the proposed amount of the transaction. Such an exemplary Payment Authorization Hold would accomplish verification of the Buyer's payment information and would assure that the amount for the transaction was verified and placed on hold (in some embodiments, only for some pre-established maximum number of days) pending confirmation of the transaction further to the remainder of the disclosed exemplary embodiment process. As mentioned above, some embodiments would facilitate negotiations between the Buyer and the Seller that could result in a different, for example, but not limited to, a lower-than-advertised price; the Seller could inform the exemplary embodiment of the revised price, the exemplary embodiment would confirm the revised price with the Buyer, and would then authorize the relevant Payment Entity to charge the Buyer for the finally negotiated price.

In view of the above-mentioned factors that would be confirmed by receipt of transaction confirmation, some exemplary embodiments of the present invention would also provide protection (to Sellers, online marketplaces and/or Payment Processors) from chargebacks and/or risk of chargebacks. For example, because receipt of a transaction confirmation would confirm that the buyer has: agreed to transaction; has actually met with seller; has verified the condition of the item as satisfactory; and has received the item, claims as to fraudulent sales and/or fraudulent delivery would be greatly reduced. The transaction consummation confirmation would provide the company (Seller, online marketplace, Payment Processor) with evidence that the transaction took place and that the Buyer had verified that the item was of a satisfactory condition prior to finalizing transaction and would thereby provide a basis for defense in the event of a chargeback.

Further, because exemplary embodiments of the present invention would facilitate safer local meetings to transact exchanges, there would be no need for shipping costs. Yet further, the verification by the Buyer that the item is of satisfactory condition would reduce the concern of companies that are involved in providing a marketplace for the exchange of items over which the company has no control. Further still, because exemplary embodiments would eliminate the need for a Buyer to show up to a local meeting with a potential Seller with a lot of cash in the Buyer's pocket for purchasing the item, the enhanced safety would reduce liability on the part of companies that provide an online marketplace for the exchange of items between Buyers and Sellers over which the company has no control.

Facsimile Reproduction of Copyright Material

A portion of the disclosure of this patent document contains material which is subject to copyright protection by the copyright owner, Erik T. Bogaard, and/or BOOM! Payments Inc. and their respective successors and assigns. The copyright owner has no objection to the facsimile reproduction by anyone of the patent document or the patent disclosure, as it appears in the Patent and Trademark Office patent file or records, but otherwise reserves all copyright rights whatsoever.

Illustrative Embodiments

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A computer-implemented method for authenticating a proposed payment by a user mobile computer device and communicating payment information from the user's mobile computer device to a Near-Field-Communication-enabled Point of Service device as if the user mobile computer device were enabled to use Near-Field Communications to communicate said payment information to said Near-Field-Communication-enabled Point of Service device, said computer-implemented method comprising:

executing executable computer program instructions that are operably installed on said user mobile computer device that instruct said user mobile computer device to generate an application-specific identifier and to use a public key to encrypt said application-specific identifier and to store an encryption of said application-specific identifier on a computer-accessible memory storage that is accessible by said user mobile computer device;

executing executable computer program instructions that are operably installed on said user mobile computer device that instruct said user mobile computer device to scan biometric measurements of particular aspects of a user associated with said user mobile computer device and use said public key to encrypt said biometric measurements and to store an encryption of said biometric measurements on said computer-accessible memory storage that is accessible by said user mobile computer device;

executing executable computer program instructions that are operably installed on said user mobile computer device that instruct said user mobile computer device to generate a transaction-specific identifier and to use said public key to encrypt said transaction-specific identifier and to store an encryption of said transaction-specific identifier on said computer-accessible memory storage that is accessible by said user mobile computer device;

executing executable computer program instructions that are operably installed on said user mobile computer device that instruct said user mobile computer device to communicate said encryption of said application-specific identifier, said encryption of said biometric measurements, said encryption of said transaction-specific identifier, and payment information to a Near-Field-Communication-enabled gateway computer device;

executing executable computer program instructions that are operably installed on said Near-Field-Communication-enabled gateway computer device to:

receive said encryption of said application-specific identifier, said encryption of said biometric measurements, said encryption of said transaction-specific identifier, and said payment information;

scan biometric measurements of particular aspects of a paying user that is presenting the user mobile computer device for payment;

use a private key to decrypt said encryption of said application-specific identifier, said encryption of said biometric measurements, and said encryption of said transaction-specific identifier;

compare said biometric measurements scanned from particular aspects of said paying user with a decryption of said encryption of said biometric measurements;

use said private key to generate an expected transaction-specific identifier based on information received from said user mobile computer device;

compare said expected transaction-specific identifier to a decryption of said encryption of said transaction-specific identifier;

if said expected transaction-specific identifier matches said decryption of said encryption of said transaction-specific identifier, then use Near-Field-Communication technology to communicate said payment information to said Near-Field-Communication-enabled Point of Service device and communicate a successful authentication and payment to said user mobile computer device; and if said expected transaction-specific identifier does not match said decryption of said encryption of said transaction-specific identifier, then communicate an authentication failure to said user mobile computer device.

2. A computer-implemented method for integrating a Near-Field-Communication-enabled gateway computer device with a merchant's Near-Field-Communication-enabled Point of Service device to facilitate the merchant's Near-Field-Communication-enabled Point of Service device to accept mobile payment from mobile user devices that are not themselves Near-Field-Communication-enabled, said computer-implemented method comprising executing executable computer program instructions that are operably installed on said Near-Field-Communication-enabled gateway computer device to:

receive from a particular mobile user device an encryption of an application-specific identifier, an encryption of biometric measurements, an encryption of a transaction-specific identifier, and payment information;

scan biometric measurements of particular aspects of a paying user that is presenting the mobile user device for payment;

use a private key to decrypt said encryption of said application-specific identifier, said encryption of said biometric measurements, and said encryption of said transaction-specific identifier;

compare said biometric measurements scanned from particular aspects of said paying user with a decryption of said encryption of said biometric measurements;

use said private key to generate an expected transaction-specific identifier based on information received from said mobile user device;

compare said expected transaction-specific identifier to a decryption of said encryption of said transaction-specific identifier;

if said expected transaction-specific identifier matches said decryption of said encryption of said transaction-specific identifier, then use Near-Field-Communication technology to communicate said payment information to said Near-Field-Communication-enabled Point of Service device and communicate a successful authentication and payment to said mobile user device; and if said expected transaction-specific identifier does not match said decryption of said encryption of said transaction-specific identifier, then communicate an authentication failure to said mobile user device.

3. A computer-implemented method for facilitating Near-Field-Communication payment by a mobile device that is not Near-Field-Communication enabled, said method comprising:

integrating a Near-Field-Communication-enabled gateway computer device to communicate with a merchant Near-Field-Communication-enabled Point of Service device;

executing executable computer program instructions that are operably installed on said Near-Field-Communication-enabled gateway computer device to:

receive encrypted user identification information from said mobile device, said information including scanned biometric measurements of a user associated with said mobile device;

decrypt said encrypted user identification information using a private key to recover said information;

generate expected values based at least in part on said user identification information and based on said private key;

compare said expected values to said user identification information received from said mobile device;

for a match between said expected values and said user identification information, use Near-Field-Communication technology to communicate payment information to said Near-Field-Communication-enabled Point of Service device and communicate a successful authentication and payment to said mobile device, and if said expected values do not match said user identification information, then communicate an authentication failure to said mobile device.

* * * * *